US009767638B2

(12) United States Patent
Kadode et al.

(10) Patent No.: US 9,767,638 B2
(45) **Date of Patent: *Sep. 19, 2017**

(54) SLOT MACHINE THAT INCREASES THE NUMBER OF DISPLAYED SYMBOLS AND CONTROL METHOD THEREOF

(71) Applicant: Aruze Gaming America, Inc., Las Vegas, NV (US)

(72) Inventors: Yutaka Kadode, Tokyo (JP); Masahiro Yoshida, Tokyo (JP); Hiroyuki Kuroyanagi, Tokyo (JP); Satoshi Watanabe, Tokyo (JP); Yuka Hotta, Tokyo (JP); Tsuyoshi Ohira, Tokyo (JP); Hiroki Abe, Tokyo (JP); Takanori Sakata, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 449 days.

This patent is subject to a terminal disclaimer.

(21) Appl. No.: 14/478,206

(22) Filed: Sep. 5, 2014

(65) Prior Publication Data

US 2014/0378207 A1 Dec. 25, 2014

Related U.S. Application Data

(63) Continuation of application No. 12/544,097, filed on Aug. 19, 2009, now Pat. No. 8,858,320.
(Continued)

(51) Int. Cl.
*A63F 13/00* (2014.01)
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ....... G07F 17/32; G07F 17/34; G07F 17/3265
(Continued)

(56) References Cited

U.S. PATENT DOCUMENTS 5,251,898 A 10/1993 Dickenson et al.
7,654,895 B2 2/2010 Pacey
(Continued)

FOREIGN PATENT DOCUMENTS

CN 101169885 4/2008
JP 2006-116351 5/2006
WO WO 2006/036516 4/2006

OTHER PUBLICATIONS

Macau Search Report and Office Action (and English Translation) for App. No. I/000986, issued Dec. 10, 2010, (11 Pages + 1 Page Translation).

*Primary Examiner* — David L Lewis
*Assistant Examiner* — Robert Mosser
(74) *Attorney, Agent, or Firm* — KMF Patent Services, PLLC; S. Peter Konzel; Kenneth M. Fagin

(57) ABSTRACT

A slot machine according to the present invention comprises: a symbol display capable of scroll-displaying a symbol array that includes a plurality of symbols; and a controller programmed to execute the processing of: (A) executing a normal game in which the symbol array is scroll-displayed in a single direction and then stop-displayed to the symbol display, and in which game media are paid out in an amount corresponding to the stop-displayed symbol or a combination of the stop-displayed symbols; and (B) displaying an extra symbol being added to the symbol array, while scrolling the symbol array in a direction opposite to the single direction, when a predetermined condition has been satisfied in the normal game executed in the processing (A).

8 Claims, 59 Drawing Sheets

Related U.S. Application Data

(60) Provisional application No. 61/104,521, filed on Oct. 10, 2008, provisional application No. 61/104,065, filed on Oct. 9, 2008.

(58) Field of Classification Search
USPC .......................................................... 463/21, 31
See application file for complete search history.

(56) References Cited

U.S. PATENT DOCUMENTS

| | | | |
|---|---|---|---|
| 2003/0232640 | A1 | 12/2003 | Walker et al. |
| 2005/0130731 | A1 | 6/2005 | Englman et al. |
| 2006/0025201 | A1 | 2/2006 | Van Asdale |
| 2006/0084492 | A1 | 4/2006 | Baerlocher et al. |
| 2006/0084498 | A1 | 4/2006 | Baerlocher et al. |
| 2006/0264254 | A1 | 11/2006 | Aoki |
| 2008/0070673 | A1 | 3/2008 | Bennett et al. |
| 2008/0102926 | A1 | 5/2008 | Okada |
| 2009/0124330 | A1 | 5/2009 | Leger |
| 2009/0124345 | A1 | 5/2009 | Gilmore et al. |

FIG. 5

| | | First array L1 | Second array L2 | Third array L3 | Fourth array L4 | Fifth array L5 |
|---|---|---|---|---|---|---|
| Code No. | Random number value | Symbol | Symbol | Symbol | Symbol | Symbol |
| 00 | 0~3277 | J | WILD | A | Q | J |
| 01 | 3278~6555 | Q | A | J | J | A |
| 02 | 6556~9833 | FLOWER1 | Q | FLOWER1 | FLOWER1 | FLOWER1 |
| 03 | 9834~13111 | J | WILD | 10 | Q | J |
| 04 | 13112~16389 | Q | WILD | FLOWER2 | K | A |
| 05 | 16390~19667 | FLOWER2 | WILD | FLOWER1 | FLOWER1 | FISH |
| 06 | 19668~22945 | A | FISH | FEATURE | A | FLOWER2 |
| 07 | 22946~26223 | BIRD | BIRD | A | K | FEATURE |
| 08 | 26224~29501 | 10 | K | J | 9 | K |
| 09 | 29502~32779 | 9 | FLOWER2 | 9 | Q | 9 |
| 10 | 32780~36057 | A | WILD | A | BIRD | Q |
| 11 | 36058~39335 | Q | A | Q | 10 | FLOWER1 |
| 12 | 39336~42613 | 10 | 9 | BIRD | FEATURE | K |
| 13 | 42614~45891 | FLOWER2 | BIRD | K | K | BIRD |
| 14 | 45892~49169 | K | J | FISH | 10 | 10 |
| 15 | 49170~52447 | A | WILD | Q | BIRD | J |
| 16 | 52448~55725 | WILD | 10 | FEATURE | A | WILD |
| 17 | 55726~59003 | J | FLOWER1 | A | WILD | WILD |
| 18 | 59004~62281 | Q | WILD | WILD | FISH | WILD |
| 19 | 62282~65535 | FISH | FEATURE | WILD | FLOWER2 | Q |

(Range of random number value:0~65535)

FIG. 7

| Symbol | Number of rearranged symbols | | | |
|---|---|---|---|---|
| | Two symbols | Three symbols | Four symbols | Five symbols |
| 10 | 2 | 4 | 6 | 8 |
| J | 3 | 6 | 9 | 12 |
| Q | 30 | 60 | 90 | 120 |
| K | 10 | 20 | 30 | 40 |
| FLOWER1 | 5 | 10 | 15 | 20 |
| FLOWER2 | 8 | 16 | 24 | 32 |
| BIRD | 15 | 30 | 45 | 60 |
| FISH | 25 | 50 | 75 | 100 |
| FEATURE | Free game (※) | | | |

※Free game is played when three or more symbols are rearranged.

FIG. 12

Number-of-games determination table

| Number of games | Random number value |
|---|---|
| 5 | 0~13106 |
| 10 | 13107~26214 |
| 15 | 26215~39321 |
| 20 | 39322~52428 |
| 30 | 52429~65535 |

(Range of random number value:0~65535)

FIG. 15

Table for determining the number of to-be-added wild symbols

| The number of to-be-added wild symbols | Random number value |
|---|---|
| 10 | 0～13106 |
| 20 | 13107～26214 |
| 30 | 26215～39321 |
| 40 | 39322～52428 |
| 50 | 52429～65535 |

(Range of random number value:0～65535)

FIG. 18

Symbol-array determination table

| Symbol array No. | Random number value |
|---|---|
| L1 | 0~13106 |
| L2 | 13107~26214 |
| L3 | 26215~39321 |
| L4 | 39322~52428 |
| L5 | 52429~65535 |

(Range of random number value:0~65535)

FIG. 19

Code-number determination table

| Random number value | Code No. |
| --- | --- |
| 0~2978 | 00 |
| 2979~5957 | 01 |
| 5958~8936 | 02 |
| 8937~11915 | 03 |
| 11916~14894 | 04 |
| 14895~17873 | 05 |
| 17874~20852 | 06 |
| 20853~23831 | 07 |
| 23832~26810 | 08 |
| 26811~29789 | 09 |
| 29790~32768 | 10 |
| 32769~35747 | 11 |
| 35748~38726 | 12 |
| 38727~41705 | 13 |
| 41706~44684 | 14 |
| 44685~47663 | 15 |
| 47664~50642 | 16 |
| 50643~53621 | 17 |
| 53622~56600 | 18 |
| 56601~59579 | 19 |
| 59580~62558 | 20 |
| 62559~65535 | End |

FIG. 20A

| First array | | | Second array | | | Third array | | |
|---|---|---|---|---|---|---|---|---|
| Code No. | Random number value | Symbol | Code No. | Random number value | Symbol | Code No. | Random number value | Symbol |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | FLOWER1 | 02 | 6241~9361 | Q | 02 | 5958~8936 | FLOWER1 |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | FLOWER2 |
| 05 | 14254~17104 | FLOWER2 | 05 | 15604~18723 | WILD | 05 | 14895~17873 | FLOWER1 |
| 06 | 17105~19955 | A | 06 | 18724~21844 | FISH | 06 | 17874~20852 | WILD |
| 07 | 19956~22806 | BIRD | 07 | 21845~24965 | BIRD | 07 | 20853~23831 | FEATURE |
| 08 | 22807~25657 | 10 | 08 | 24966~28086 | K | 08 | 23832~26810 | A |
| 09 | 25658~28508 | 9 | 09 | 28087~31207 | FLOWER2 | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FLOWER2 | 14 | 43692~46812 | BIRD | 14 | 41706~44684 | BIRD |
| 15 | 42764~45614 | K | 15 | 46813~49933 | J | 15 | 44685~47663 | K |
| 16 | 45615~48465 | A | 16 | 49934~53054 | WILD | 16 | 47664~50642 | FISH |
| 17 | 48466~51316 | WILD | 17 | 53055~56175 | 10 | 17 | 50643~53621 | Q |
| 18 | 51317~54167 | J | 18 | 56176~59296 | FLOWER1 | 18 | 53622~56600 | FEATURE |
| 19 | 54168~57018 | Q | 19 | 59297~62417 | WILD | 19 | 56601~59579 | A |
| 20 | 57019~59869 | FISH | 20 | 62418~65535 | FEATURE | 20 | 59580~62558 | WILD |
| 21 | 59870~62720 | WILD | | | | 21 | 62559~65535 | WILD |
| 22 | 62721~65535 | WILD | | | | | | |

(Range of random number value:0~65535)

FIG. 20B

| Fourth array | | | Fifth array | | |
|---|---|---|---|---|---|
| Code No. | Random number value | Symbol | Code No. | Random number value | Symbol |
| 00 | 0～2978 | Q | 00 | 0～2978 | J |
| 01 | 2979～5957 | J | 01 | 2979～5957 | A |
| 02 | 5958～8936 | FLOWER1 | 02 | 5958～8936 | FLOWER1 |
| 03 | 8937～11915 | Q | 03 | 8937～11915 | J |
| 04 | 11916～14894 | K | 04 | 11916～14894 | A |
| 05 | 14895～17873 | FLOWER1 | 05 | 14895～17873 | FISH |
| 06 | 17874～20852 | A | 06 | 17874～20852 | FLOWER2 |
| 07 | 20853～23831 | K | 07 | 20853～23831 | FEATURE |
| 08 | 23832～26810 | 9 | 08 | 23832～26810 | K |
| 09 | 26811～29789 | Q | 09 | 26811～29789 | 9 |
| 10 | 29790～32768 | BIRD | 10 | 29790～32768 | Q |
| 11 | 32769～35747 | WILD | 11 | 32769～35747 | FLOWER1 |
| 12 | 35748～38726 | WILD | 12 | 35748～38726 | K |
| 13 | 38727～41705 | 10 | 13 | 38727～41705 | BIRD |
| 14 | 41706～44684 | FEATURE | 14 | 41706～44684 | 10 |
| 15 | 44685～47663 | K | 15 | 44685～47663 | J |
| 16 | 47664～50642 | 10 | 16 | 47664～50642 | WILD |
| 17 | 50643～53621 | BIRD | 17 | 50643～53621 | WILD |
| 18 | 53622～56600 | A | 18 | 53622～56600 | WILD |
| 19 | 56601～59579 | WILD | 19 | 56601～59579 | WILD |
| 20 | 59580～62558 | FISH | 20 | 59580～62558 | WILD |
| 21 | 62559～65535 | FLOWER2 | 21 | 62559～65535 | Q |

(Range of random number value:0～65535)

FIG. 28

| | | First array L1001 | Second array L1002 | Third array L1003 | Fourth array L1004 | Fifth array L1005 |
|---|---|---|---|---|---|---|
| Code No. | Random number value | Symbol | Symbol | Symbol | Symbol | Symbol |
| 00 | 0~3277 | J | WILD | A | Q | J |
| 01 | 3278~6555 | Q | A | J | J | A |
| 02 | 6556~9833 | FLOWER1 | Q | FLOWER1 | FLOWER1 | FLOWER1 |
| 03 | 9834~13111 | J | WILD | 10 | Q | J |
| 04 | 13112~16389 | Q | WILD | FLOWER2 | K | A |
| 05 | 16390~19667 | FLOWER2 | WILD | FLOWER1 | FLOWER1 | FISH |
| 06 | 19668~22945 | A | FISH | FEATURE | A | FLOWER2 |
| 07 | 22946~26223 | BIRD | BIRD | A | K | FEATURE |
| 08 | 26224~29501 | 10 | K | J | 9 | K |
| 09 | 29502~32779 | 9 | FLOWER2 | 9 | Q | 9 |
| 10 | 32780~36057 | A | WILD | A | BIRD | Q |
| 11 | 36058~39335 | Q | A | Q | 10 | FLOWER1 |
| 12 | 39336~42613 | 10 | 9 | BIRD | FEATURE | K |
| 13 | 42614~45891 | FLOWER2 | BIRD | K | K | BIRD |
| 14 | 45892~49169 | K | J | FISH | 10 | 10 |
| 15 | 49170~52447 | A | WILD | Q | BIRD | J |
| 16 | 52448~55725 | WILD | 10 | FEATURE | A | WILD |
| 17 | 55726~59003 | J | FLOWER1 | A | WILD | WILD |
| 18 | 59004~62281 | Q | WILD | WILD | FISH | WILD |
| 19 | 62282~65535 | FISH | FEATURE | WILD | FLOWER2 | Q |

(Range of random number value:0~65535)

FIG. 30

| Symbol | Number of rearranged symbols | | | |
|---|---|---|---|---|
| | Two symbols | Three symbols | Four symbols | Five symbols |
| 10 | 2 | 4 | 6 | 8 |
| J | 3 | 6 | 9 | 12 |
| Q | 30 | 60 | 90 | 120 |
| K | 10 | 20 | 30 | 40 |
| FLOWER1 | 5 | 10 | 15 | 20 |
| FLOWER2 | 8 | 16 | 24 | 32 |
| BIRD | 15 | 30 | 45 | 60 |
| FISH | 25 | 50 | 75 | 100 |
| FEATURE | Free game (※) | | | |

※Free game is played when three or more symbols are rearranged.

FIG. 35

Number-of-games determination table

| Number of games | Random number value |
|---|---|
| 5 | 0~13106 |
| 10 | 13107~26214 |
| 15 | 26215~39321 |
| 20 | 39322~52428 |
| 30 | 52429~65535 |

(Range of random number value:0~65535)

FIG. 38

Table for determining the number of to-be-added wild symbols

| The number of to-be-added wild symbols | Random number value |
|---|---|
| 10 | 0～13106 |
| 20 | 13107～26214 |
| 30 | 26215～39321 |
| 40 | 39322～52428 |
| 50 | 52429～65535 |

(Range of random number value:0～65535)

FIG. 41

Symbol-array determination table

| Symbol array No. | Random number value |
|---|---|
| L1001 | 0～13106 |
| L1002 | 13107～26214 |
| L1003 | 26215～39321 |
| L1004 | 39322～52428 |
| L1005 | 52429～65535 |

(Range of random number value:0～65535)

FIG. 42

Code-number determination table

| Random number value | Code No. |
|---|---|
| 0～2978 | 00 |
| 2979～5957 | 01 |
| 5958～8936 | 02 |
| 8937～11915 | 03 |
| 11916～14894 | 04 |
| 14895～17873 | 05 |
| 17874～20852 | 06 |
| 20853～23831 | 07 |
| 23832～26810 | 08 |
| 26811～29789 | 09 |
| 29790～32768 | 10 |
| 32769～35747 | 11 |
| 35748～38726 | 12 |
| 38727～41705 | 13 |
| 41706～44684 | 14 |
| 44685～47663 | 15 |
| 47664～50642 | 16 |
| 50643～53621 | 17 |
| 53622～56600 | 18 |
| 56601～59579 | 19 |
| 59580～62558 | 20 |
| 62559～65535 | End |

FIG. 43A

| First array | | | Second array | | | Third array | | |
|---|---|---|---|---|---|---|---|---|
| Code No. | Random number value | Symbol | Code No. | Random number value | Symbol | Code No. | Random number value | Symbol |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | FLOWER1 | 02 | 6241~9361 | Q | 02 | 5958~8936 | FLOWER1 |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | FLOWER2 |
| 05 | 14254~17104 | FLOWER2 | 05 | 15604~18723 | WILD | 05 | 14895~17873 | FLOWER1 |
| 06 | 17105~19955 | A | 06 | 18724~21844 | FISH | 06 | 17874~20852 | WILD |
| 07 | 19956~22806 | BIRD | 07 | 21845~24965 | BIRD | 07 | 20853~23831 | FEATURE |
| 08 | 22807~25657 | 10 | 08 | 24966~28086 | K | 08 | 23832~26810 | A |
| 09 | 25658~28508 | 9 | 09 | 28087~31207 | FLOWER2 | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FLOWER2 | 14 | 43692~46812 | BIRD | 14 | 41706~44684 | BIRD |
| 15 | 42764~45614 | K | 15 | 46813~49933 | J | 15 | 44685~47663 | K |
| 16 | 45615~48465 | A | 16 | 49934~53054 | WILD | 16 | 47664~50642 | FISH |
| 17 | 48466~51316 | WILD | 17 | 53055~56175 | 10 | 17 | 50643~53621 | Q |
| 18 | 51317~54167 | J | 18 | 56176~59296 | FLOWER1 | 18 | 53622~56600 | FEATURE |
| 19 | 54168~57018 | Q | 19 | 59297~62417 | WILD | 19 | 56601~59579 | A |
| 20 | 57019~59869 | FISH | 20 | 62418~65535 | FEATURE | 20 | 59580~62558 | WILD |
| 21 | 59870~62720 | WILD | | | | 21 | 62559~65535 | WILD |
| 22 | 62721~65535 | WILD | | | | | | |

(Range of random number value:0~65535)

FIG. 43B

| Fourth array | | | Fifth array | | |
|---|---|---|---|---|---|
| Code No. | Random number value | Symbol | Code No. | Random number value | Symbol |
| 00 | 0~2978 | Q | 00 | 0~2978 | J |
| 01 | 2979~5957 | J | 01 | 2979~5957 | A |
| 02 | 5958~8936 | FLOWER1 | 02 | 5958~8936 | FLOWER1 |
| 03 | 8937~11915 | Q | 03 | 8937~11915 | J |
| 04 | 11916~14894 | K | 04 | 11916~14894 | A |
| 05 | 14895~17873 | FLOWER1 | 05 | 14895~17873 | FISH |
| 06 | 17874~20852 | A | 06 | 17874~20852 | FLOWER2 |
| 07 | 20853~23831 | K | 07 | 20853~23831 | FEATURE |
| 08 | 23832~26810 | 9 | 08 | 23832~26810 | K |
| 09 | 26811~29789 | Q | 09 | 26811~29789 | 9 |
| 10 | 29790~32768 | BIRD | 10 | 29790~32768 | Q |
| 11 | 32769~35747 | WILD | 11 | 32769~35747 | FLOWER1 |
| 12 | 35748~38726 | WILD | 12 | 35748~38726 | K |
| 13 | 38727~41705 | 10 | 13 | 38727~41705 | BIRD |
| 14 | 41706~44684 | FEATURE | 14 | 41706~44684 | 10 |
| 15 | 44685~47663 | K | 15 | 44685~47663 | J |
| 16 | 47664~50642 | 10 | 16 | 47664~50642 | WILD |
| 17 | 50643~53621 | BIRD | 17 | 50643~53621 | WILD |
| 18 | 53622~56600 | A | 18 | 53622~56600 | WILD |
| 19 | 56601~59579 | WILD | 19 | 56601~59579 | WILD |
| 20 | 59580~62558 | FISH | 20 | 59580~62558 | WILD |
| 21 | 62559~65535 | FLOWER2 | 21 | 62559~65535 | Q |

(Range of random number value:0~65535)

SLOT MACHINE THAT INCREASES THE NUMBER OF DISPLAYED SYMBOLS AND CONTROL METHOD THEREOF

CROSS-REFERENCE TO RELATED APPLICATIONS

This application is a continuation of U.S. patent application Ser. No. 12/544,097, filed Aug. 19, 2009, which application claims benefit of U.S. Prov. Pat. App. No. 61/104,065, filed on Oct. 9, 2008 and U.S. Prov. Pat. App. No. 61/104,521 filed, on Oct. 10, 2008. The contents of the above-identified applications are incorporated herein by reference in their entireties.

BACKGROUND OF THE INVENTION

Field of the Invention

The present invention relates to a slot machine that increases the number of displayed symbols and a control method thereof.

Discussion of the Background

There have been conventionally known slot machines that scroll-display and then stop-display a plurality of kinds of symbols and provide a predetermined amount of game media (e.g. a predetermined number of coins, a predetermined amount of money) based upon a combination of the stop-displayed symbols.

Among such slot machines, there exist slot machines having a symbol array that includes a wild symbol substitutable for another symbol. Slot machines having the wild symbols are disclosed for example in US 2006/0084498-A1, US 2006/0264254-A1, and US 2008/0070673-A1. In the slot machine having the wild symbol, when the wild symbol is displayed on a pay line, the wild symbol is substituted for another symbol to form a combination establishing a prize, thus allowing a player to have great expectations.

The inventors of the present invention has therefore come to consider that adding a new function related to the wild symbol to the slot machine can provide a more attractive game.

The present invention was made in view of the aforementioned issue and an object thereof is to provide a slot machine capable of providing a more attractive game, and a control method thereof.

The contents of US 2006/0084498-A1, US 2006/0264254-A1 and US 2008/0070673-A1 are incorporated herein by reference in their entirety.

SUMMARY OF THE INVENTION

The present invention provides a slot machine having the following configuration.

Namely, the slot machine comprises: a symbol display capable of scroll-displaying a symbol array that includes a plurality of symbols; and a controller. The controller is programmed to execute the processing of: (A) executing a normal game in which the symbol array is scroll-displayed in a single direction and then stop-displayed to the symbol display, and in which game media are paid out in an amount corresponding to the stop-displayed symbol or a combination of the stop-displayed symbols; and (B) displaying an extra symbol being added to the symbol array, while scrolling the symbol array in a direction opposite to the single direction, when a predetermined condition has been satisfied in the normal game executed in the processing (A).

According to the slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the extra symbol being added to the symbol array is executed while the symbol array is being scrolled in the direction opposite to the single direction.

Since a symbol is added to the symbol array, it is possible to make the player have expectations for start of a game in which a new symbol array different from that of the normal game is used.

Also, scrolling of the symbol array during display of the extra symbol being added to the symbol array allows the player to see which position of the symbol array the symbol has been added to. The player having seen which position of the symbol array the symbol has been added to can more easily predict whether or not the added symbol will be stop-displayed on the pay line, during the scroll-display of the symbol array. As a result, it is possible to further raise the player's expectations generated by the addition of the symbol.

Further, when display of the extra symbol being added to the symbol array is conducted, the symbol array is scrolled in the direction opposite to the direction in the normal game. Accordingly, it is possible to make the player notice that the scroll-display during the display of the extra symbol being added to the symbol array is not a part of a game but an effect to be produced when the symbol is added.

As thus described, when the predetermined condition has been satisfied in the normal game, the display of the extra symbol being added to the symbol array is conducted while the symbol array is being scrolled in the direction opposite to the direction in the normal game, so that it becomes possible to provide a more attractive game.

It is desirable that the slot machine further has the following configuration.

The processing (B) comprises displaying the extra symbol being added to the symbol array, while scrolling the symbol array in a direction opposite to the single direction at a speed lower than a speed of scroll-display in the processing (A), when the predetermined condition has been satisfied in the normal game executed in the processing (A).

According to the slot machine, the display of the extra symbol being added to the symbol array is conducted while the symbol array is being scrolled in the direction opposite to the single direction at a speed lower than a speed of scroll-display in the normal game. When the display of the extra symbol being added to the symbol array is conducted, the symbol array is scrolled at the speed lower than a speed of the scroll-display in the normal game, so that it becomes possible to make the player more certainly see which position of the symbol array the extra symbol has been added to.

It is desirable that the slot machine further has the following configuration.

The controller is further programmed to execute the processing of (C) displaying the number of added extra symbols, while displaying the extra symbol being added to the symbol array in the processing (B).

According to the slot machine, since the number of added extra symbols is displayed during the display of the extra symbol being added to the symbol array, it is possible to gradually raise the player's expectations.

The present invention further provides a slot machine having the following configuration.

Namely, the slot machine comprises: a symbol display capable of scroll-displaying a symbol array that includes a plurality of symbols; and a controller. The controller is programmed to execute the processing of: (A) executing a normal game in which the symbol array is scroll-displayed in a single direction and then stop-displayed to the symbol display, and in which game media are paid out in an amount corresponding to the stop-displayed symbol or a combination of the stop-displayed symbols; and (B) displaying a wild symbol being added to the symbol array, while scrolling the symbol array in a direction opposite to the single direction, when a predetermined condition has been satisfied in the normal game executed in the processing (A), the wild symbol being substitutable for another symbol.

According to the slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the wild symbol being added to the symbol array, the wild symbol substitutable for another symbol, is executed while the symbol array is being scrolled in the direction opposite to the single direction. Since the wild symbol is added to the symbol array, it is possible to make the player have expectations for start of a game in which a new symbol array different from that of the normal game is used.

Also, scrolling of the symbol array during display of the wild symbol being added to the symbol array allows the player to see which position of the symbol array the wild symbol has been added to. The player having seen which position of the symbol array the wild symbol has been added to can more easily predict whether or not the added wild symbol will be stop-displayed on the pay line, during the scroll-display of the symbol array. As a result, it is possible to further raise the player's expectations generated by the addition of the wild symbol.

Further, when display of the wild symbol being added to the symbol array is conducted, the symbol array is scrolled in the direction opposite to the direction in the normal game. Accordingly, it is possible to make the player notice that the scroll-display during the display of the wild symbol being added to the symbol array is not a part of a game but an effect to be produced when the wild symbol is added.

As thus described, when the predetermined condition has been satisfied in the normal game, the display of the wild symbol being added to the symbol array is conducted while the symbol array is being scrolled in the direction opposite to the direction in the normal game, so that it becomes possible to provide a more attractive game.

It is desirable that the slot machine further has the following configuration.

The controller is further programmed to execute the processing of (C) executing a special game in which the symbol array including the wild symbol added in the processing (B) is scroll-displayed in the single direction and then stop-displayed to the symbol display, and in which game media are paid out in an amount corresponding to the stop-displayed symbol or a combination of the stop-displayed symbols.

According to the slot machine, the special game is executed in which the symbol array including the added wild symbol is scroll-displayed in the single direction and then stop-displayed, and in which game media are paid out in an amount corresponding to the stop-displayed symbol or a combination of the stop-displayed symbols. Since the special game is executed in which the wild symbol has been added and the player feels that there is a high possibility of winning a prize, it is possible to make the player have higher expectations.

The present invention further provides a control method of a slot machine having the following configuration.

Namely, the control method of a slot machine comprises the steps of: (A) executing a normal game in which a symbol array formed by a plurality of symbols is scroll-displayed in a single direction and then stop-displayed to a symbol display, and in which game media are paid out in an amount corresponding to the stop-displayed symbol or a combination of the stop-displayed symbols; and (B) displaying an extra symbol being added to the symbol array, while scrolling the symbol array in a direction opposite to the single direction, when a predetermined condition has been satisfied in the normal game executed in the step (A).

According to the control method of a slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the extra symbol being added to the symbol array is executed while the symbol array is being scrolled in the direction opposite to the single direction.

Since a symbol is added to the symbol array, it is possible to make the player have expectations for start of a game in which a new symbol array different from that of the normal game is used.

Also, scrolling of the symbol array during display of the extra symbol being added to the symbol array allows the player to see which position of the symbol array the symbol has been added to. The player having seen which position of the symbol array the symbol has been added to can more easily predict whether or not the added symbol will be stop-displayed on the pay line, during the scroll-display of the symbol array. As a result, it is possible to further raise the player's expectations generated by the addition of the symbol.

Further, when display of the extra symbol being added to the symbol array is conducted, the symbol array is scrolled in the direction opposite to the direction in the normal game. Accordingly, it is possible to make the player notice that the scroll-display during the display of the extra symbol being added to the symbol array is not a part of a game but an effect to be produced when the symbol is added.

As thus described, when the predetermined condition has been satisfied in the normal game, the display of the extra symbol being added to the symbol array is conducted while the symbol array is being scrolled in the direction opposite to the direction in the normal game, so that it becomes possible to provide a more attractive game.

It is desirable that the control method of a slot machine further has the following configuration.

The step (B) comprises displaying the extra symbol being added to the symbol array, while scrolling the symbol array in a direction opposite to the single direction at a speed lower than a speed of scroll-display in the step (A).

According to the control method of a slot machine, the display of the extra symbol being added to the symbol array is conducted while the symbol array is being scrolled in the direction opposite to the single direction at a speed lower than a speed of scroll-display in the normal game. When the display of the extra symbol being added to the symbol array is conducted, the symbol array is scrolled at the speed lower than a speed of the scroll-display in the normal game, so that it becomes possible to make the player more certainly see which position of the symbol array the extra symbol has been added to.

It is desirable that the control method of a slot machine further has the following configuration.

The control method further comprises the step of (C) displaying the number of added extra symbols, while displaying the extra symbol being added to the symbol array in the step (B).

According to the control method of a slot machine, since the number of added extra symbols is displayed during the display of the extra symbol being added to the symbol array, it is possible to gradually raise the player expectations.

The present invention further provides a control method of a slot machine having the following configuration.

Namely, the control method of a slot machine comprises the steps of: (A) executing a normal game in which a symbol array formed by a plurality of symbols is scroll-displayed in a single direction and then stop-displayed to a symbol display, and in which game media are paid out in an amount corresponding to the stop-displayed symbol or a combination of the stop-displayed symbols; and (B) displaying a wild symbol being added to the symbol array, while scrolling the symbol array in a direction opposite to the single direction, when a predetermined condition has been satisfied in the normal game executed in the step (A), the wild symbol being substitutable for another symbol.

According to the control method of a slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the wild symbol being added to the symbol array, the wild symbol substitutable for another symbol, is executed while the symbol array is being scrolled in the direction opposite to the single direction. Since the wild symbol is added to the symbol array, it is possible to make the player have expectations for start of a game in which a new symbol array different from that of the normal game is used.

Also, scrolling of the symbol array during display of the wild symbol being added to the symbol array allows the player to see which position of the symbol array the wild symbol has been added to. The player having seen which position of the symbol array the wild symbol has been added to can more easily predict whether or not the added wild symbol will be stop-displayed on the pay line, during the scroll-display of the symbol array. As a result, it is possible to raise the player's expectations generated by the addition of the symbol.

Further, when display of the wild symbol being added to the symbol array is conducted, the symbol array is scrolled in the direction opposite to the direction in the normal game. Accordingly, it is possible to make the player notice that the scroll-display during the display of the wild symbol being added to the symbol array is not a part of a game but an effect to be produced when the wild symbol is added.

As thus described, when the predetermined condition has been satisfied in the normal game, the display of the wild symbol being added to the symbol array is conducted while the symbol array is being scrolled in the direction opposite to the direction in the normal game, so that it becomes possible to provide a more attractive game.

It is desirable that the control method of a slot machine further has the following configuration.

The method further comprises the step of (C) executing a special game in which the symbol array including the wild symbol added in the step (B) is scroll-displayed in the single direction and then stop-displayed to the symbol display, and in which game media are paid out in an amount corresponding to the stop-displayed symbol or a combination of the stop-displayed symbols.

According to the control method of a slot machine, the special game is executed in which the symbol array including the added wild symbol is scroll-displayed in the single direction and then stop-displayed, and in which game media are paid out in an amount corresponding to the stop-displayed symbol or a combination of the stop-displayed symbols. Since the special game is executed in which the wild symbol has been added and the player feels that there is a high possibility of winning a prize, it is possible to make the player have higher expectations.

The present invention provides a slot machine having the following configuration.

Namely, the slot machine comprises: a symbol display capable of scroll-displaying a symbol array that includes a plurality of symbols; an input device that allows a player to input an operation command; and a controller. The controller is programmed to execute the processing of: (A) executing a normal game in which the symbol array is scroll-displayed in a single direction and then stop-displayed to the symbol display, and in which game media are paid out in an amount corresponding to the stop-displayed symbol or a combination of the stop-displayed symbols; (B) displaying an extra symbol being added to the symbol array, while scrolling the symbol array in a direction opposite to the single direction, when a predetermined condition has been satisfied in the normal game executed in the processing (A); and (C) fast-forwarding through the display executed in the processing (B), when predetermined input has been made using the input device.

According to the slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the extra symbol being added to the symbol array is executed while the symbol array is being scrolled in the direction opposite to the single direction.

Since a symbol is added to the symbol array, it is possible to make the player have expectations for start of a game in which a new symbol array different from that of the normal game is used.

Also, scrolling of the symbol array during display of the extra symbol being added to the symbol array allows the player to see which position of the symbol array the symbol has been added to. The player having seen which position of the symbol array the symbol has been added to can more easily predict whether or not the added symbol will be stop-displayed on the pay line, during the scroll-display of the symbol array. As a result, it is possible to further raise the player's expectations generated by the addition of the symbol.

Further, when display of the extra symbol being added to the symbol array is conducted, the symbol array is scrolled in the direction opposite to the direction in the normal game. Accordingly, it is possible to make the player notice that the scroll-display during the display of the extra symbol being added to the symbol array is not a part of a game but an effect to be produced when the symbol is added.

When predetermined input has been made through the touch panel 69, display (effect) of the extra symbol being added to the symbol array is fast-forwarded. As a result, the player who wishes to play the next game rather than see the display of the symbols being added can fast-forward the display by making predetermined input using the touch panel 69.

As thus described, when the predetermined condition has been satisfied in the normal game, the display of the extra symbol being added to the symbol array is conducted while the symbol array is being scrolled in the direction opposite to the direction in the normal game; and when the predetermined input has been made through the input device, the display of the extra symbol being added to the symbol array is fast-forwarded. Consequently, it becomes possible to provide a more attractive game.

It is desirable that the slot machine further has the following configuration.

The processing (B) comprises displaying the extra symbol being added to the symbol array, while scrolling the symbol array in a direction opposite to the single direction at a speed lower than a speed of scroll-display in the processing (A).

According to the slot machine, the display of the extra symbol being added to the symbol array is conducted while the symbol array is being scrolled in the direction opposite to the single direction at a speed lower than a speed of scroll-display in the normal game. When the display of the extra symbol being added to the symbol array is conducted, the symbol array is scrolled at the speed lower than a speed of the scroll-display in the normal game, so that it becomes possible to make the player more certainly see which position of the symbol array the extra symbol has been added to.

The present invention further provides a slot machine having the following configuration.

Namely, the slot machine comprises: a symbol display capable of scroll-displaying a symbol array that includes a plurality of symbols; an input device that allows a player to input an operation command; and a controller. The controller is programmed to execute the processing of: (A) executing a normal game in which the symbol array is scroll-displayed in a single direction and then stop-displayed to the symbol display, and in which game media are paid out in an amount corresponding to the stop-displayed symbol or a combination of the stop-displayed symbols; (B) displaying a wild symbol being added to the symbol array, while scrolling the symbol array in a direction opposite to the single direction, when a predetermined condition has been satisfied in the normal game executed in the processing (A), the wild symbol being substitutable for another symbol; and (C) fast-forwarding through the display executed in the processing (B), when predetermined input has been made using the input device.

According to the slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the wild symbol being added to the symbol array, the wild symbol substitutable for another symbol, is executed while the symbol array is being scrolled in the direction opposite to the single direction. Since the wild symbol is added to the symbol array, it is possible to make the player have expectations for start of a game in which a new symbol array different from that of the normal game is used.

Also, scrolling of the symbol array during display of the wild symbol being added to the symbol array allows the player to see which position of the symbol array the wild symbol has been added to. The player having seen which position of the symbol array the wild symbol has been added to can more easily predict whether or not the added wild symbol will be stop-displayed on the pay line, during the scroll-display of the symbol array. As a result, it is possible to further raise the player's expectations generated by the addition of the wild symbol.

Further, when display of the wild symbol being added to the symbol array is conducted, the symbol array is scrolled in the direction opposite to the direction in the normal game. Accordingly, it is possible to make the player notice that the scroll-display during the display of the wild symbol being added to the symbol array is not a part of a game but an effect to be produced when the wild symbol is added.

When predetermined input has been made through the touch panel 69, display (effect) of the wild symbol being added to the symbol array is fast-forwarded. As a result, the player who wishes to play the next game rather than see the display of the wild symbols being added can fast-forward the display by making predetermined input using the touch panel 69.

As thus described, when the predetermined condition has been satisfied in the normal game, the display of the wild symbol being added to the symbol array is conducted while the symbol array is being scrolled in the direction opposite to the direction in the normal game; and when the predetermined input has been made through the input device, the display of the wild symbol being added to the symbol array is fast-forwarded. Consequently, it becomes possible to provide a more attractive game.

It is desirable that the slot machine further has the following configuration.

The controller is further programmed to execute the processing of (D) executing a special game in which the symbol array including the wild symbol added in the processing (B) is scroll-displayed in the single direction and then stop-displayed to the symbol display, and in which game media are paid out in an amount corresponding to the stop-displayed symbol or a combination of the stop-displayed symbols.

According to the slot machine, the special game is executed in which the symbol array including the added wild symbol is scroll-displayed in the single direction and then stop-displayed, and in which game media are paid out in an amount corresponding to the stop-displayed symbol or a combination of the stop-displayed symbols. Since the special game is executed in which the wild symbol has been added and the player feels that there is a high possibility of winning a prize, it is possible to make the player have higher expectations.

The present invention further provides a control method of a slot machine having the following configuration.

Namely, the control method of a slot machine comprises the steps of: (A) executing a normal game in which a symbol array including a plurality of symbols is scroll-displayed in a single direction and then stop-displayed to a symbol display, and in which game media are paid out in an amount corresponding to the stop-displayed symbol or a combination of the stop-displayed symbols; (B) displaying an extra symbol being added to the symbol array, while scrolling the symbol array in a direction opposite to the single direction, when a predetermined condition has been satisfied in the normal game executed in the step (A); and (C) fast-forwarding through the display executed in the step (B), when predetermined input has been made using an input device that allows a player to input an operation command.

According to the control method of a slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the extra symbol being added to the symbol array is executed while the symbol array is being scrolled in the direction opposite to the single direction.

Since a symbol is added to the symbol array, it is possible to make the player have expectations for start of a game in which a new symbol array different from that of the normal game is used.

Also, scrolling of the symbol array during display of the extra symbol being added to the symbol array allows the player to see which position of the symbol array the symbol has been added to. The player having seen which position of the symbol array the symbol has been added to can more easily predict whether or not the added symbol will be stop-displayed on the pay line, during the scroll-display of the symbol array. As a result, it is possible to further raise the player's expectations generated by the addition of the symbol.

Further, when display of the extra symbol being added to the symbol array is conducted, the symbol array is scrolled in the direction opposite to the direction in the normal game. Accordingly, it is possible to make the player notice that the scroll-display during the display of the extra symbol being added to the symbol array is not a part of a game but an effect to be produced when the symbol is added.

When predetermined input has been made through the touch panel 69, display (effect) of the extra symbol being added to the symbol array is fast-forwarded. As a result, the player who wishes to play the next game rather than see the display of the symbols being added can fast-forward the display by making predetermined input using the touch panel 69.

As thus described, when the predetermined condition has been satisfied in the normal game, the display of the extra symbol being added to the symbol array is conducted while the symbol array is being scrolled in the direction opposite to the direction in the normal game; and when the predetermined input has been made through the input device, the display of the extra symbol being added to the symbol array is fast-forwarded. Consequently, it becomes possible to provide a more attractive game.

It is desirable that the control method of a slot machine further has the following configuration.

The step (B) comprises displaying the extra symbol being added to the symbol array, while scrolling the symbol array in a direction opposite to the single direction at a speed lower than a speed of scroll-display in the step (A).

According to the control method of a slot machine, the display of the extra symbol being added to the symbol array is conducted while the symbol array is being scrolled in the direction opposite to the single direction at a speed lower than a speed of scroll-display in the normal game. When the display of the extra symbol being added to the symbol array is conducted, the symbol array is scrolled at the speed lower than a speed of the scroll-display in the normal game, so that it becomes possible to make the player more certainly see which position of the symbol array the extra symbol has been added to.

The present invention further provides a control method of a slot machine having the following configuration.

Namely, the control method of a slot machine comprises the steps of: (A) executing a normal game in which a symbol array including a plurality of symbols is scroll-displayed in a single direction and then stop-displayed to a symbol display, and in which game media are paid out in an amount corresponding to the stop-displayed symbol or a combination of the stop-displayed symbols; (B) displaying a wild symbol being added to the symbol array, while scrolling the symbol array in a direction opposite to the single direction, when a predetermined condition has been satisfied in the normal game executed in the step (A), the wild symbol being substitutable for another symbol; and (C) fast-forwarding through the display executed in the step (B), when predetermined input has been made through an input device that allows a player to input an operation command.

According to the control method of a slot machine, a normal game is executed in which the symbol array is scroll-displayed in the single direction and then stop-displayed, and in which game media are paid out in an amount corresponding to the stop-displayed symbol or a combination of the stop-displayed symbols. When the predetermined condition (e.g. a specific number or more of specific symbols being displayed on a pay line) has been satisfied in the normal game, display of the wild symbol being added to the symbol array, the wild symbol substitutable for another symbol, is executed while the symbol array is being scrolled in the direction opposite to the single direction. Since the wild symbol is added to the symbol array, it is possible to make the player have expectations for start of a game in which a new symbol array different from that of the normal game is used.

Also, scrolling of the symbol array during display of the wild symbol being added to the symbol array allows the player to see which position of the symbol array the wild symbol has been added to. The player having seen which position of the symbol array the wild symbol has been added to can more easily predict whether or not the added wild symbol will be stop-displayed on the pay line, during the scroll-display of the symbol array. As a result, it is possible to further raise the player's expectations generated by the addition of the wild symbol.

Further, when display of the wild symbol being added to the symbol array is conducted, the symbol array is scrolled in the direction opposite to the direction in the normal game. Accordingly, it is possible to make the player notice that the scroll-display during the display of the wild symbol being added to the symbol array is not a part of a game but an effect to be produced when the wild symbol is added.

When predetermined input has been made through the touch panel 69, display (effect) of the wild symbol being added to the symbol array is fast-forwarded. As a result, the player who wishes to play the next game rather than see the display of the wild symbols being added can fast-forward the display by making predetermined input using the touch panel 69.

As thus described, when the predetermined condition has been satisfied in the normal game, the display of the wild symbol being added to the symbol array is conducted while the symbol array is being scrolled in the direction opposite to the direction in the normal game; and when the predetermined input has been made through the input device, the display of the wild symbol being added to the symbol array is fast-forwarded. Consequently, it becomes possible to provide a more attractive game.

It is desirable that the control method of a slot machine further has the following configuration.

The method further comprises the step of (D) executing a special game in which the symbol array including the wild symbol added in the step (B) is scroll-displayed in the single direction and then stop-displayed to the symbol display, and in which game media are paid out in an amount corresponding to the stop-displayed symbol or a combination of the stop-displayed symbols.

According to the control method of a slot machine, the special game is executed in which the symbol array including the added wild symbol is scroll-displayed in the single direction and then stop-displayed, and in which game media are paid out in an amount corresponding to the stop-displayed symbol or a combination of the stop-displayed symbols. Since the special game is executed in which the wild symbol has been added and the player feels that there is a high possibility of winning a prize, it is possible to make the player have higher expectations.

BRIEF DESCRIPTIONS OF THE DRAWINGS

FIG. 5 is a view showing a symbol table for a normal game in the first embodiment.

FIG. 7 is a view showing a correspondence relationship among a kind and the number of symbols rearranged on a pay line, and an amount of payout in the first embodiment.

FIG. 12 is a view showing a number-of-games determination table in the first embodiment.

FIG. 15 is a view showing a table for determining the number of to-be-added wild symbols in the first embodiment.

FIG. 18 is a view showing a symbol-array determination table in the first embodiment.

FIG. 19 is a view showing a code-number determination table in the first embodiment.

FIG. 20A is an example of a symbol table for a feature game in the first embodiment.

FIG. 20B is an example of a symbol table for the feature game in the first embodiment.

FIG. 28 is a view showing a symbol table for a normal game in the second embodiment.

FIG. 30 is a view showing a correspondence relationship among a kind and the number of symbols rearranged on a pay line, and an amount of payout in the second embodiment.

FIG. 35 is a view showing a number-of-games determination table in the second embodiment.

FIG. 38 is a view showing a table for determining the number of to-be-added wild symbols in the second embodiment.

FIG. 41 is a view showing a symbol-array determination table in the second embodiment.

FIG. 42 is a view showing a code-number determination table in the second embodiment.

FIG. 43A is an example of a symbol table for a feature game in the second embodiment.

FIG. 43B is an example of a symbol table for the feature game in the second embodiment.

DESCRIPTION OF THE EMBODIMENTS

First Embodiment

A first embodiment of the present invention is described based on the drawings.

First, with reference to FIGS. 1A to 1G, there will be given a general description of the present embodiment.

FIGS. 1A to 1G are views each showing a symbol matrix according to a first embodiment of the present invention.

A symbol matrix SM shown in FIG. 1 is displayed to a lower image display panel 16 (FIG. 2) provided in a slot machine 10 according to the present embodiment. A total of 20 symbols (four rows×five columns) are displayed to the symbol matrix SM, and a part of one of symbol arrays L (L1, L2, L3, L4 and L5) which are described later with reference to FIG. 5 is displayed to each column.

It is to be noted that, although the slot machine 10 is a stand-alone type slot machine not connected to a network, the present invention is applicable to a slot machine connected to a network.

A normal game is executed on the slot machine 10 on condition that a coin has been betted. In the normal game, the symbol arrays L are scroll-displayed from the top to the bottom and stop-displayed after a certain period of time has elapsed. When the symbols stop-displayed on a pay line (see FIG. 6) form a predetermined combination, a previously defined number of coins are paid out (see FIG. 7). Further, when three or more feature symbols have been displayed on the pay line, a special game is generated (see FIG. 7).

When the special game has been generated, a wild symbol is first added to the symbol array.

Here, effects at the time of addition of a wild symbol are described.

Figure 1A:
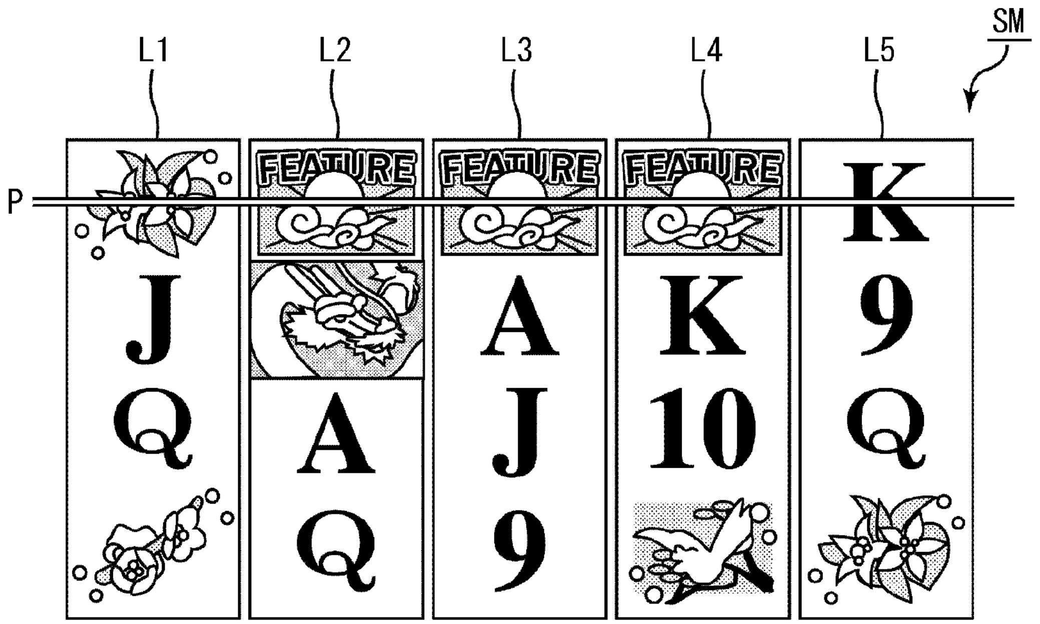
FIG. 1A is a view showing a symbol matrix according to a first embodiment of the present invention.

In FIG. 1A, three wild symbols are stop-displayed on a pay line P passing across the uppermost row. That is, when the symbols have been stop-displayed in a state shown in FIG. 1A, the special game is generated in the slot machine 10. It is to be noted that the slot machine 10 executes as the special game a feature game being a game (hereinafter also referred to as a "free game") that can be conducted without a coin (game medium) being betted.

Generation of the special game causes the symbol arrays L1 to L5 to be scroll-displayed from the bottom to the top, i.e. in a direction opposite to the scrolling direction in the normal game. The scroll-display in the opposite direction is conducted at a speed lower than a speed of the scroll-display in the normal game.

Figure 1B:
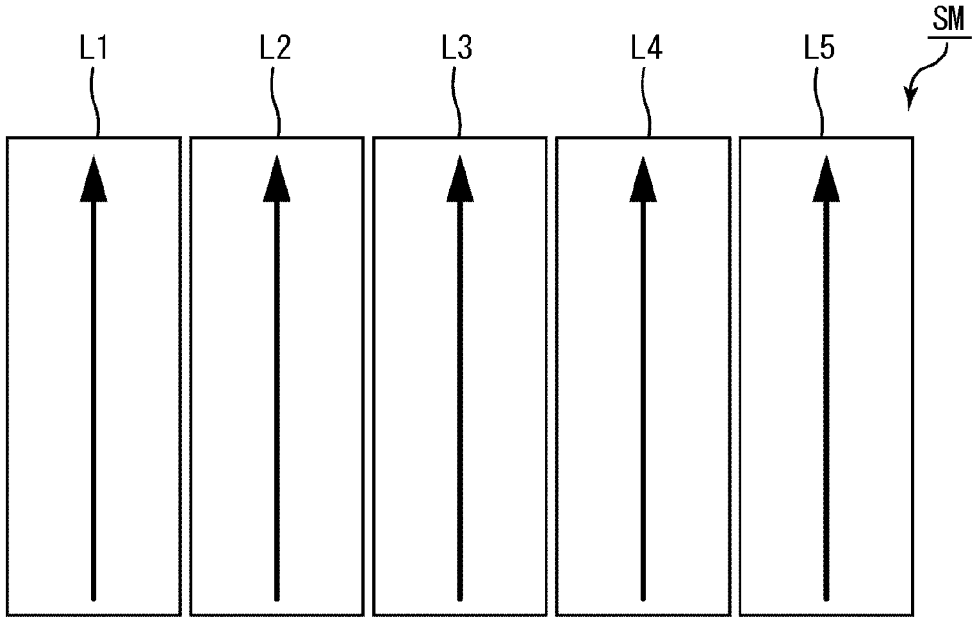
FIG. 1B is a view showing the symbol matrix according to the first embodiment of the present invention.
Figure 1C:
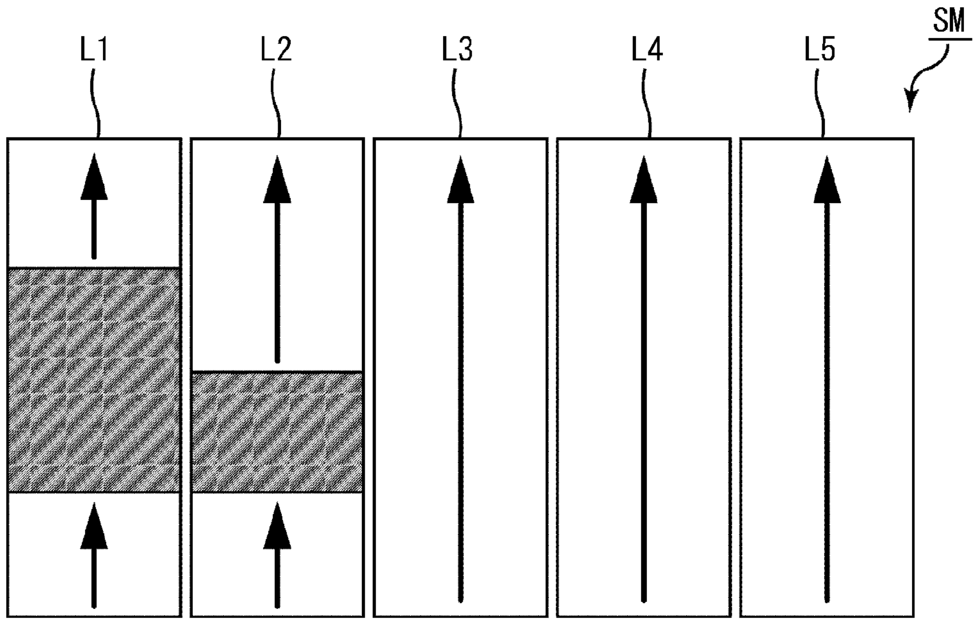
FIG. 1C is a view showing the symbol matrix according to the first embodiment of the present invention.

Thereafter, display of the symbol arrays L being divided is conducted as shown in FIG. 1C. FIG. 1C shows the state in which the symbol array L1 and the symbol array L2 each are divided.

Figure 1D:
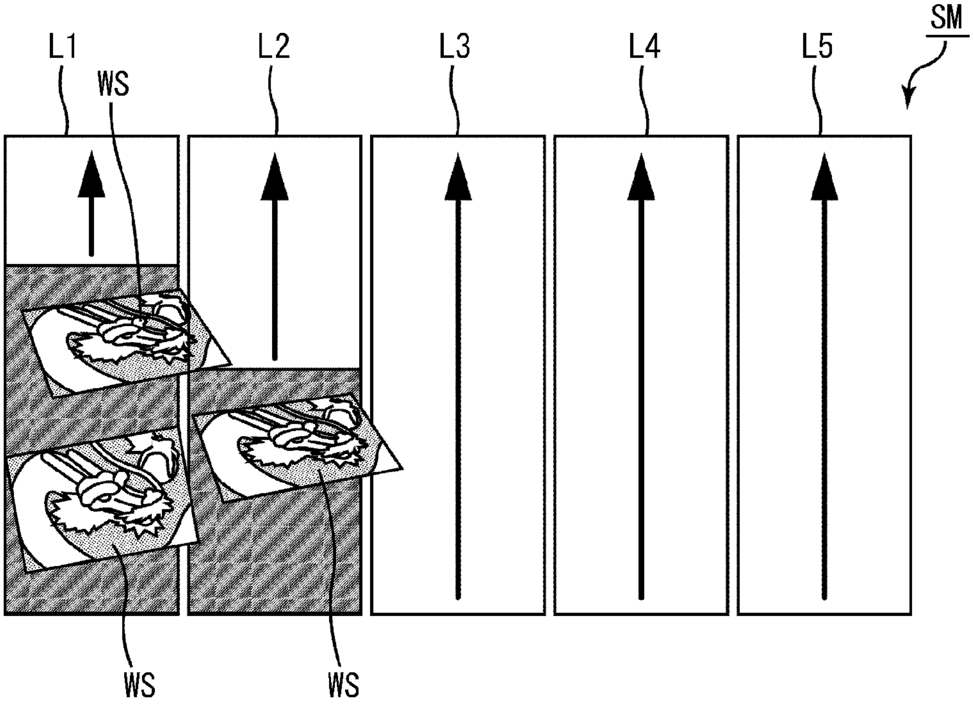
FIG. 1D is a view showing the symbol matrix according to the first embodiment of the present invention.
Figure 1E:
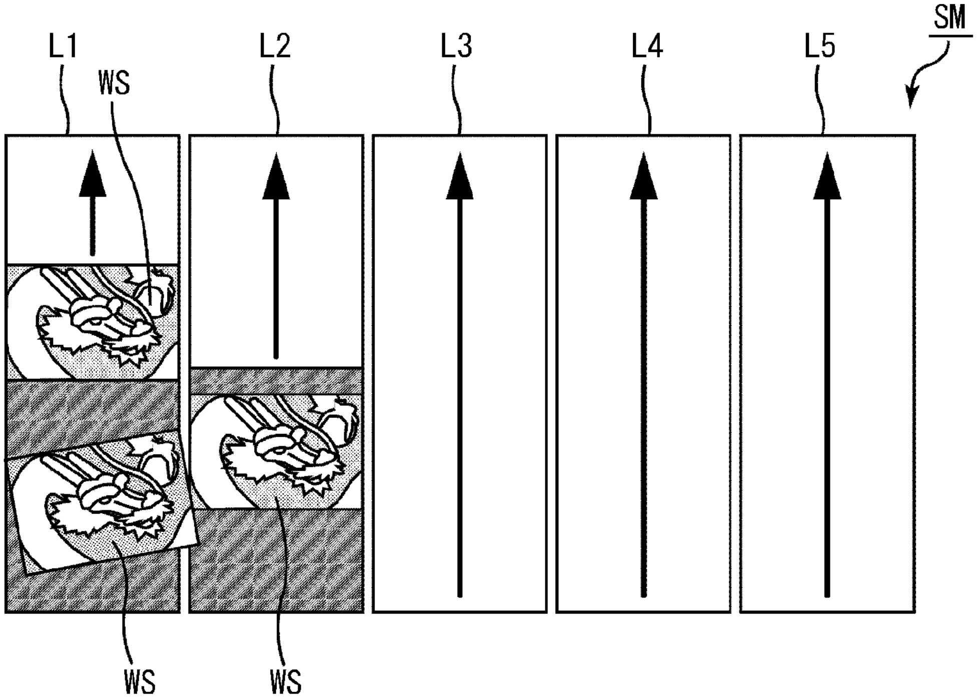
FIG. 1E is a view showing the symbol matrix according to the first embodiment of the present invention.
Figure 1F:
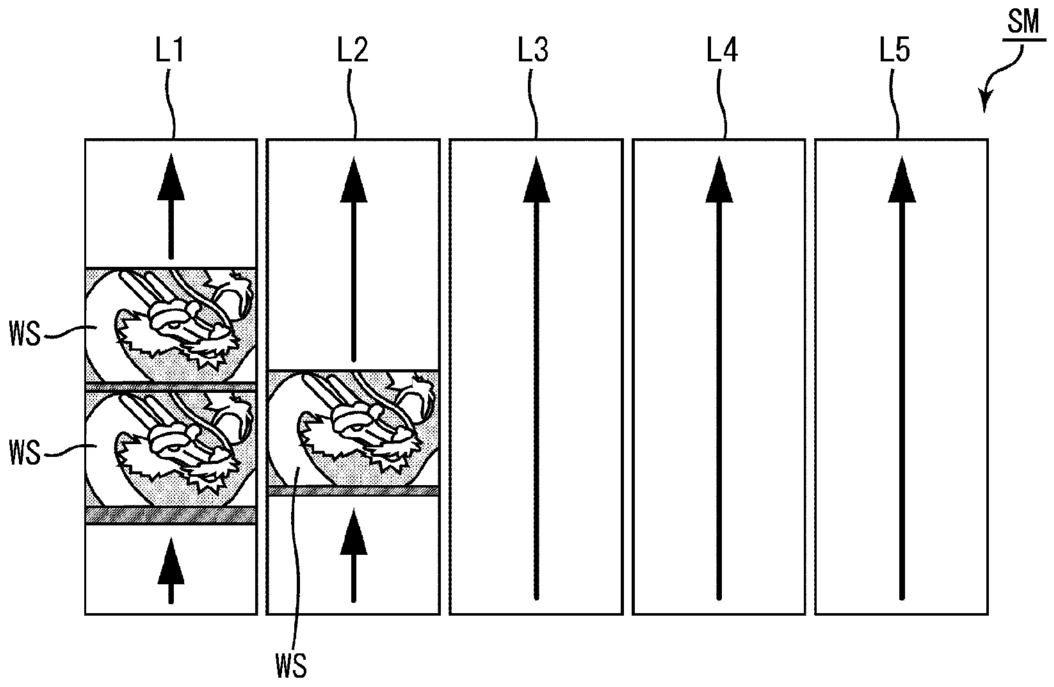
FIG. 1F is a view showing the symbol matrix according to the first embodiment of the present invention.
Figure 1G:
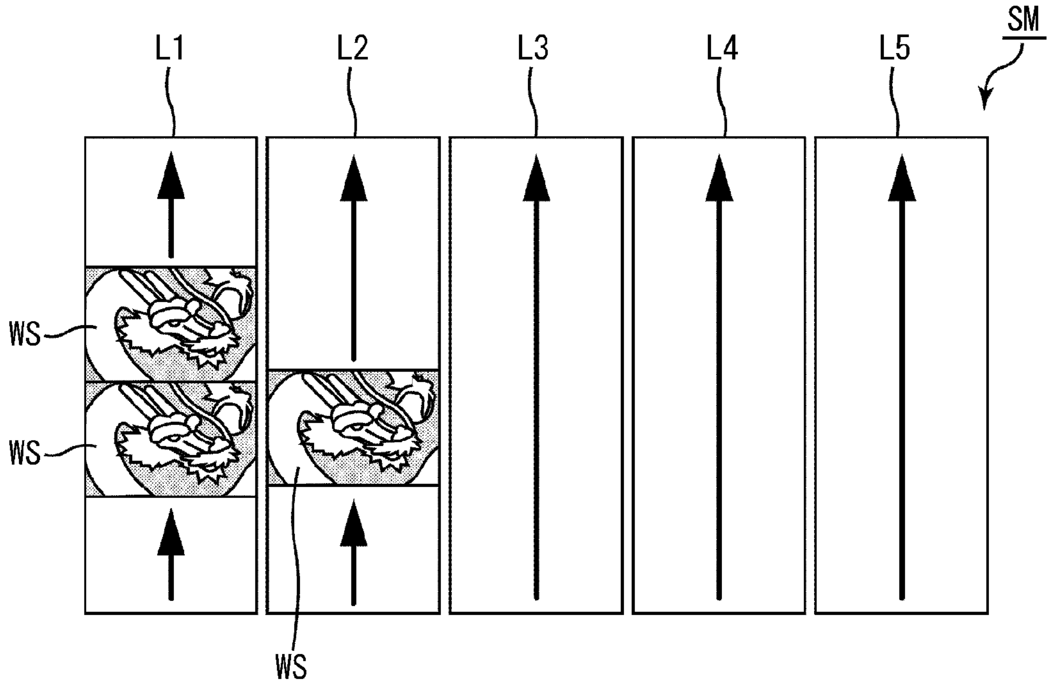
FIG. 1G is a view showing the symbol matrix according to the first embodiment of the present invention.

When the symbol array L has been divided, display of the wild symbols being added to the divided respect is conducted as shown in FIG. 1D and FIG. 1E. When addition of the wild symbols has been completed, display of the divided symbol arrays being connected is conducted as shown in FIG. 1F and FIG. 1G.

The added wild symbols correspond to the extra symbols in the present invention.

After the effect for addition of the wild symbols has been produced, the special game is executed on the slot machine 10. In the special game, the symbol arrays including the added wild symbols are scroll-displayed from the top to the bottom and stop-displayed after a certain period of time has elapsed. When the symbols stop-displayed on the pay line form a predetermined combination, a previously defined number of coins are paid out.

According to the slot machine 10, when three or more wild symbols have been stop-displayed on the pay line P in the normal game, display of the wild symbol being added to the symbol array L is executed while the symbol array L is being scrolled in the direction opposite to the direction in the normal game. Since the wild symbol is added to the symbol array L, it is possible to make the player have expectations for start of a game in which a new symbol array L different from that of the normal game is used.

Also, scrolling of the symbol array L during display of the wild symbol being added to the symbol array L allows the player to see which position of the symbol array L the wild symbol has been added to. The player having seen which position of the symbol array L the wild symbol has been added to can more easily predict whether or not the added wild symbol will be stop-displayed on the pay line P, during the scroll-display of the symbol array L. As a result, it is possible to further raise the player's expectations generated by the addition of the wild symbol.

Further, when display of the wild symbol being added to the symbol array L is conducted, the symbol array L is scrolled in the direction opposite to the direction in the normal game. Accordingly, it is possible to make the player notice that the scroll-display during the display of the wild symbol being added to the symbol array L is not a part of a game but an effect to be produced when the wild symbol is added.

As thus described, when three or more wild symbols have been stop-displayed on the pay line P, the display of the wild symbol being added to the symbol array L is conducted while the symbol array L is being scrolled in the direction opposite to the direction in the normal game, so that it becomes possible to provide a more attractive game.

Next, a configuration of the slot machine 10 is described.

Figure 2:
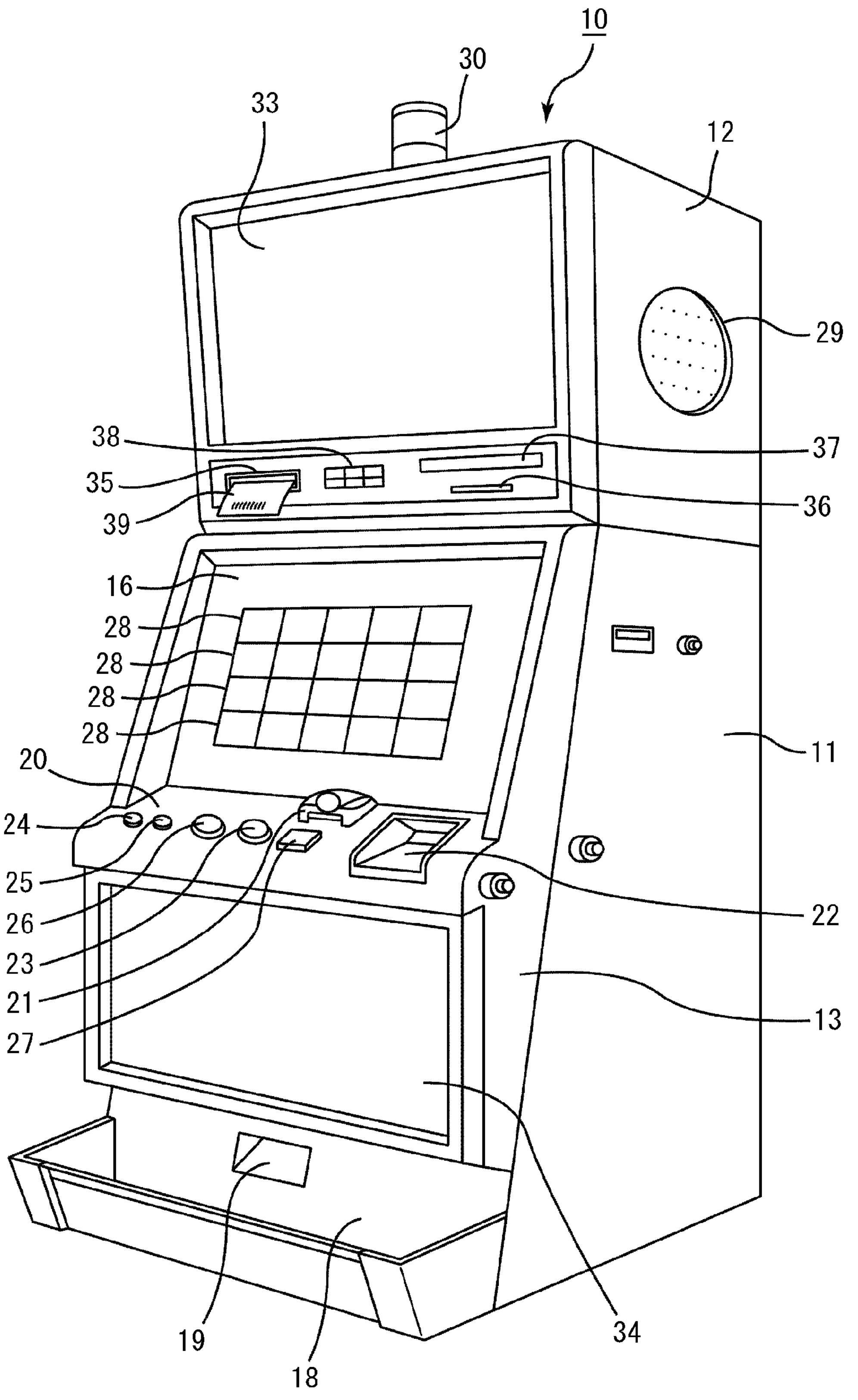
FIG. 2 is a perspective view showing an external view of a slot machine according to the first embodiment of the present invention.

FIG. 2 is a perspective view showing an external view of the slot machine according to the first embodiment of the present invention.

In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, there is provided the lower image display panel 16. The lower image display panel 16 includes a transparent liquid crystal panel which displays twenty display blocks 28 along five columns and four rows. A single symbol is displayed in each display block 28.

Further, although not shown, various images relating to an effect, in addition to the aforementioned images, are displayed to the lower image display panel 16.

It is to be noted that, although in the present embodiment a case is described in which the symbols are rearranged to the lower image display panel 16 (a case in which the symbol display of the present invention is the lower image display panel 16), the symbol display of the present invention is not particularly limited so long as it is capable of scroll-displaying the symbol arrays.

Moreover, although not shown, a touch panel 69 is provided at the front face of the lower image display panel 16. The player can operate the touch panel 69 to input a variety of commands.

When the touch panel 69 is operated, an input signal is transmitted from the touch panel 69 to a main CPU 41.

Below the lower image display panel 16, there are provided a control panel 20 including a plurality of buttons 23 to 27 with each of which a command according to game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26 and a maximum BET button 27. The start button 23 is for inputting a command to start scrolling of symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (500 coins in the present embodiment) out of credited coins.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front face of the main door 13, namely, below the control panel 20, there is provided a belly glass 34 on which a character or the like of the slot machine 10 is drawn.

An upper image display panel 33 is provided on the front surface of the top box 12. The upper image display panel 33 is provided with a liquid crystal panel and displays, for example, images indicative of introduction of contents of the game and explanation of the rule of the game.

Further, a speaker 29 is provided in the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

Figure 3:
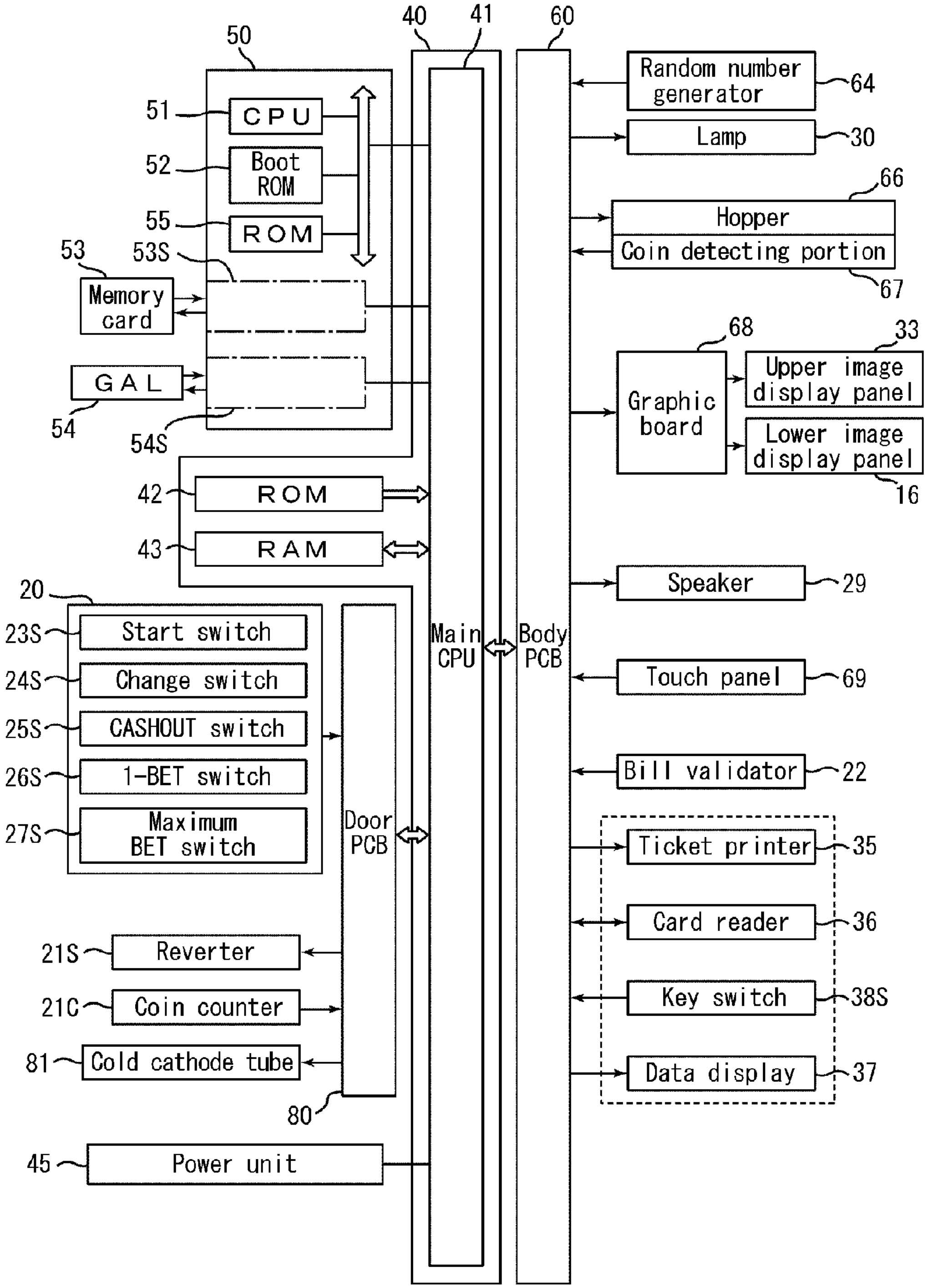
FIG. 3 is a block diagram showing an internal configuration of the slot machine shown in FIG. 2.

FIG. 3 is a block diagram showing an internal configuration of the slot machine shown in FIG. 2.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28.

Further, the card slot 53S is configured so as to allow the memory card 53 to be inserted thereinto or removed therefrom, and is connected to the mother board 40 by an IDE bus. Therefore, the type and the contents of the game conducted on the slot machine 10 can be changed by removing the memory card 53 from the card slot 53S, writing another game program into the memory card 53, and inserting the memory card 53 into the card slot 53S. The game program includes a program according to progress of the game. Further, the game program includes image data and sound data to be outputted during the game. The game program includes image data showing selection images 302, and the like.

Further, the game program includes: symbol-table data for a normal game, showing a symbol table for a normal game (cf. FIG. 5) which specifies the correspondence relationship among each symbol in each symbol array L, a code number and a random number range; odds data showing the correspondence relationship (cf. FIG. 7) among the kind and the number of the symbols rearranged on a pay line 300 (cf. FIG. 6) and the amount of payout; number-of-games determination table data showing a number-of-games determination table (cf. FIG. 12); table data for determining the number of to-be-added wild symbols which shows a table for determining the number of to-be-added wild symbols (cf. FIG. 15); symbol-array determination table data showing a symbol-array determination table (cf. FIG. 18); and code-number determination-table data showing a code-number determination table (cf. FIG. 19); and the like.

The CPU 51, the ROM 55 and the boot ROM 52 interconnected to one another by an internal bus are connected to the mother board 40 through a PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and is provided with the main CPU 41, a ROM (Read Only Memory) 42, and a RAM (Random Access Memory) 43. The mother board 40 corresponds to the controller in the present invention.

The ROM 42 comprises a memory device such as a flash memory, and stores a program such as a BIOS (Basic Input/Output System) executed by the main CPU 41, and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be a data rewritable one.

The RAM 43 stores data and a program such as a symbol-determination program, which are used at the time of operation of the main CPU 41. Further, the RAM 43 is capable of storing a game program.

Moreover, the RAM 43 stores data of the number of credits, the numbers of coin-ins and coin-outs in one game, and the like. Further, the RAM 43 stores symbol-table data for a feature game, showing a symbol table for a feature game (cf. FIGS. 20A and 20B), and data showing the number T of games.

Moreover, the mother board 40 is connected with a later-described body PCB (Printed Circuit Board) 60 and a door PCB 80 through respective USBs. Further, the mother board 40 is connected with a power supply unit 45.

The body PCB 60 and the door PCB 80 are connected with an instrument and a device that generate an input signal to be inputted into the main CPU 41, and an instrument and a device operations of which are controlled by a control signal outputted from the main CPU 41. The main CPU 41 executes the game program stored in the RAM 43 based on the input signal inputted into the main CPU 41, and thereby executes the predetermined arithmetic processing and stores the result thereof into the RAM 43, or transmits a control signal to each instrument and device as processing for controlling each instrument and device.

The body PCB 60 is connected with a lamp 30, a hopper 66, a coin detecting portion 67, a graphic board 68, the speaker 29, the touch panel 69, the bill validator 22, the ticket printer 35, the card reader 36, a key switch 38S, the data display 37, and a random number generator 64. The lamp 30 is lighted in a predetermined pattern based on control signals outputted from the main CPU 41.

The hopper 66 is installed inside the cabinet 11, and pays out a predetermined number of coins based on the control signal outputted from the main CPU 41, from a coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. In the respective display blocks 28 on the lower image display panel 16, symbols are displayed in a scrolling manner or in a stopped state. The number of credits stored in the RAM 43 is displayed to a number-of-credits display portion 400 of the lower image display panel 16. Further, the number of betted coins is displayed to a number-of-bets display portion 401 of the lower image display panel 16. Furthermore, the number of coin-outs is displayed to a payout display portion 402 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35 prints on a ticket a barcode as coded data of the number of credits stored in the RAM 43, a date, and an identification number of the slot machine 10, and the like, based on the control signal outputted from the main CPU 41, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The random number generator 64 generates a random number at a predetermined timing. It is to be noted that the range of the random number to be generated by the random number generator 64 is from 0 to 65535.

The door PCB 80 is connected with the control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 upon detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lighted up based on the control signal outputted from the main CPU 41.

Figure 4:
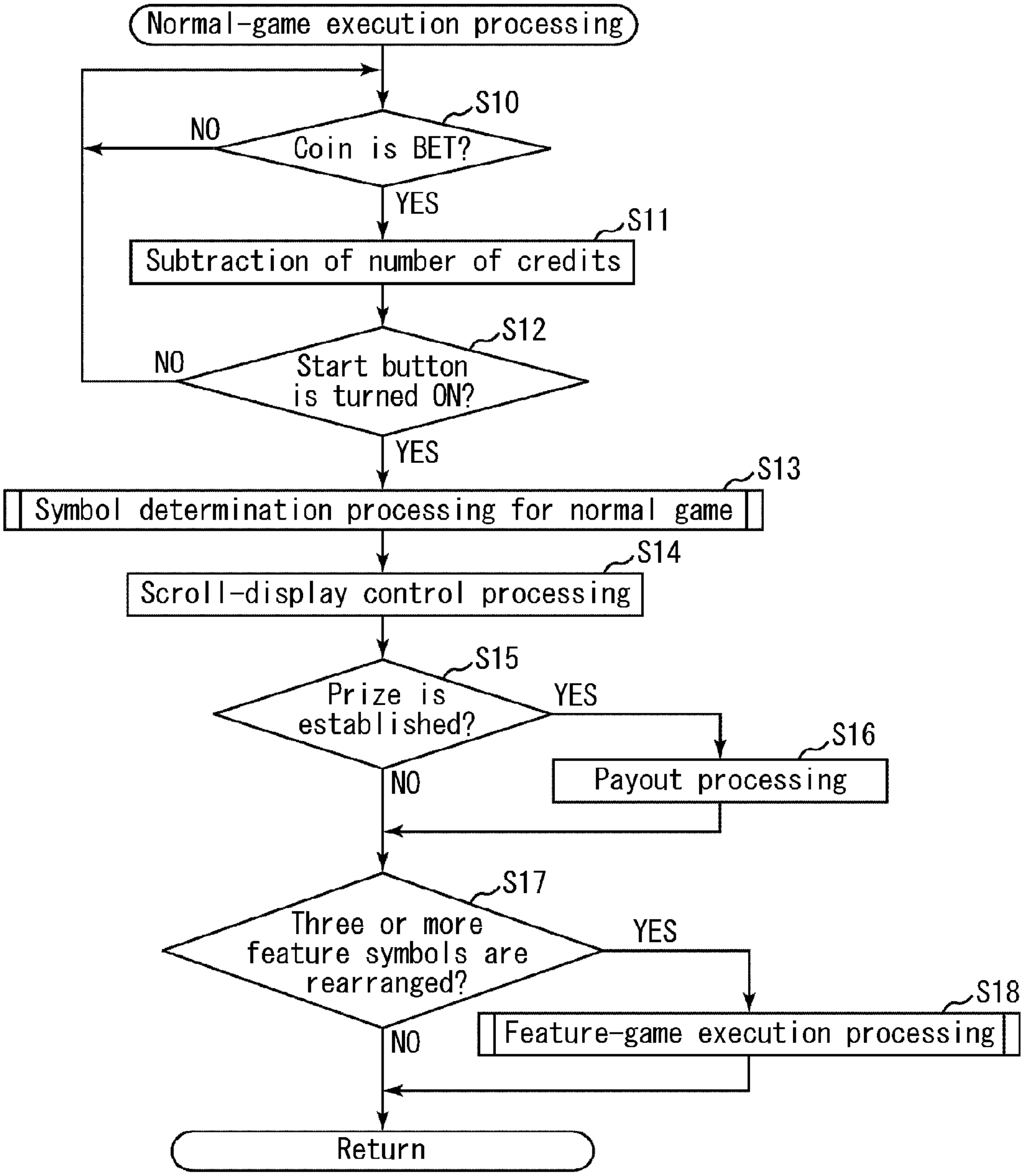
FIG. 4 is a flowchart showing normal-game execution processing in the first embodiment.

FIG. 4 is a flowchart showing normal-game execution processing in the first embodiment.

The game executed by the normal-game execution processing (except for the case where feature-game execution processing is executed in step S18) corresponds to the normal game in the present invention.

The game executed by the feature-game execution processing in step S18 corresponds to the special game in the present invention.

The normal game in the present invention only has to be a game in which symbol arrays are scroll-displayed in a single direction and then stop-displayed to a symbol display, and in which game media are paid out in an amount corresponding to the stop-displayed symbol or a combination of the stop-displayed symbols. That is, the normal game in the present invention is not limited to the game (except for the case where the feature-game execution processing is executed in step S18) executed by the normal-game execution processing shown in FIG. 4, and includes a game having other processing appropriately added thereto, and the like.

Also, the special game in the present invention only has to be a game in which symbol arrays including added symbols are scroll-displayed and then stop-displayed to a symbol display, and in which game media are paid out in an amount corresponding to the stop-displayed symbol or a combination of the stop-displayed symbols. That is, the special game in the present invention is not limited to the feature game (free game) executed in step S18, and may be, for example, a game that can be executed on condition that a game medium has been betted.

First, the main CPU 41 determines whether or not a coin has been betted (step S10). In this processing, the main CPU 41 determines whether or not it has received an input signal that is outputted from the 1-BET switch 26S when the 1-BET button 26 is operated, or an input signal that is outputted from the maximum BET switch 27S when the maximum BET button 27 is operated. When the main CPU 41 determines that the coin has not been betted, the processing is returned to step S10.

On the other hand, when determining in step S10 that the coin has been betted, the main CPU 41 conducts processing for making a subtraction from the number of credits stored in the RAM 43 according to the number of betted coins (step S11). It is to be noted that, when the number of coins to be betted is larger than the number of credits stored in the RAM 43, the main CPU 41 does not conduct the processing for making a subtraction from the number of credits stored in the RAM 43, and the processing is returned to step S10. Further, when the number of coins to be betted exceeds the upper limit of the number of coins that can be betted in one game (500 coins in the present embodiment), the main CPU 41 does not conduct the processing for making a subtraction from the number of credits stored in the RAM 43, and the processing is advanced to step S12.

Next, the main CPU 41 determines whether or not the start button 23 has been turned ON (step S12). In this processing, the main CPU 41 determines whether or not it has received an input signal that is outputted from the start switch 23S when the start button 23 is pressed.

When the main CPU 41 determines that the start button 23 has not been turned ON, the processing is returned to step S10.

It is to be noted that, when the start button 23 is not turned ON (e.g. when the start button 23 is not turned ON and a command to end the game is inputted), the main CPU 41 cancels a subtraction result in step S11.

On the other hand, when determining in step S12 that the start button 23 is turned ON, the main CPU 41 executes the symbol determination processing for a normal game (step S13).

FIG. 5 is a view showing the symbol table for a normal game in the first embodiment.

As shown in FIG. 5, the correspondence relationship among each symbol in each symbol array, the code number, and the random number range is specified. In FIG. 5, the first array (the symbol array L1) corresponds to the leftmost column of the display block 28.

In the symbol determination processing for a normal game, the main CPU 41 executes the symbol determination program stored in the RAM 43, to determine the code numbers at stopping the symbols. Specifically, the main CPU 41 acquires random number values, and then refers to the symbol table for a normal game so as to determine the code numbers corresponding to the ranges to which the respective acquired random number values belong as the code numbers of the symbols to be stop-displayed to the uppermost display blocks 28. The symbol determination program for a normal game is described in detail later using the drawing.

Next, in step S14, the main CPU 41 performs scroll-display control processing. This processing is processing for controlling the display so as to rearrange the symbols determined in step S13 after starting scroll of the symbols.

Next, the main CPU 41 determines whether or not a prize has been established (step S15). Here, establishment of the prize in the present embodiment is described.

Figure 6:
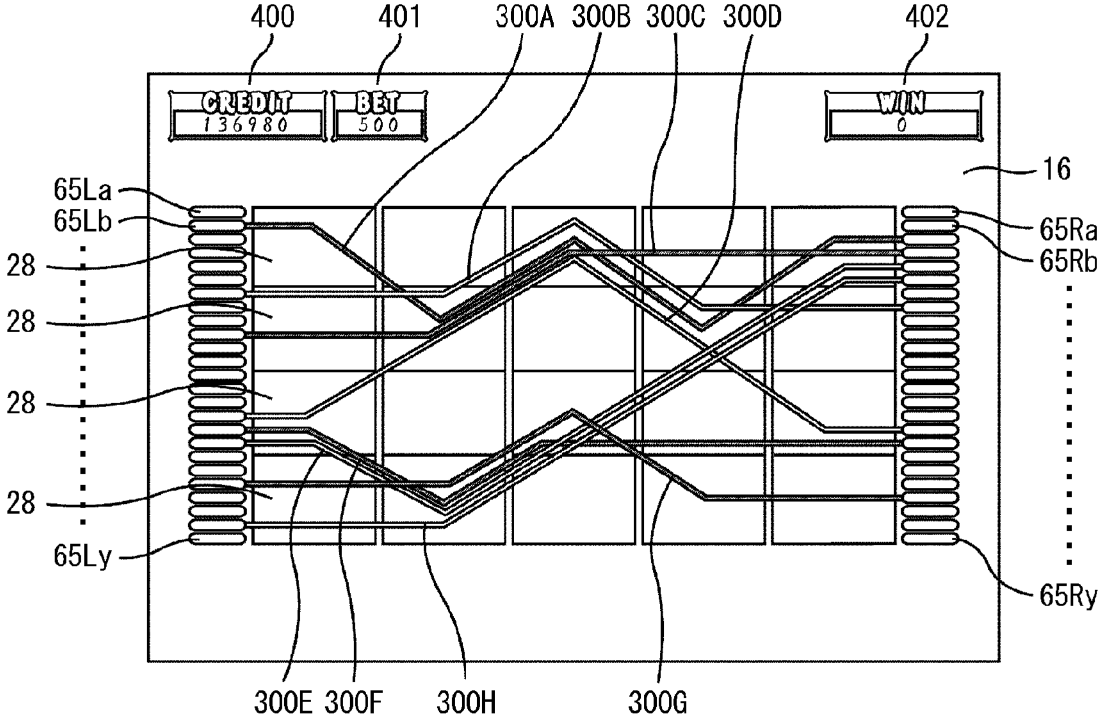
FIG. 6 is a view showing an exemplary image displayed to a lower image display panel provided in the slot machine according to the first embodiment of the present invention.

FIG. 6 is a view showing an exemplary image displayed to the lower image display panel provided in the slot machine according to the first embodiment of the present invention.

FIG. 7 is a view showing a correspondence relationship among the kind and the number of symbols rearranged on the pay line, and the amount of payout in the first embodiment. As shown in FIG. 6, on the left side of the display blocks 28, twenty five pay-line generating portions 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65Ls, 65Lt, 65Lu, 65Lv, 65Lw, 65Lx, 65Ly) are displayed.

Similarly, on the right side of the display blocks 28, twenty five pay-line generating portions 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs, 65Rt, 65Ru, 65Rv, 65Rw, 65Rx, 65Ry) are displayed.

Each of the pay-line generating portions 65L forms a pair with one of the pay-line generating portions 65R. The pay line 300 is previously defined as a line from each pay-line generating portion 65L to the pay-line generating portion 65R that is paired with this pay-line generating portion 65L. A pay line 300A connects the pay-line generating portion 65Lb and the pay-line generating portion 65Rc. A pay line 300B connects the pay-line generating portion 65Lg and the pay-line generating portion 65Rh. A pay line 300C connects the pay-line generating portion 65Lj and the pay-line generating portion 65Rd. A pay line 300D connects the pay-line generating portion 65Lp and the pay-line generating portion 65Rq. A pay line 300E connects the pay-line generating portion 65Lr and the pay-line generating portion 65Re. A pay line 300F connects the pay-line generating portion 65Lq and the pay-line generating portion 65Rr. A pay line 300G connects the pay-line generating portion 65Lu and the pay-line generating portion 65Rv. A pay line 300H connects the pay-line generating portion 65Lx and the pay-line generating portion 65Rf.

It is to be noted that only eight pay lines 300 are drawn in FIG. 6 for the sake of facilitating the explanation. However, in the present embodiment, twenty five pay lines 300 are defined. The pay line P shown in FIG. 1A corresponds to one of the pay lines 300.

It is to be noted that the number-of-credits display portion 400 showing the number of credited coins, the number-of-bets display portion 401 showing the number of betted coins, and the payout display portion 402 showing the number of coins to be paid out are displayed on the upper side of the lower image display panel 16.

Establishment of the prize in the present embodiment refers to a case where at least one combination of two or more symbols of the same kind out of "10", "J", "Q", "K", "FLOWER 1", "FLOWER 2", "BIRD" and "FISH" is rearranged on one of the pay lines 300. It is to be noted that "WILD" as the wild symbol is a symbol which can be substituted for another symbol. Namely, in a case where one symbol of "10" and one symbol of "WILD" are displayed on the pay line, it is regarded as display of two symbols of "10" on the pay line, and determined as winning of the prize.

In the processing of step S15, the main CPU 41 counts the number of symbols of each kind rearranged on each pay line 300 with respect to the symbols rearranged in step S14. The main CPU 41 then determines whether or not the number of counted symbols is equal to or more than two.

When determining that the prize has been established (step S15 in FIG. 4: YES), the main CPU 41 executes processing relating to the payout of coins (step S16). In the processing, the main CPU 41 determines the amount of payout based on the numbers of symbols rearranged on the pay line 300 with reference to the odds data stored in the RAM 43. The odds data is data indicative of the correspondence relationship between the number of symbols rearranged on the pay line 300 and the amount of payout (see FIG. 7). It is to be noted that the amount of payout is doubled along with each symbol of "WILD" displayed on the pay line 300 where the prize has been established. Namely, when three symbols of "WILD" are displayed on the pay line 300 where the prize has been established, the amount of payout is octuplicated.

In the present embodiment, the case is described where it is determined that the prize has been established when at least one combination of two or more symbols of the same kind out of "10", "J", "Q", "K", "FLOWER 1", "FLOWER 2", "BIRD" and "FISH" is rearranged on one of the pay lines 300. However, in the present invention, the pay line may not be provided, and it may be determined that a prize is established when at least one combination of two or more symbols of the same kind out of “10”, “J”, “Q”, “K”, “FLOWER 1”, “FLOWER 2”, “BIRD” and “FISH” is rearranged among symbols rearranged in the display blocks 28.

Figure 8A:
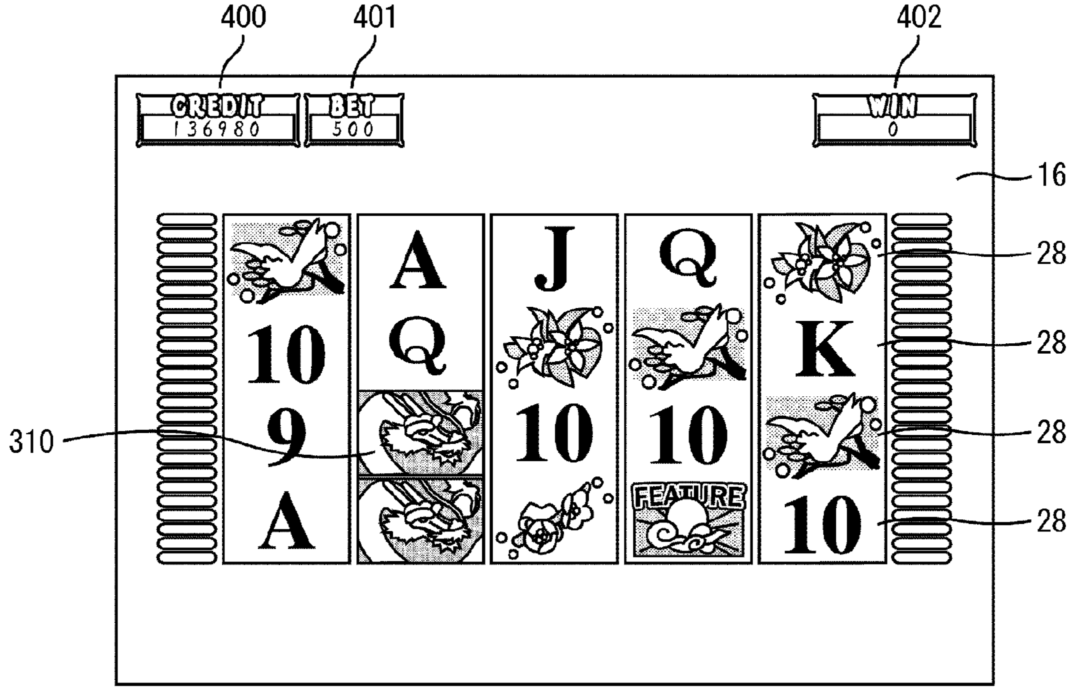
FIG. 8A is a view showing an exemplary image displayed to the lower image display panel provided in the slot machine according to the first embodiment of the present invention.

FIG. 8A is a view showing an exemplary image displayed to the lower image display panel provided in the slot machine according to the first embodiment of the present invention.

Figure 8B:
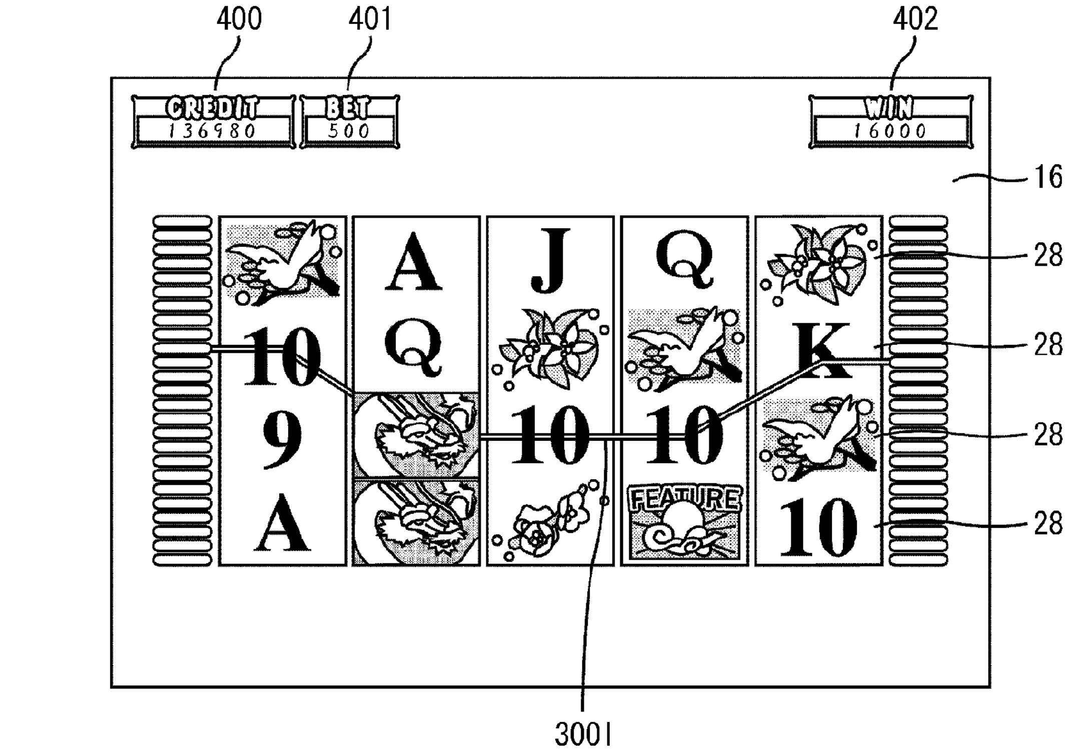
FIG. 8B is a view showing an exemplary image displayed to the lower image display panel provided in the slot machine according to the first embodiment of the present invention.

FIG. 8B is a view showing an exemplary image displayed to the lower image display panel provided in the slot machine according to the first embodiment of the present invention.

When the symbols shown in FIG. 8A have been rearranged as a result of the scroll-display control processing in step S14, a pay line 300I is displayed as shown in FIG. 8B. On the pay line 300I, three symbols of “10”, one symbol of “WILD”, and one symbol of “K” are rearranged.

In this case, it is regarded as rearrangement of four symbols of “10”, and then 3000 coins, obtained by multiplying 500 (the number of betted coins) by 6, are determined as an amount of payout. Further, it is regarded as rearrangement of two symbols of “K”, and then 5000 coins, obtained by multiplying 500 (the number of betted coins) by 10, are determined as an amount of payout. Moreover, since one symbol of “WILD” is displayed on the pay line 300I where the prize has been established, the amount of payout is to be doubled. Namely, 16000 coins, obtained by adding 5000 to 3000 to make 8000 and then multiplying 8000 by 2, are determined as the amount of payout.

In the case of accumulating coins, the main CPU 41 conducts processing for adding the number of credits corresponding to the determined amount of payout to the number of credits stored in the RAM 43. On the other hand, in the case of paying out coins, the main CPU 41 transmits a control signal to the hopper 66 in order to pay out coins in an amount corresponding to the determined amount of payout.

When determining in step S15 that a prize has not been established, or after executing the processing of step S16, the main CPU 41 determines whether or not three or more feature symbols have been rearranged (step S17). In this processing, the main CPU 41 determines whether or not three or more feature symbols have been rearranged in the display blocks 28, without considering the pay line 300.

When determining in step S17 that three or more feature symbols have been rearranged, the main CPU 41 executes the feature-game execution processing (step S18). In the feature-game execution processing, a free game with the number of wild symbols increased is executed. The feature-game execution processing is described in detail later using the drawing.

The rearrangement of three or more feature symbols corresponds to the predetermined condition in the present invention.

When determining in step S17 that three or more feature symbols are not rearranged or after executing the processing of step S18, the main CPU 41 completes the present subroutine.

Figure 9:
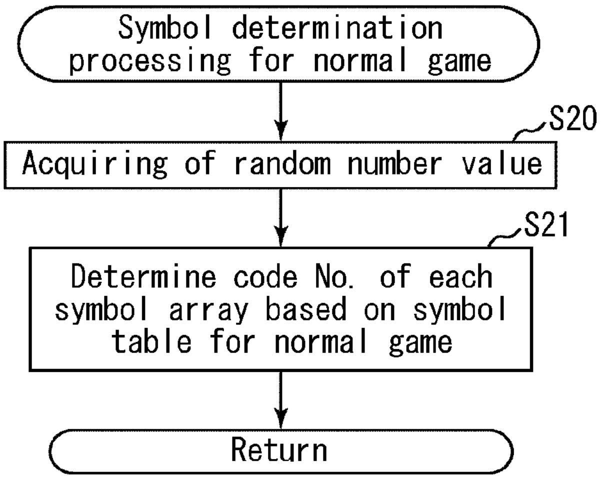
FIG. 9 is a flowchart showing a subroutine of symbol determination processing for a normal game in the first embodiment.

FIG. 9 is a flowchart showing a subroutine of the symbol determination processing for a normal game in the first embodiment.

This processing is processing performed by the main CPU 41 executing the symbol determination program stored in the RAM 43.

First, the main CPU 41 acquires random number values from the random number generator 64 (step S20). In this processing, the main CPU 41 acquires five random number values corresponding to the respective symbol arrays for the display blocks 28.

Next, based upon the acquired five random number values and the symbol table for a normal game, the main CPU 41 determines code numbers at stopping symbols (step S21). For example, “07” is determined as the code number of the first array when the random number value for the first array is 23035. It should be noted that the code numbers for symbol arrays correspond to the code numbers of symbols to be rearranged to the display blocks 28 in the first row out of the display blocks 28 that are put in four rows.

After executing the processing of step S21, the main CPU 41 completes the present subroutine.

In the present embodiment, the case has been described where the random number generator 64 is provided and a random number is extracted from the random number generator (a case of using a so-called hardware random number). However, in the present invention, a random number may be generated on the program (a case of using a so-called software random number).

Next, the feature-game execution processing is described with reference to FIG. 10.

Figure 10:
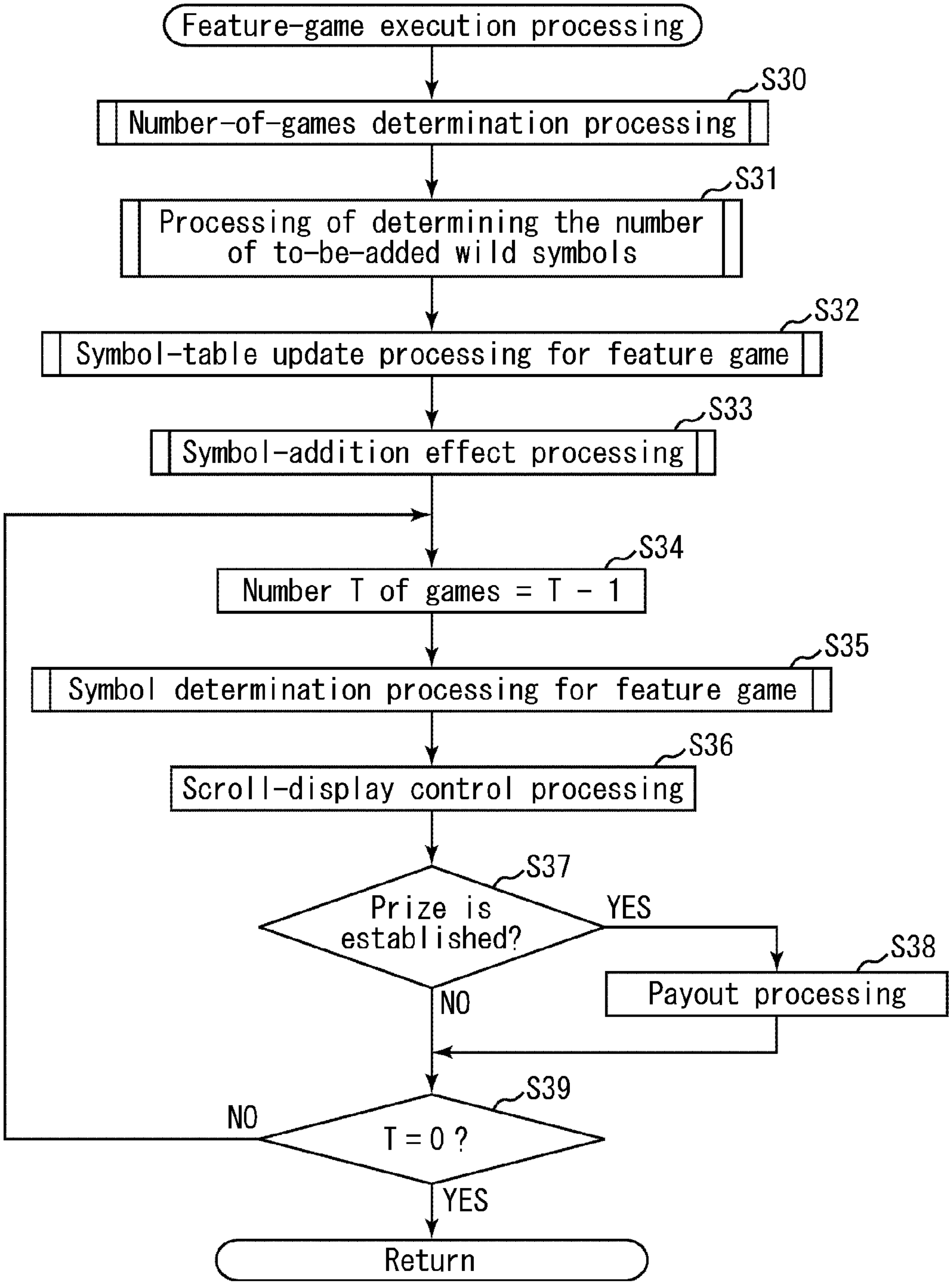
FIG. 10 is a flowchart showing a subroutine of feature-game execution processing in the first embodiment.

FIG. 10 is a flowchart showing a subroutine of the feature-game execution processing in the first embodiment.

A game executed by the feature-game execution processing corresponds to the special game in the present invention. It should be noted that the player can play the game without betting coins in the feature game.

First, the main CPU 41 executes number-of-games determination processing (step S30). In the number-of-games determination processing, the main CPU 41 determines the number T of games based upon a selection image 307 (cf. FIG. 13A) selected by the player, and stores the number T of games into the RAM 43. The number-of-games determination processing is described in detail later using the drawing.

Next, the main CPU 41 executes processing of determining the number of to-be-added wild symbols (step S31). In the processing of determining the number of to-be-added wild symbols, the main CPU 41 determines the number of to-be-added wild symbols, based upon the selection image 302 (cf. FIG. 16A) selected by the player. The processing of determining the number of to-be-added wild symbols is described in detail later using the drawing.

Next, the main CPU 41 executes symbol-table update processing for a feature game (step S32). In the symbol-table update processing for a feature game, the main CPU 41 updates the symbol table for the feature game, based upon the number of to-be-added wild symbols determined by the processing of determining the number of to-be-added wild symbols. The symbol-table update processing for a feature game is described in detail later using the drawing.

Next, in step S33, the main CPU 41 executes symbol-addition effect processing.

The symbol-addition effect processing is described later using FIG. 21.

Next, the main CPU 41 stores into the RAM 43 a numeric value obtained by subtracting 1 from the number T of games stored in the RAM 43, as a new number T of games (step S34).

Next, the main CPU 41 executes symbol determination processing for the feature game (step S35). In the symbol determination processing for the feature game, the main CPU 41 executes the symbol determination program stored in the RAM 43, to determine code numbers at stopping the symbols. Specifically, the main CPU 41 acquires random number values, and then refers to the symbol table for the feature game (cf. FIG. 20A and FIG. 20B) so as to determine the code numbers corresponding to the ranges to which the respective acquired random number values belong as the code numbers of the symbols to be stop-displayed to the uppermost display blocks 28. The symbol determination processing for the feature game is described in detail later using the drawing.

Next, in step S36, the main CPU 41 performs the scroll-display control processing. This processing is processing for controlling the display so as to rearrange the symbols determined in step S35 after starting the scrolling of the symbols. In this processing, the symbols including the added wild symbols are scroll-displayed.

Next, the main CPU 41 determines whether or not a prize has been established (step S37). As described above, establishment of the prize in the present embodiment refers to a case where at least one combination of two or more symbols of the same kind out of “10”, “J”, “Q”, “K”, “FLOWER 1”, “FLOWER 2”, “BIRD” and “FISH” is rearranged on one of the pay lines 300. It is to be noted that the symbol of “WILD” as the wild symbol is a symbol which can be substituted for another symbol. In the feature game, since the number of wild symbols has become larger than that in the normal game, the prize is more likely to be established compared to the normal game.

In the processing of step S37, the main CPU 41 counts the number of symbols of each kind rearranged on each pay line 300 with respect to the symbols rearranged in step S36. The main CPU 41 then determines whether or not the counted number is equal to or more than two.

When determining that the prize has been established, the main CPU 41 executes processing relating to the payout of coins (step S38). Since this processing is the same as the processing of step S16, the description thereof is omitted here.

Next, the main CPU 41 determines whether or not the number T of games stored in the RAM 43 is zero (step S39). When determining that the number T of games is not zero, the main CPU 41 returns the processing to step S34. On the other hand, when determining that the number T of games is zero, the main CPU 41 completes the present subroutine.

Figure 11:
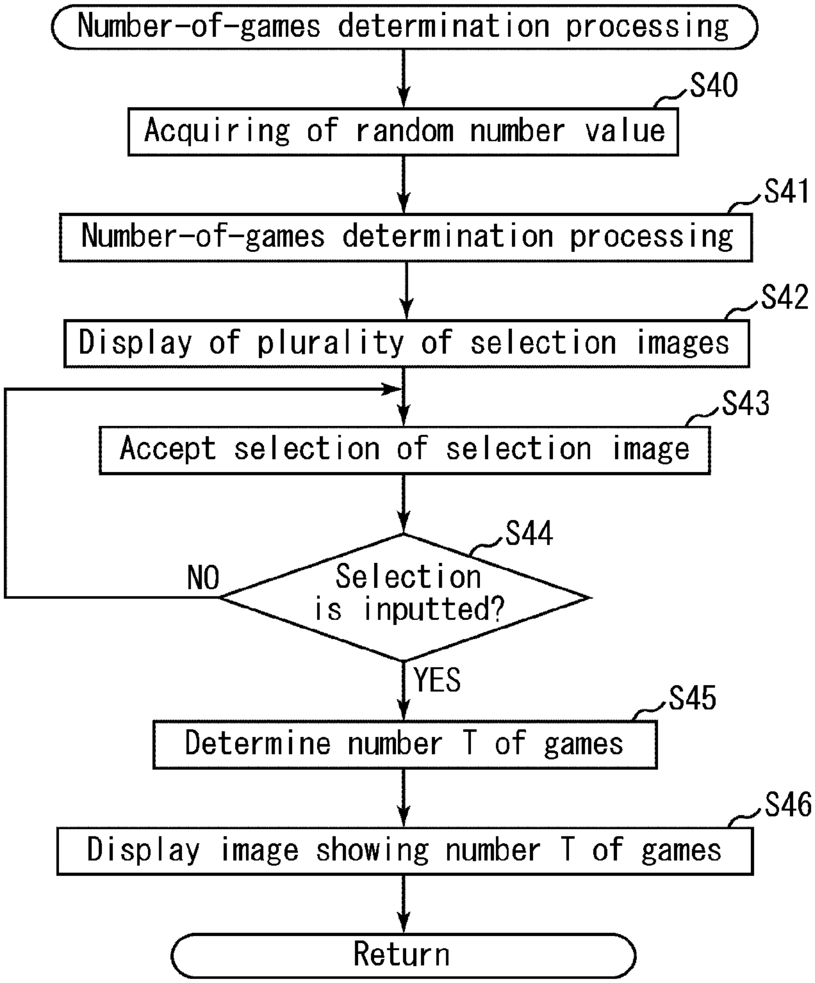
FIG. 11 is a flowchart showing a subroutine of number-of-games determination processing in the first embodiment.

FIG. 11 is a flowchart showing a subroutine of the number-of-games determination processing in the first embodiment.

First, the main CPU 41 acquires random number values from the random number generator 64 (step S40). In this processing, the main CPU 41 acquires five random number values corresponding to the respective selection images 307 (a selection image 307A, a selection image 307B, a selection image 307C, a selection image 307D, a selection image 307E (cf. FIG. 13A)).

Next, the main CPU 41 determines the number of games corresponding to each selection image 307 (step S41). In this processing, the main CPU 41 determines the number of games corresponding to each selection image 307, based upon the random number value acquired in step S40 and the number-of-games determination table shown in FIG. 12.

FIG. 12 is a view showing the number-of-games determination table in the first embodiment.

The number-of-games determination table shows the correspondence relationship between the number of games and the random number value.

For example, when random number values corresponding to the selection image 307A, the selection image 307B, the selection image 307C, the selection image 307D and the selection image 307E are respectively 12235, 23123, 62387, 32332 and 23423, the numbers of games of 5, 10, 30, 15 and 10 respectively correspond to the selection image 307A, the selection image 307B, the selection image 307C, the selection image 307D and the selection image 307E.

Next, the main CPU 41 displays the selection image 307A, the selection image 307B, the selection image 307C, the selection image 307D and the selection image 307E to the lower part of the lower image display panel 16 (step S42). The main CPU 41 then accepts the selection of the selection image 307 made by the player (step S43).

Figure 13A:
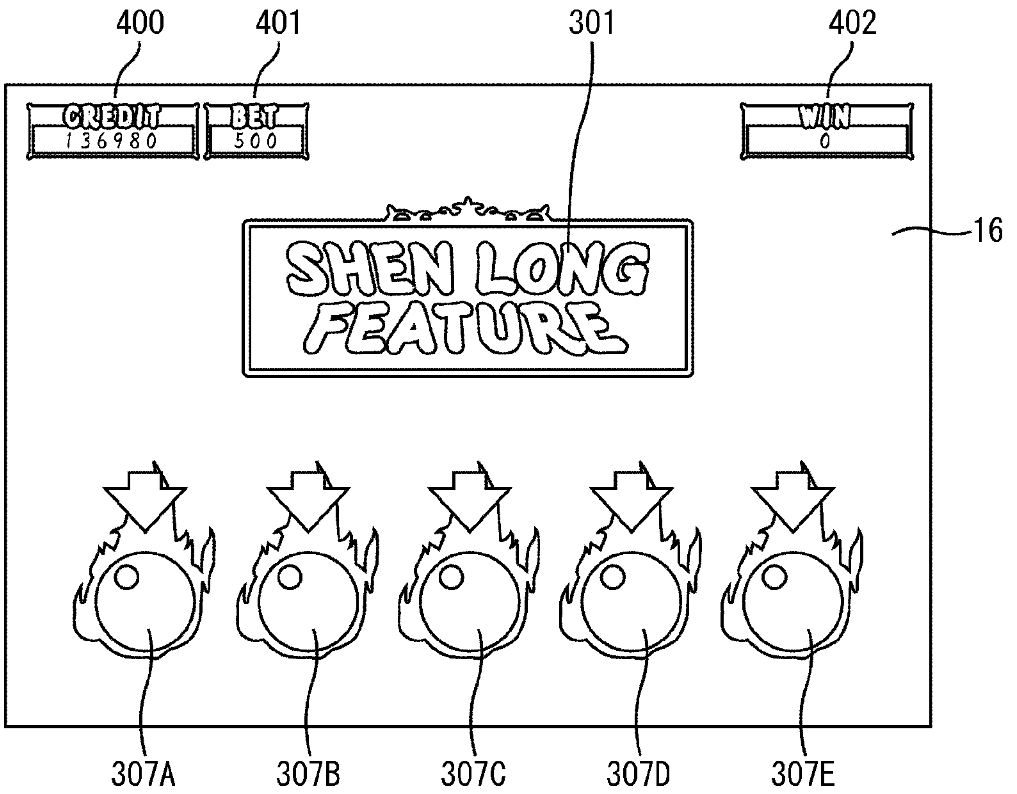
FIG. 13A is a view showing an exemplary image displayed to the lower image display panel provided in the slot machine according to the first embodiment of the present invention.

FIG. 13A is a view showing an exemplary image displayed to the lower image display panel provided in the slot machine according to the first embodiment of the present invention.

As shown in FIG. 13A, a feature-game start image 301 showing the start of the feature game is displayed to the center part of the lower image display panel 16.

To the lower part of the lower image display panel 16, five selection images 307 (the selection image 307A, the selection image 307B, the selection image 307C, the selection image 307D, the selection image 307E) are displayed. The player can select the selection image 307 by touching the touch panel 69 (cf. FIG. 3) provided on the lower image display panel 16 with his or her finger or the like.

Next, the main CPU 41 determines whether or not input for selecting the selection image 307 has been made (step S44). In this processing, the main CPU 41 determines whether or not it has received from the touch panel 69 an input signal for selecting the selection image 307. By the player touching a place in the vicinity of where the selection image 307A is displayed on the lower image display panel 16 with his or her finger or the like, the input signal for selecting the selection image 307A is transmitted from the touch panel 69 to the main CPU 41. When the main CPU 401 determines that the input for selecting the selection image 307 has not been made, the main CPU 41 returns the processing to step S43.

On the other hand, when determining in step S44 that the input for selecting the selection image 307 has been made, the main CPU 41 determines the number of games corresponding to the selection image 307 selected by the player, as the number T of games (step S45).

For example, when the selection image 307B is selected by the player in a case where the numbers of games of 5, 10, 30, 15 and 10 respectively correspond to the selection image 307A, the selection image 307B, the selection image 307C, the selection image 307D and the selection image 307E, then the number of games of 10 is determined as the number T of games. Next, the main CPU 41 displays a number-of-games determination image showing the number T of games of the feature game to the center part of the lower image display panel 16 (step S46).

Figure 13B:
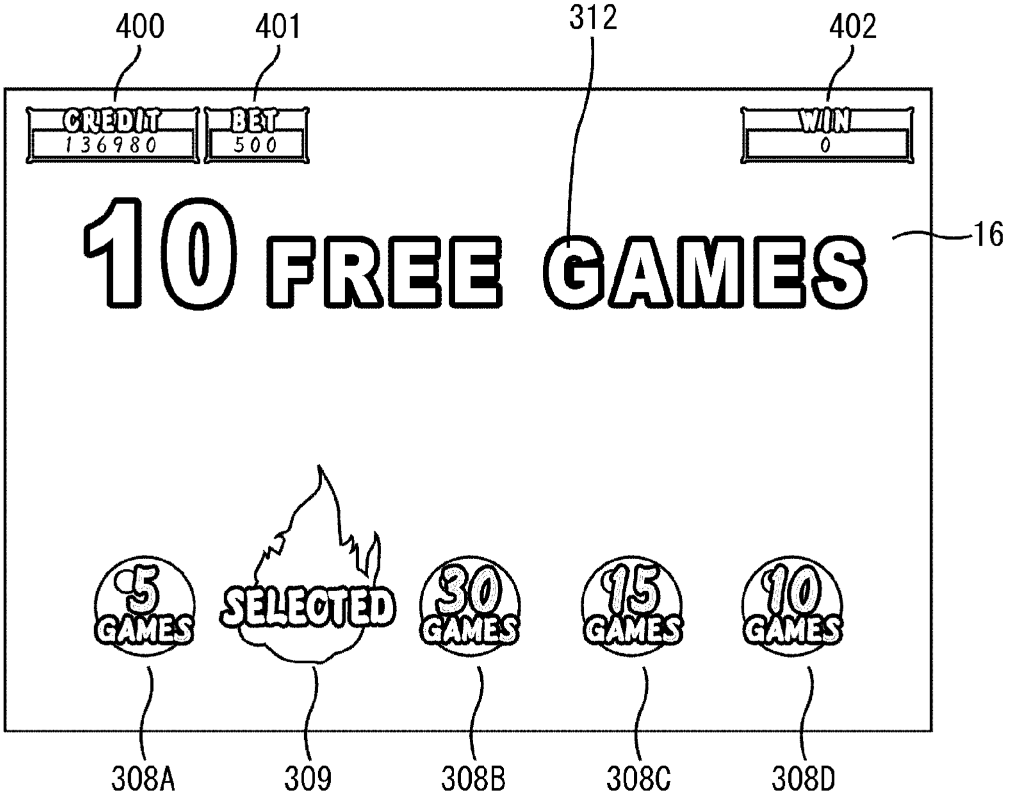
FIG. 13B is a view showing an exemplary image displayed to the lower image display panel provided in the slot machine according to the first embodiment of the present invention.

FIG. 13B is a view showing an exemplary image displayed to the lower image display panel provided in the slot machine according to the first embodiment of the present invention.

As shown in FIG. 13B, a number-of-games determination image 312 showing the number T of games of the feature game is displayed to the center part of the lower image display panel 16. In FIG. 13B, the number-of-games determination image 312 shows that the number T of games of the feature game is 10. Further, the number-of-games images 308 (a number-of-games image 308A, a number-of-games image 308B, a number-of-games image 308C, a number-of-games image 308D), each showing the number T of games of the case where another selection image 307 has been selected, are displayed to the lower part of the lower image display panel 16. The number-of-games image 308A, the number-of-games image 308B, the number-of-games image 308C and the number-of-games image 308D respectively show that the numbers T of games of the feature game would have been 5, 30, 15 and 10 if the selection image 307 displayed in the corresponding place had been selected by the player. Further, a selected image 309 shows that the selection image 307B having been displayed at this position has been selected by the player.

After executing the processing of step S46, the main CPU 41 completes the present subroutine.

In the present embodiment, the case has been described where the number of games corresponding to each selection image 307 is determined based upon the acquired random number value and the number-of-games determination table shown in FIG. 12. However, in the present invention, the number of games corresponding to each selection image 307 may be previously determined.

Figure 14:
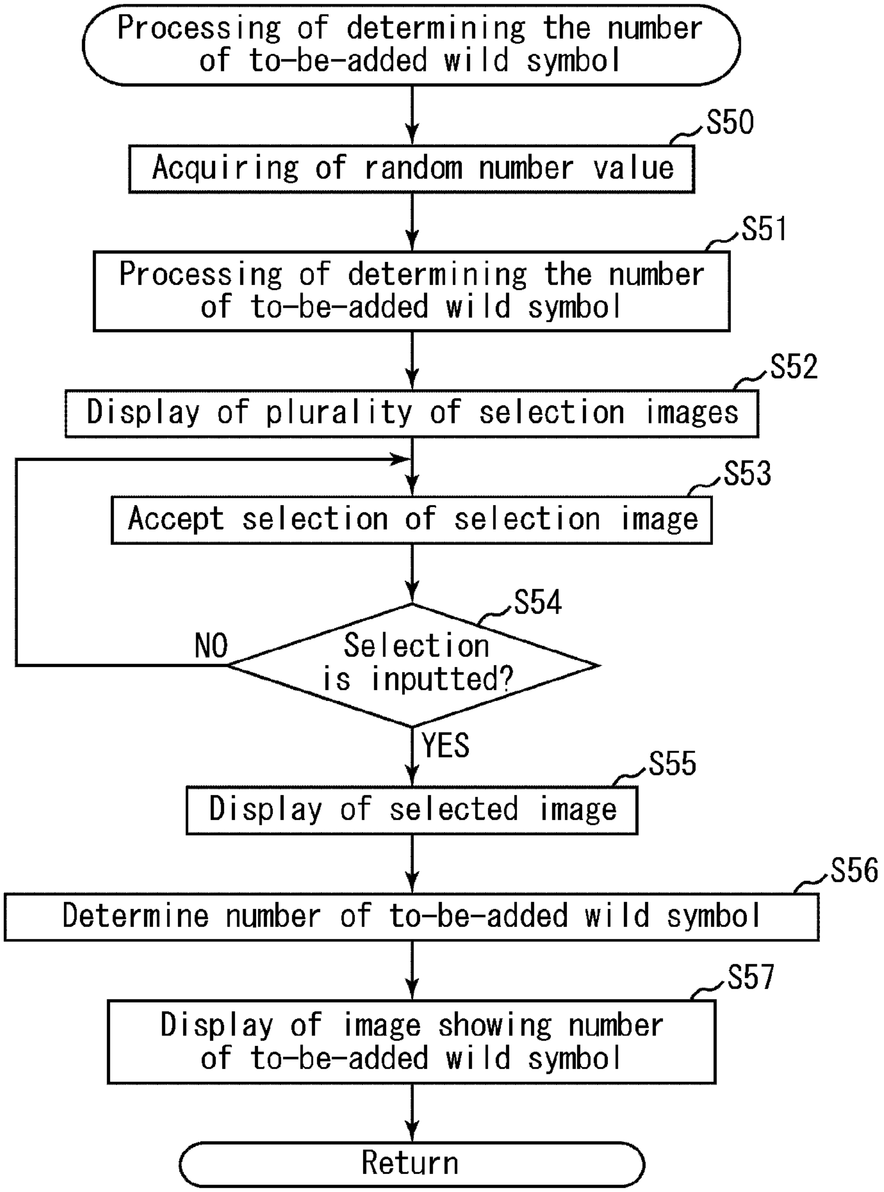
FIG. 14 is a flowchart showing a subroutine of processing of determining the number of to-be-added wild symbols in the first embodiment.

FIG. 14 is a flowchart showing a subroutine of the processing of determining the number of to-be-added wild symbols in the first embodiment.

First, the main CPU 41 acquires random number values from the random number generator 64 (step S50). In this processing, the main CPU 41 acquires five random number values corresponding to the respective selection images 302 (the selection image 302A, the selection image 302B, the selection image 302C, the selection image 302D and the selection image 302E (cf. FIG. 1A)).

Next, the main CPU 41 determines the number of to-be-added wild symbols which corresponds to each selection image 302 (step S51). In this processing, the main CPU 41 determines the number of to-be-added wild symbols which corresponds to each selection image 302, based upon the random number value obtained in step S50 and a table for determining the number of to-be-added wild symbols which is shown in FIG. 15.

FIG. 15 is a view showing the table for determining the number of to-be-added wild symbols in the first embodiment.

The table for determining the number of to-be-added wild symbols shows the correspondence relationship between the number of to-be-added wild symbols and the random number value.

For example, when random number values corresponding to the selection image 302A, the selection image 302B, the selection image 302C, the selection image 302D and the selection image 302E are respectively 17235, 63123, 32387, 22332, and 3423, then the numbers 20, 50, 30, and 10 respectively correspond to the selection image 302A, the selection image 302B, the selection image 302C, the selection image 302D and the selection image 302E, as the number of to-be-added wild symbols.

Next, the main CPU 41 displays the selection image 302A, the selection image 302B, the selection image 302C, the selection image 302D and the selection image 302E to the lower part of the lower image display panel 16 (step S52). The main CPU 41 then accepts the selection of the selection image 302 made by the player (step S53).

Figure 16A:
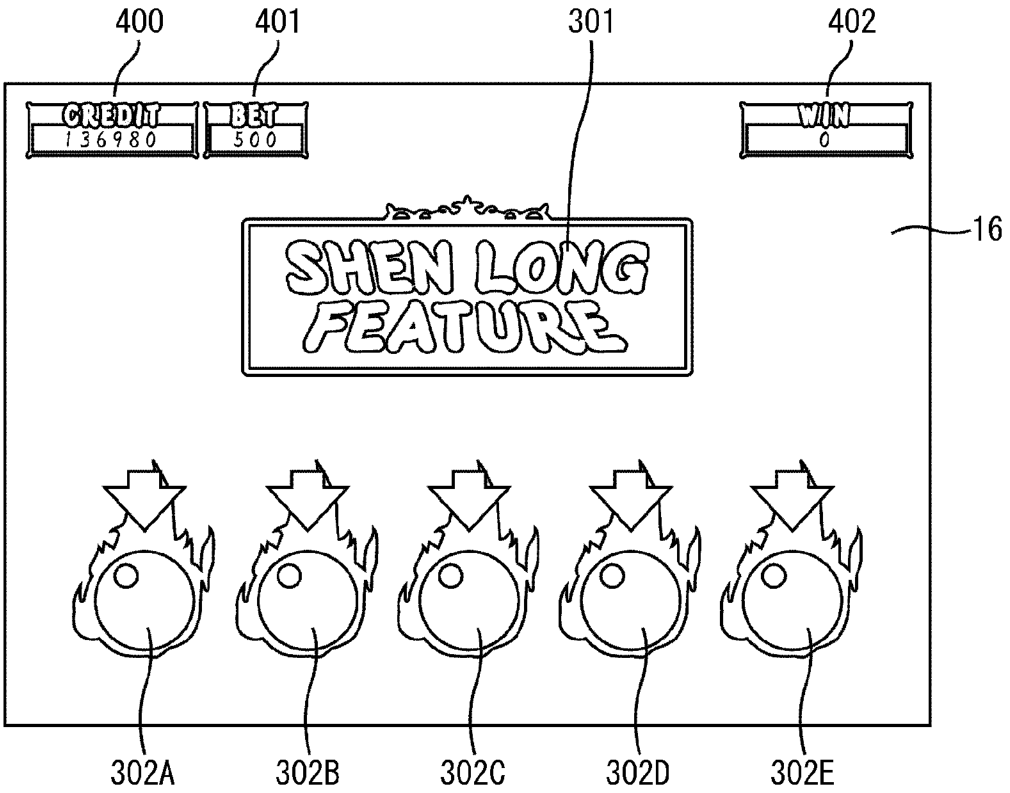
FIG. 16A is a view showing an exemplary image displayed to the lower image display panel provided in the slot machine according to the first embodiment of the present invention.

FIG. 16A is a view showing an exemplary image displayed to the lower image display panel provided in the slot machine according to the first embodiment of the present invention.

As shown in FIG. 16A, a feature-game start image 301 showing the start of the feature game is displayed to the center part of the lower image display panel 16.

To the lower part of the lower image display panel 16, the five selection images 302 (the selection image 302A, the selection image 302B, the selection image 302C, the selection image 302D, the selection image 302E) are displayed. The player can select the selection image 302 by touching the touch panel 69 provided on the lower image display panel 16 with his or her finger or the like.

Next, the main CPU 41 determines whether or not input for selecting the selection image 302 has been made (step S54). In this processing, the main CPU 41 determines whether or not it has received from the touch panel 69 an input signal for selecting the selection image 302. By the player touching a place in the vicinity of where the selection image 302E is displayed on the lower image display panel 16 by his or her finger or the like, the input signal for selecting the selection image 302E is transmitted from the touch panel 69 to the main CPU 41. When the main CPU 41 determines that the input for selecting the selection image 302 has not been made, the main CPU 41 returns the processing to step S53.

On the other hand, when determining in step S54 that the input for selecting the selection image 302 has been made, the main CPU 41 displays the selected image 304 (step S55).

Figure 16B:
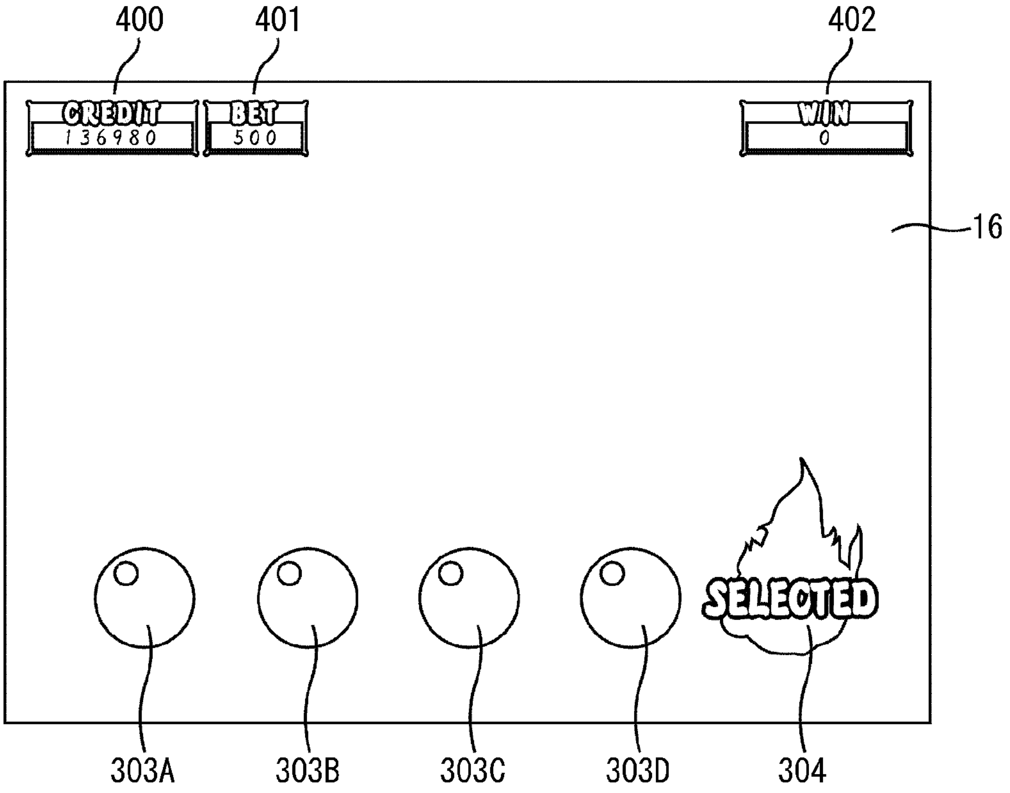
FIG. 16B is a view showing an exemplary image displayed to the lower image display panel provided in the slot machine according to the first embodiment of the present invention.

FIG. 16B is a view showing an exemplary image displayed to the lower image display panel provided in the slot machine according to the first embodiment of the present invention.

FIG. 16B is a view showing an exemplary image displayed to the lower image display panel in a case where the selection image 302E is selected by the player.

When the selection image 302E is selected by the player, as shown in FIG. 16B, the selected image 304 is displayed at the position where the selection image 302E has been displayed on the lower image display panel 16. Further, at the positions where the selection images 302 having not been selected had been displayed, non-selected images 303 (the non-selected image 303A, the non-selected image 303B, the non-selected image 303C, the non-selected image 303D) are displayed.

Next, the main CPU 41 determines the number of to-be-added wild symbols corresponding to the selection image 302 selected by the player, as the number of to-be-added wild symbols (step S56).

For example, when the selection image 302E is selected by the player in a case where the numbers of to-be-added wild symbols of 20, 50, 30, 20 and 10 respectively correspond to the selection image 302A, the selection image 302B, the selection image 302C, the selection image 302D and the selection image 302E, then 10 is determined as the number of to-be-added wild symbols. Next, the main CPU 41 displays a to-be-added number determination image 305, showing the number of to-be-added wild symbols, to the center part of the lower image display panel 16 (step S57).

Figure 16C:
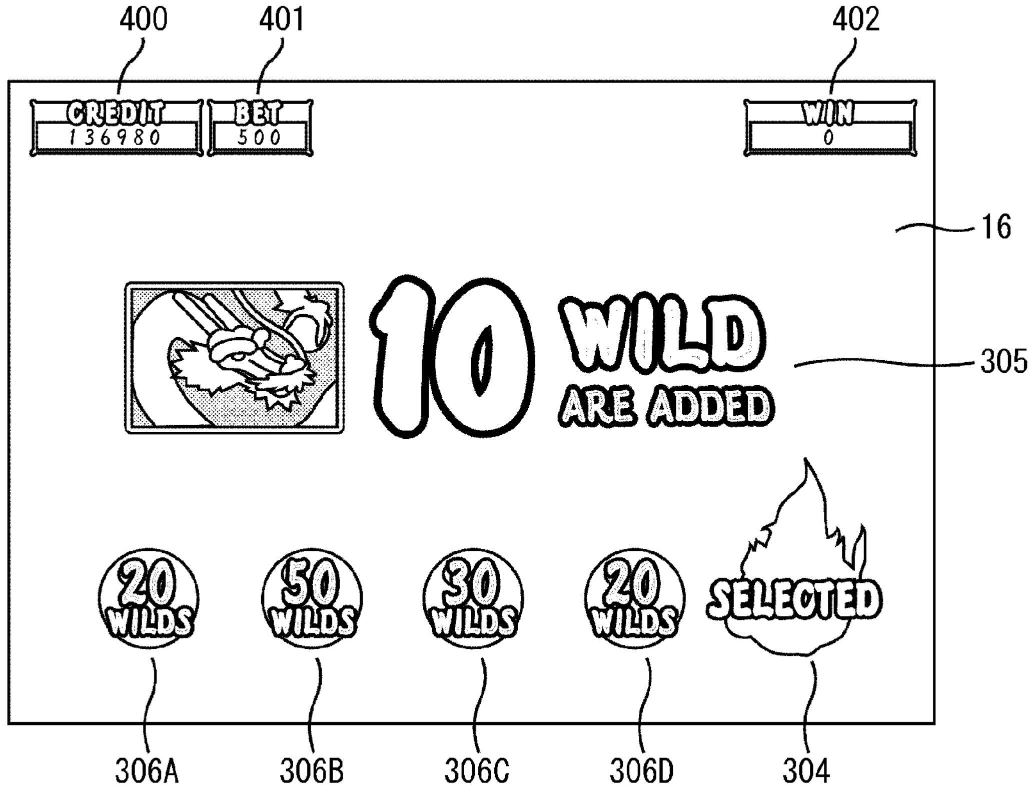
FIG. 16C is a view showing an exemplary image displayed to the lower image display panel provided in the slot machine according to the first embodiment of the present invention.

FIG. 16C is a view showing an exemplary image displayed to the lower image display panel provided in the slot machine according to the first embodiment of the present invention.

As shown in FIG. 16C, the to-be-added number determination image 305, showing the number of to-be-added wild symbols, is displayed to the center part of the lower image display panel 16. In FIG. 16C, the to-be-added number determination image 305 shows that the wild symbols will be increased by ten. Further, to-be-added number images 306 (a to-be-added number image 306A, a to-be-added number image 306B, a to-be-added number image 306C, a to-be-added number image 306D) are displayed to the lower part of the lower image display panel 16, each showing the number of the wild symbols which would have been added if another selection image 302 had been selected. The to-be-added number image 306A, the to-be-added number image 306B, the to-be-added number image 306C and the to-be-added number image 306D respectively show that the wild symbols would have been increased by 20, 50, 30 and 20, if the selection image 302 displayed in the corresponding place had been selected.

After executing the processing of step S57, the main CPU 41 completes the present subroutine.

In the present embodiment, the case has been described where the number of to-be-added wild symbols corresponding to each selection image 302 is determined based upon the acquired random number value and the table for determining the number of to-be-added wild symbols, which is shown in FIG. 15. However, in the present invention, the number of to-be-added wild symbols corresponding to each selection image 302 may be previously determined.

Figure 17:
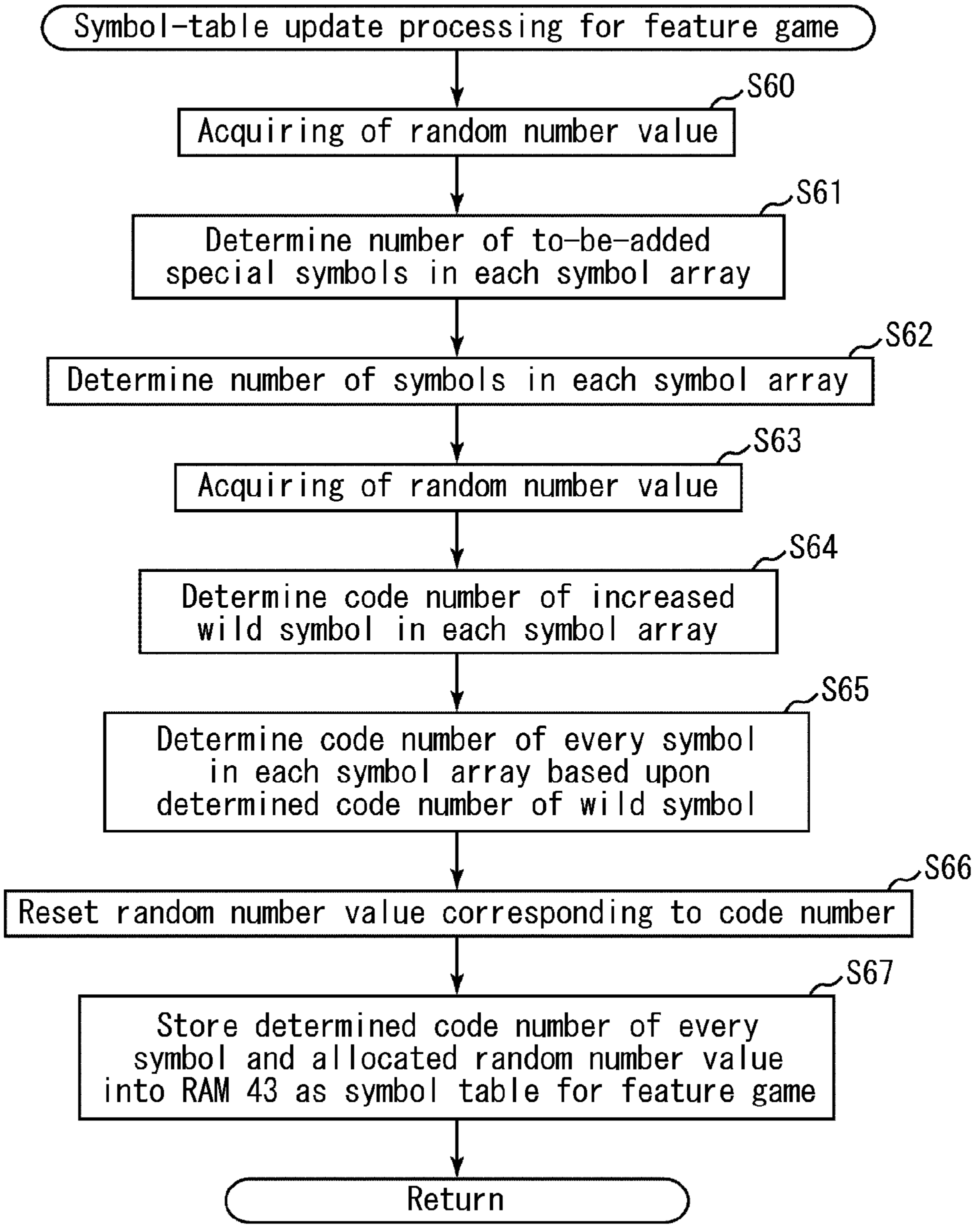
FIG. 17 is a flowchart showing a subroutine of symbol-table update processing for a feature game in the first embodiment.

FIG. 17 is a flowchart showing a subroutine of the symbol-table update processing for a feature game in the first embodiment.

First, the main CPU 41 acquires random number values from the random number generator 64 (step S60). In this processing, the main CPU 41 acquires the same number of random number values as the number of to-be-added wild symbols, which is determined in step S56.

Next, the main CPU 41 determines the number of to-be-added wild symbols for each symbol array (step S61). In this processing, the main CPU 41 determines the number of the wild symbols to be added to each symbol array, based upon the random number value acquired in step S60 and the symbol-array determination table shown in FIG. 18.

FIG. 18 is a view showing the symbol-array determination table in the first embodiment.

The symbol-array determination table shows the correspondence relationship between the symbol array No. and the random number value. It is to be noted that the symbol array L1 corresponds to the first column of the display blocks 28, the symbol array L2 corresponds to the second column of the display blocks 28, the symbol array L3 corresponds to the third column of the display blocks 28, the symbol array L4 corresponds to the fourth column of the display blocks 28, and the symbol array L5 corresponds to the fifth column of the display blocks 28.

For example, when the random number values acquired in step S60 are 2313, 3123, 12382, 17325, 28768, 30223, 45235, 48766, 58776 and 62356, the number of to-be-added wild symbols for the symbol array L1 (the first column) is three, the number of to-be-added wild symbols for the symbol array L2 (the second column) is one, the number of to-be-added wild symbols for the symbol array L3 (the third column) is two, the number of to-be-added wild symbols for the symbol array L4 (the fourth column) is two, and the number of to-be-added wild symbols for the symbol array L5 (the fifth column) is two.

In the present embodiment, the case has been described where the number of wild symbols to be added to each symbol array is determined based upon the acquired random number value and the symbol-array determination table shown in FIG. 18. However, in the present invention, the number of wild symbols to be added to each symbol array may be previously determined according to each of the numbers of to-be-added wild symbols which is to be determined in the processing of determining the number of to-be-added wild symbols.

Next, the main CPU 41 determines the number of symbols in each symbol array (step S62). In this processing, the main CPU 41 determines a total number of symbols in each symbol array based upon the number of to-be-added wild symbols for each symbol array, which has been determined in step S61. Specifically, the total number of symbols in each symbol array is a numeric value obtained by adding 20 (the number of symbols in each symbol array shown by the symbol table for a normal game) to the number of to-be-added wild symbols for each symbol array, which has been determined in step S61.

Next, the main CPU 41 acquires random number values from the random number generator 64 (step S63). In this processing, the main CPU 41 acquires the same number of random number values as the number of to-be-added wild symbols for each symbol array, which has been determined in step S61. Namely, when the number of to-be-added wild symbols for the symbol array L1 (the first column) is three, the main CPU 41 acquires three random number values for the symbol array L1 (the first column).

Next, the main CPU 41 determines for each symbol array a code number of the wild symbol to be added to each symbol array, based upon the random number value acquired in step S63 (step S64). In this processing, the main CPU 41 determines a code number of the wild symbol to be added to each symbol array based upon the random number value acquired in step S63 and a code-number determination table shown in FIG. 19.

FIG. 19 is a view showing the code-number determination table in the first embodiment.

The code-number determination table shows the correspondence relationship between the code number and the random number value.

For example, in a case where the random number values for the symbol array L1 (the first column) are 40567, 63535 and 65323, then "13", "End" and "End" are determined as the code numbers.

In the present embodiment, the case has been described where a code number of the wild symbol to be added to each symbol array is determined for each symbol array, based upon the acquired random number value and the code-number determination table shown in FIG. 19. However, in the present invention, a code number of the to-be-added wild symbol may be previously determined for each symbol array.

Next, the main CPU 41 determines a code number of every symbol in each symbol array based upon the code number of the wild symbol determined in step S64 (step S65). In this processing, the main CPU 41 adds the wild symbol to each symbol array shown by the symbol table for a normal game in FIG. 5, based upon the code number of the wild symbol determined in step S64. For example, in a case where "13", "End" and "End" are determined in step S64 as the code numbers of the wild symbols to be added to the symbol array L1 (the first column), then the wild symbol of "WILD" as the wild symbol is added to code No. 13 in the symbol array L1 (the first column) shown in the symbol table for a normal game, and "FLOWER 2" originally associated with code No. 13 is shifted to code No. 14; subsequently, each symbol is shifted in the same manner. Further, since there are two wild symbols for which the code number of "End" has been determined, the symbols of "WILD" are added to code No. 21 and code No. 22 that are at the end of the symbol array L1 (the first column). In the same manner, a code number of every symbol in each of the other symbol arrays is determined.

The main CPU 41 resets the random number values corresponding to the code numbers of each symbol array (step S66). In this processing, the main CPU 41 resets the correspondence relationship between the respective random number values from 0 to 65535 and the code numbers, based upon the total number of symbols in each symbol array which has been determined in step S62.

The main CPU 41 stores into the RAM 43 the code number of every symbol in each symbol array, which has been determined in step S65, and the correspondence relationship between the code numbers of each symbol array and the random number values, which has been determined in step S66, as the symbol table for a feature game (step S67). The symbol table for the feature game stored in the RAM 43 is referred to in executing the symbol determination processing for the feature game.

FIGS. 20A and 20B are views each showing an example of the symbol table for a feature game in the first embodiment.

In FIG. 20A, the wild symbols are added to code Nos. 13, 21 and 22 of the symbol array L1 (the first column). Further, the wild symbol is added to code No. 12 of the symbol array L2 (the second column). Furthermore, the wild symbols are added to code Nos. 6 and 13 of the symbol array L3 (the third column). Further, in FIG. 20B, the wild symbols are added to code Nos. 11 and 12 of the symbol array L4 (the fourth column). Moreover, the wild symbols are added to code Nos. 19 and 20 of the symbol array L5 (the fifth column).

After executing the processing of step S67, the main CPU 41 completes the present subroutine.

Figure 21:
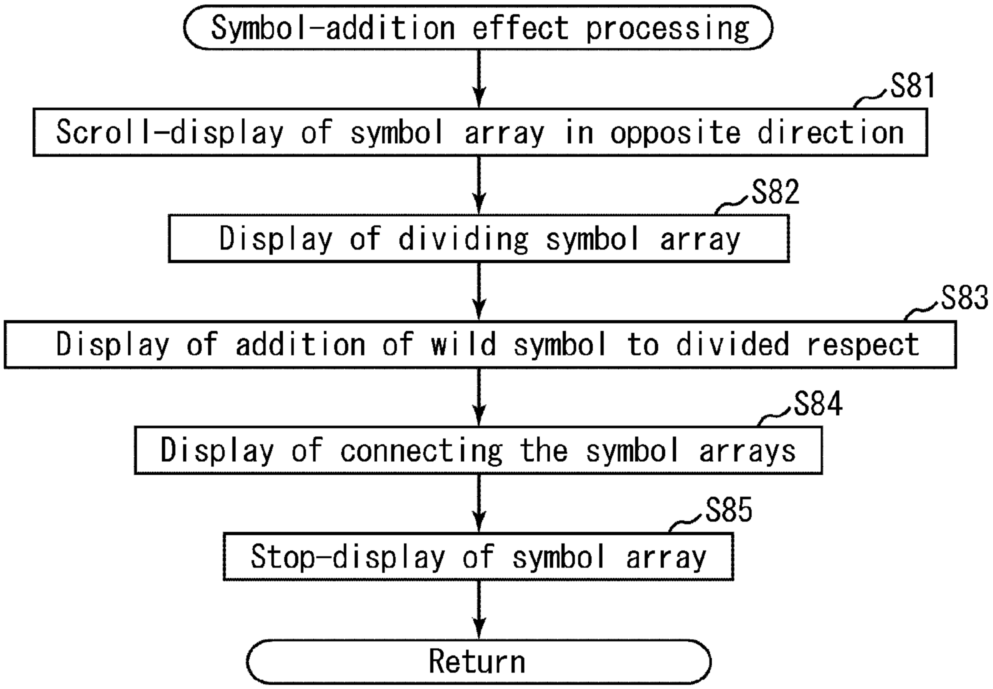
FIG. 21 is a flowchart showing a subroutine of symbol-addition effect processing in the first embodiment.

FIG. 21 is a flowchart showing a subroutine of the symbol-addition effect processing in the first embodiment.

FIGS. 22A to 22F are views each showing an exemplary image displayed to the lower image display panel provided in the slot machine according to the first embodiment of the present invention.

First, in step S81, the main CPU 41 scroll-displays the symbol arrays L1 to L5 in the direction from the bottom to the top, namely, the direction opposite to the scrolling direction in the normal game (cf. FIG. 1B). This scroll-display in the opposite direction is conducted at a speed lower than a speed of the scroll-display in the normal game. It is to be noted that the symbol array L1 corresponds to the leftmost column of the display blocks 28.

Figure 22A:
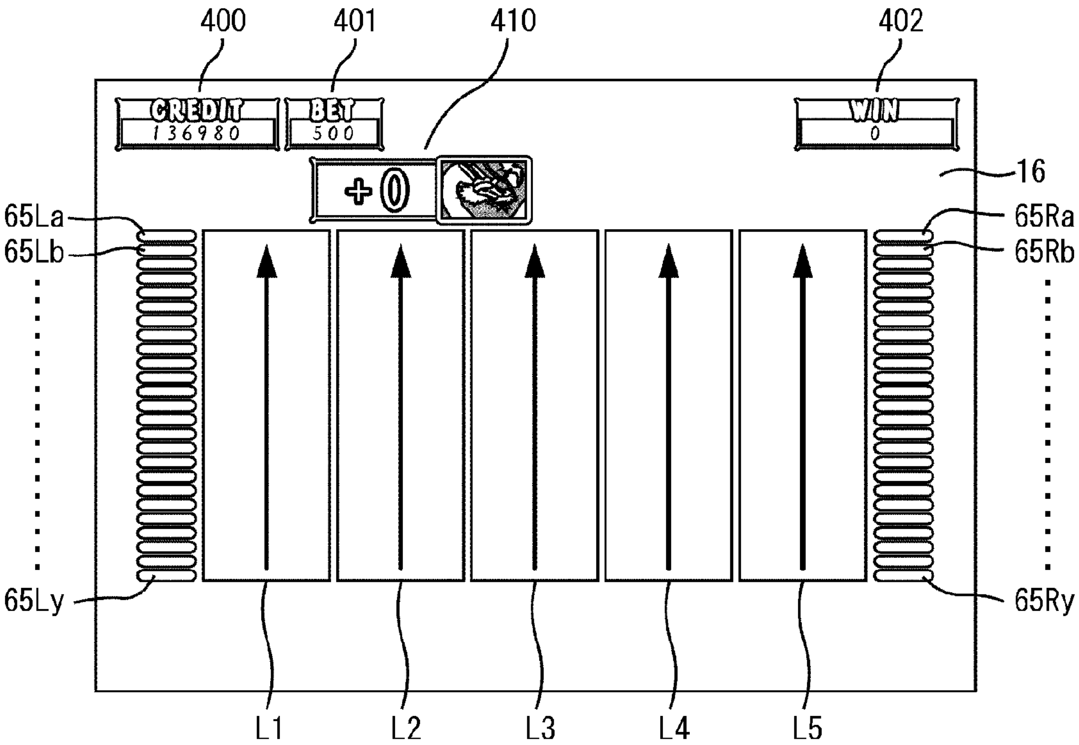
FIG. 22A is a view showing an exemplary image displayed to the lower image display panel provided in the slot machine according to the first embodiment of the present invention.

As shown in FIG. 22A, the symbol arrays L1 to L5 are scroll-displayed in the direction from the bottom to the top, namely, the direction opposite to the scrolling direction in the normal game. This scroll-display in the opposite direction is conducted at a speed lower than that of the scroll-display in the normal game. Further, a number-of-to-be-added-wild-symbols display portion 410 is displayed in the vicinity of the upper center of the lower image display panel 16. The number-of-to-be-added-wild-symbols display portion 410 displays "0", thereby showing that the number of the added wild symbols is 0.

Figure 22B:
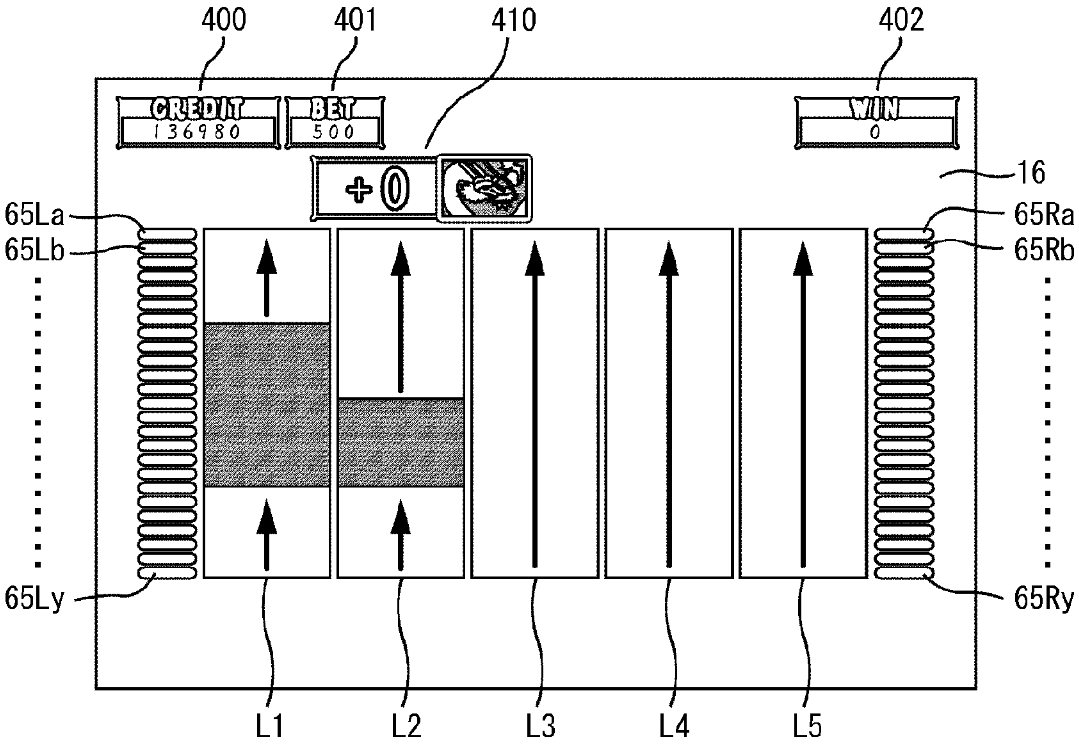
FIG. 22B is a view showing an exemplary image displayed to the lower image display panel provided in the slot machine according to the first embodiment of the present invention.

Next, in step S82, the main CPU 41 conducts display of the symbol array L being divided (cf. FIG. 22B). In this processing, the main CPU 41 conducts display of the symbol array L being divided at a position between the symbol of the code number determined in step S64 of FIG. 17 and the symbol of a code number smaller than the determined code number by one. For example, when determining that the wild symbol is to be added to code No. 13 of the symbol array L1, the main CPU 41 conducts display of the symbol array L1 being divided at the position between the symbol "FLOWER 2" of code No. 13 and the symbol "10" of code No. 12. As shown in FIG. 22B, the display of the symbol array L being divided is conducted on the lower image display panel 16. In FIG. 22B, there is displayed the state in which the symbol array L1 and the symbol array L2 each are divided.

Figure 22C:
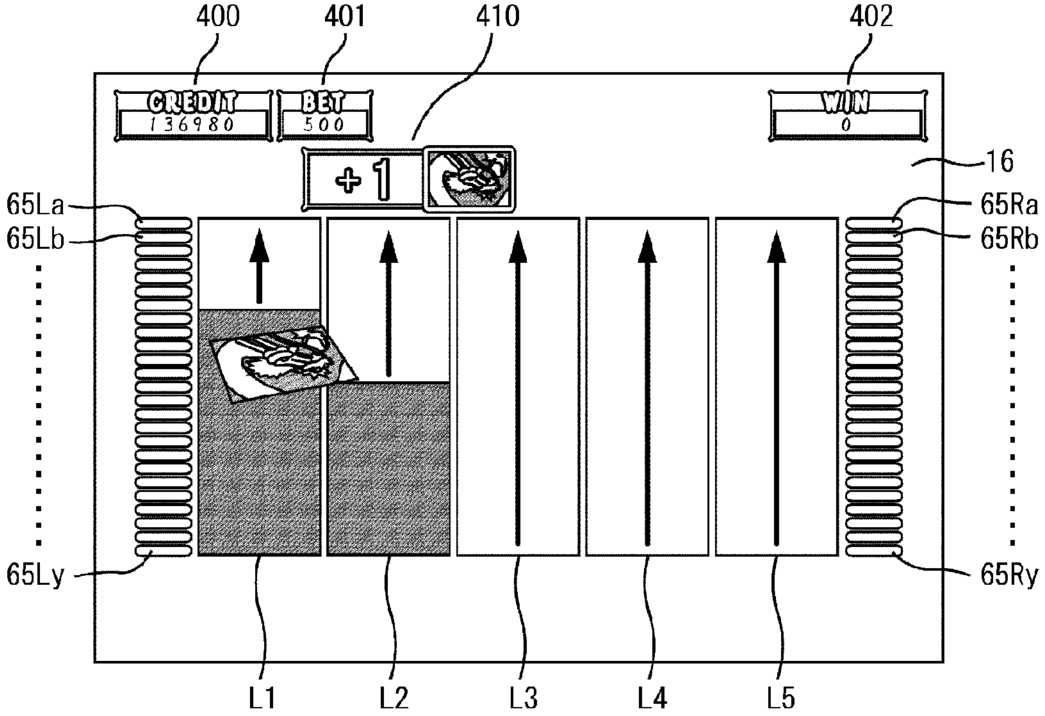
FIG. 22C is a view showing an exemplary image displayed to the lower image display panel provided in the slot machine according to the first embodiment of the present invention.
Figure 22D:
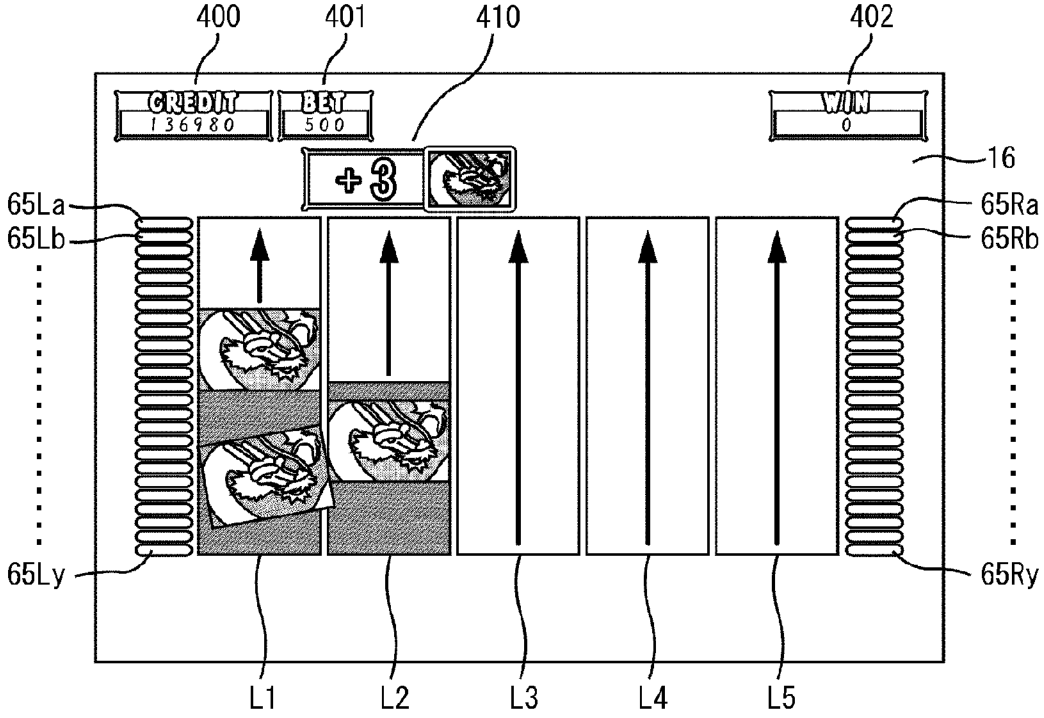
FIG. 22D is a view showing an exemplary image displayed to the lower image display panel provided in the slot machine according to the first embodiment of the present invention.

Next, in step S83, the main CPU 41 conducts displays of the wild symbol being added to the divided respect (cf. FIGS. 22C and 22D). As shown in FIGS. 22C and 22D, the state of the wild symbols being added to the divided respects of the symbol arrays is displayed. In FIG. 22C, "1" is displayed in the number-of-to-be-added-wild-symbols display portion 410, showing that the number of the added wild symbols is 1. In FIG. 22D, "3" is displayed in the number-of-to-be-added-wild-symbols display portion 410, showing that the number of the added wild symbols is 3.

Figure 22E:
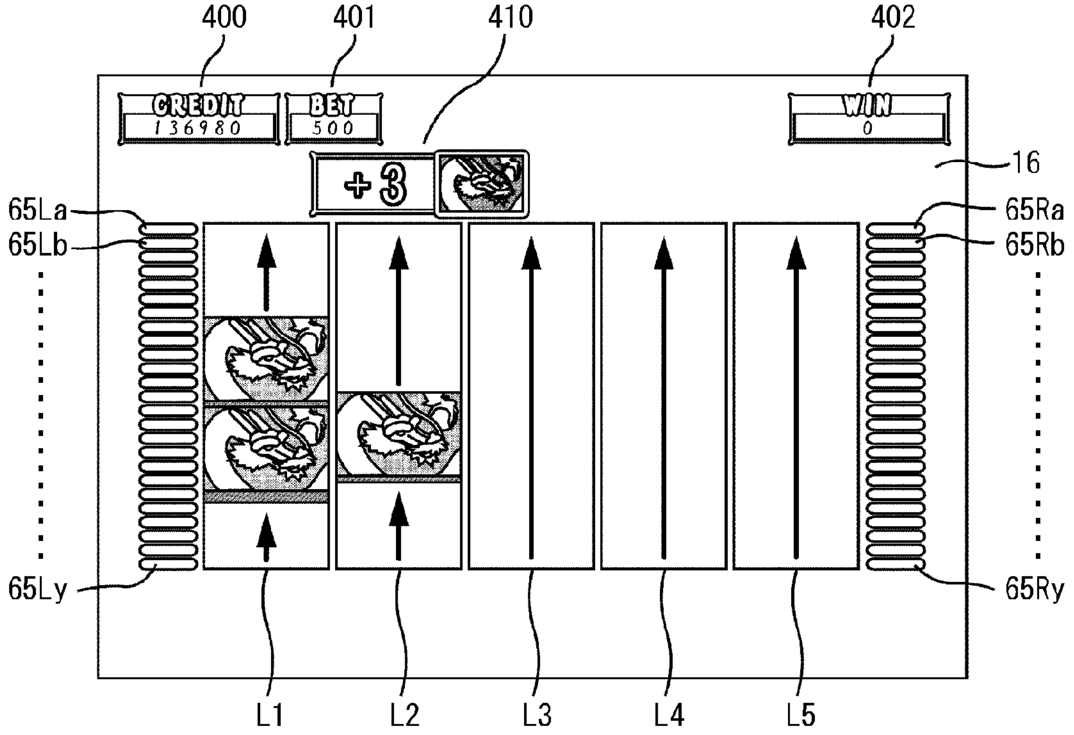
FIG. 22E is a view showing an exemplary image displayed to the lower image display panel provided in the slot machine according to the first embodiment of the present invention.
Figure 22F:
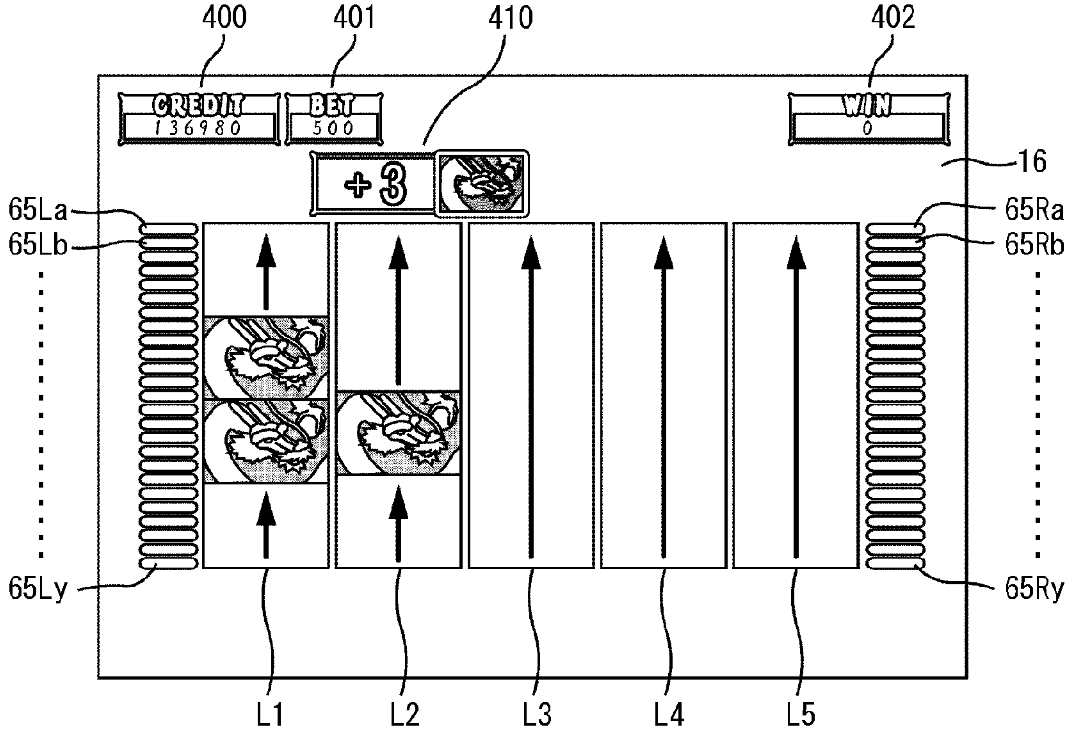
FIG. 22F is a view showing an exemplary image displayed to the lower image display panel provided in the slot machine according to the first embodiment of the present invention.

Next, in step S84, the main CPU 41 conducts display of the symbol arrays L being connected (cf. FIGS. 22E and 22F). As shown in FIGS. 22E and 22F, the display of the divided symbol arrays being connected is conducted.

Next, in step S85, the main CPU 41 stop-displays the scroll-display (scroll-display in the direction opposite to the direction in the normal game) of the symbol arrays L1 to L5, and completes the present subroutine.

Figure 23:
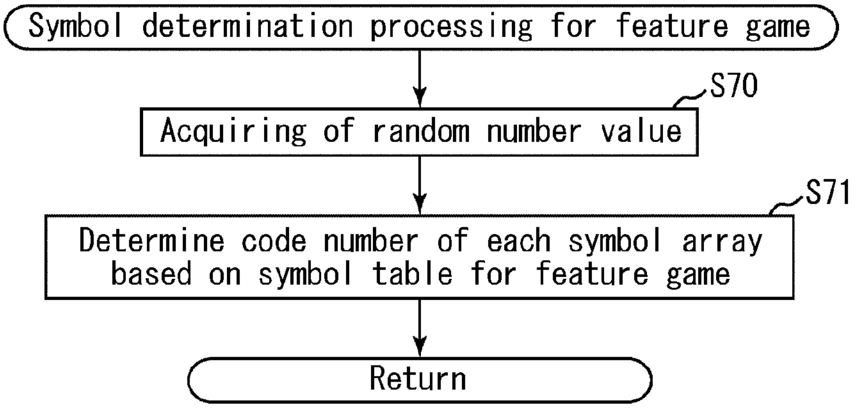
FIG. 23 is a flowchart showing a subroutine of symbol determination processing for a feature game in the first embodiment.

FIG. 23 is a flowchart showing a subroutine of the symbol determination processing for the feature game in the first embodiment.

This processing is processing performed by the main CPU 41 executing the symbol determination program stored in the RAM 43.

First, the main CPU 41 acquires random number values from the random number generator 64 (step S70). In this processing, the main CPU 41 acquires five random number values corresponding to the respective symbol arrays for the display blocks 28.

Next, the main CPU 41 determines a code number at stopping the symbols, based upon the acquired five random number values and the symbol table for the feature game (step S71). For example, "08" is determined as the code number for the first array when the random number value for the first array is 23035. It should be noted that a code numbers for symbol arrays correspond to code numbers of the symbols to be rearranged to the display blocks 28 in the first row out of the display blocks 28 that are put in four rows.

After executing the processing of step S71, the main CPU 41 completes the present subroutine.

In the present embodiment, the case has been described where the random number generator 64 is provided and a random number is extracted from the random number generator (a case of using a so-called hardware random number). However, in the present invention, a random number may be generated on the program (a case of using a so-called software random number).

As described above, according to the slot machine 10 and the control method of the slot machine 10, when three or more wild symbols have been stop-displayed on the pay line P in the normal game, display of the wild symbol being added to the symbol array L is executed while the symbol array L is being scrolled in the direction opposite to the direction in the normal game. Since the wild symbol is added to the symbol array L, it is possible to make the player have expectations for start of a game in which a new symbol array L different from that of the normal game is used.

Also, scrolling of the symbol array L during display of the wild symbol being added to the symbol array L allows the player to see which position of the symbol array L the wild symbol has been added to. The player having seen which position of the symbol array L the wild symbol has been added to can more easily predict whether or not the added wild symbol will be stop-displayed on the pay line P, during the scroll-display of the symbol array L. As a result, it is possible to further raise the player's expectations generated by the addition of the wild symbol.

Further, when display of the wild symbol being added to the symbol array L is conducted, the symbol array L is scrolled in the direction opposite to the direction in the normal game. Accordingly, it is possible to make the player notice that the scroll-display during the display of the wild symbol being added to the symbol array L is not a part of a game but an effect to be produced when the wild symbol is added.

As thus described, when three or more wild symbols have been stop-displayed on the pay line P, the display of the wild symbol being added to the symbol array L is conducted while the symbol array L is being scrolled in the direction opposite to the direction in the normal game, so that it becomes possible to provide a more attractive game.

When the display of the wild symbol being added to the symbol array L is conducted, the symbol array L is scrolled at the speed lower than that of the scroll-display in the normal game, so that it becomes possible to make the player more certainly see which position of the symbol array L the wild symbol has been added to.

In the present embodiment, the case has been described where the number of pay lines 300 is 25. However, the number of pay lines is not particularly limited in the present invention, and for example, it may be 30.

In the present embodiment, the case has been described where the wild symbol is added. That is, the case has been described where the extra symbol in the present invention is the wild symbol. However, the extra symbol of the present invention is not limited to the wild symbol, and may be a symbol (e.g. "10", "J", "Q", "K", "BIRD", "FISH", "FEATURE") other than the wild symbol. This is because addition of symbols can make the player have expectations for start of a game in which a new symbol array different from that of the normal game is used.

Further, for example, there may be two kinds of extra symbols, namely the wild symbol and the feature symbol. Here, the numbers of the wild symbols and the feature symbols both being the extra symbols are increased when the feature game is executed, and therefore, it is possible to excite the player more than in the case where only the number of the wild symbols is increased.

In the present embodiment, the case has been described where the display of the symbols being added to the symbol arrays L is conducted while the symbol arrays L are being scroll-displayed in the direction opposite to the scrolling direction in the normal game, when three or more feature symbols have been displayed on the pay line. However, the predetermined condition in the present invention is not limited to three or more feature symbols being displayed on the pay line, and examples of the predetermined condition may include elapse of a predetermined time period after the end of the previous feature game. Further, the examples thereof may also include that the number of normal games executed after the end of the previous feature game has reached a predetermined number of times.

In the present embodiment, the case has been described where the scroll-display in the opposite direction at the time of addition of the wild symbols is conducted at a speed lower than that of scroll-display in the normal game. However, the present invention is not limited to this, and the scroll-display in the opposite direction at the time of addition of the wild symbols may be conducted at a speed equal to that of the scroll-display in the normal game or at a speed higher than that of the scroll-display in the normal game. This is because even if the scrolling is conducted at a speed equal to or higher than that of the scroll-display in the normal game, it is possible to make the player see at least addition of the symbols to the symbol arrays.

In the present embodiment, the case has been described where all the symbol arrays L are scroll-displayed in the direction opposite to the direction of scrolling in the normal game, when three or more feature symbols have been displayed on the pay line. However, the present invention is not limited to this, and for example, only the symbol array determined as the symbol array to which the symbol is to be added may be scrolled in the direction opposite to the direction of scrolling in the normal game. Since the player only has to pay attention to the symbol array being scrolled in the direction opposite to the direction of scrolling in the normal game, it is possible to make the player more easily see which position of the symbol array the symbol has been added to.

In the present embodiment, the case has been described where the wild symbols exist also in the normal game, and the number of wild symbols is increased when three or more feature symbols have been display on the pay line. However, the present invention is not limited to this, and for example, the wild symbols may not exist in the symbol arrays in the normal game, and the wild symbols as the extra symbols may be added when a predetermined condition has been satisfied.

Second Embodiment

A second embodiment of the present invention is described based on the drawings.

First, with reference to FIGS. 24A to 24G, there will be given a general description of the present embodiment.

FIGS. 24A to 24G are views each showing a symbol matrix according to a second embodiment of the present invention.

A symbol matrix SM2 shown in FIG. 24 is displayed to a lower image display panel 1016 (FIG. 25) provided in a slot machine 1010 according to the present embodiment. A total of 20 symbols (four rows×five columns) are displayed to the symbol matrix SM2, and a part of one of symbol arrays L (L1001, L1002, L1003, L1004 and L1005) which are described later with reference to FIG. 28 is displayed to each column.

It is to be noted that, although the slot machine 1010 is a stand-alone type slot machine not connected to a network, the present invention is applicable to a slot machine connected to a network.

A normal game is executed on the slot machine 1010 on condition that a coin has been betted. In the normal game, the symbol arrays L are scroll-displayed from the top to the bottom and stop-displayed after a certain period of time has elapsed. When the symbols stop-displayed on a pay line (see FIG. 29) form a predetermined combination, a previously defined number of coins are paid out (see FIG. 30). Further, when three or more feature symbols have been displayed on the pay line, a special game is generated (see FIG. 30).

When the special game has been generated, a wild symbol is first added to the symbol array.

Here, effects at the time of addition of a wild symbol are described.

Figure 24A:
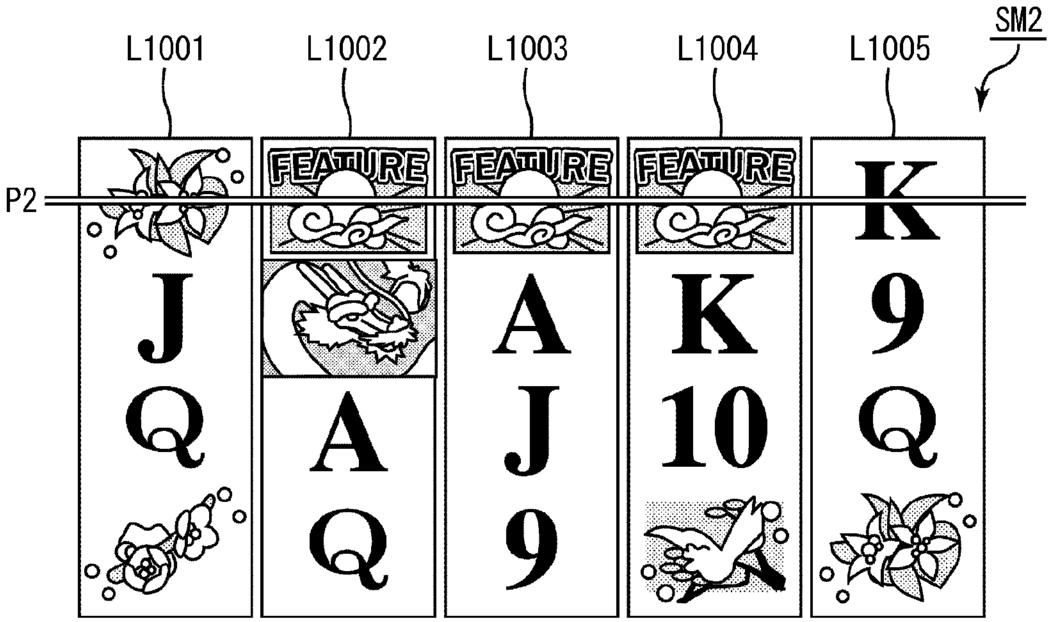
FIG. 24A is a view showing a symbol matrix according to a second embodiment of the present invention.

In FIG. 24A, three wild symbols are stop-displayed on a pay line P2 passing across the uppermost row. That is, when the symbols have been stop-displayed in a state shown in FIG. 24A, the special game is generated in the slot machine

1010. It is to be noted that the slot machine 1010 executes as the special game a feature game being a game (hereinafter also referred to as a "free game") that can be conducted without a coin (game medium) being betted.

Generation of the special game causes the symbol arrays L1001 to L1005 to be scroll-displayed from the bottom to the top, i.e. in a direction opposite to the scrolling direction in the normal game. The scroll-display in the opposite direction is conducted at a speed lower than a speed of the scroll-display in the normal game.

Figure 24B:
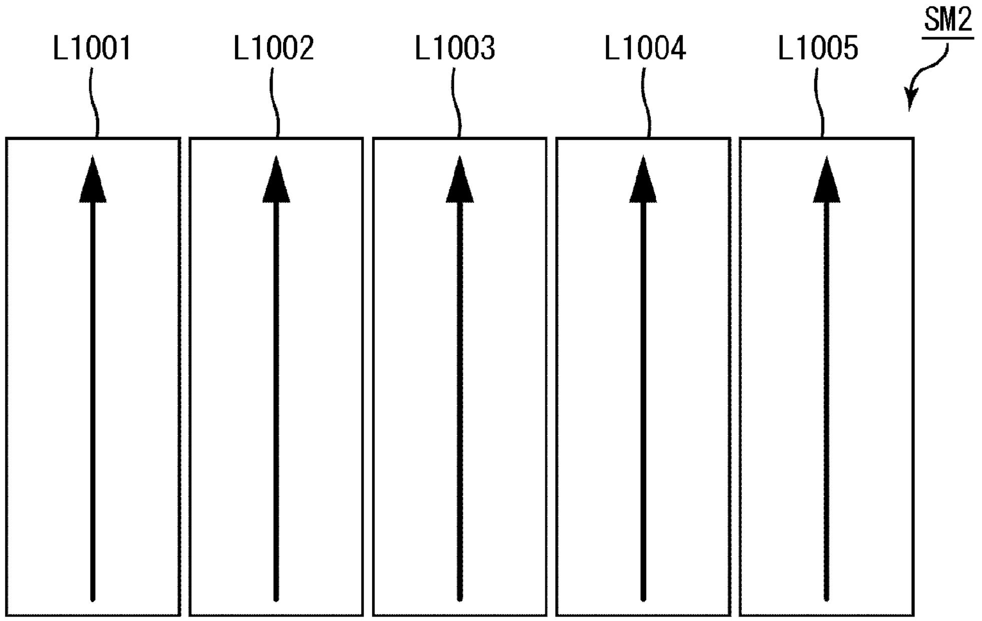
FIG. 24B is a view showing the symbol matrix according to the second embodiment of the present invention.
Figure 24C:
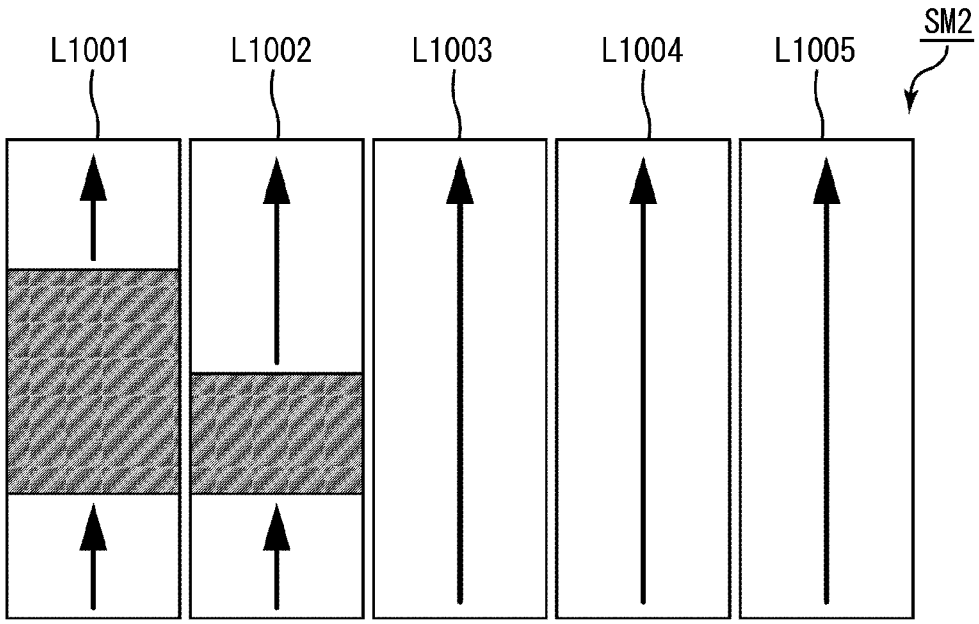
FIG. 24C is a view showing the symbol matrix according to the second embodiment of the present invention.

Thereafter, display of the symbol arrays L being divided is conducted as shown in FIG. 24C. FIG. 24C shows the state in which the symbol array L1001 and the symbol array L1002 each are divided.

Figure 24D:
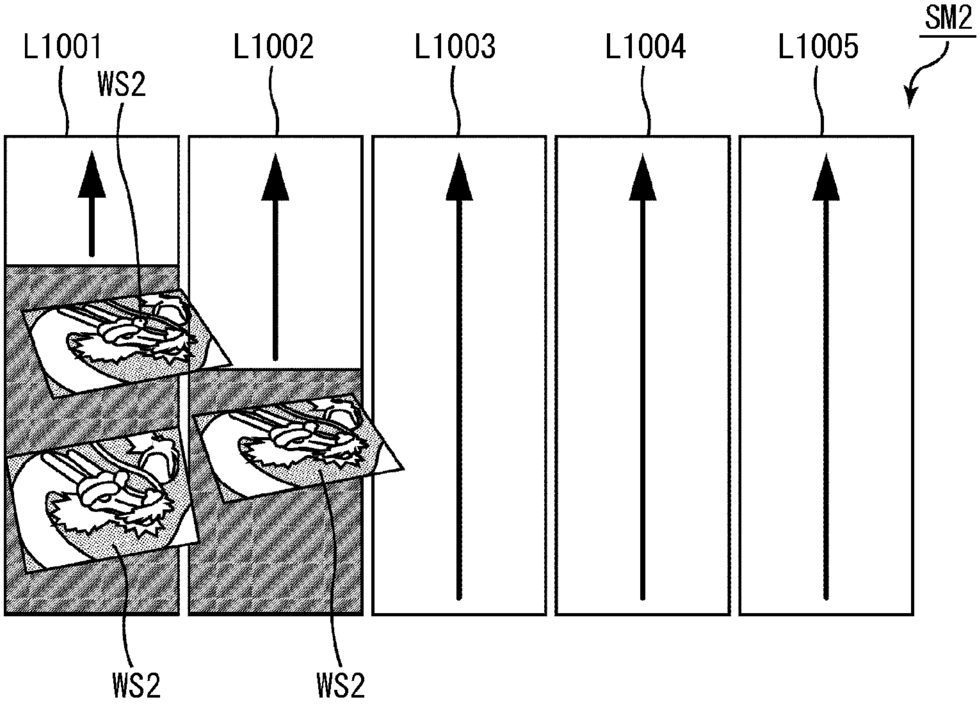
FIG. 24D is a view showing the symbol matrix according to the second embodiment of the present invention.
Figure 24E:
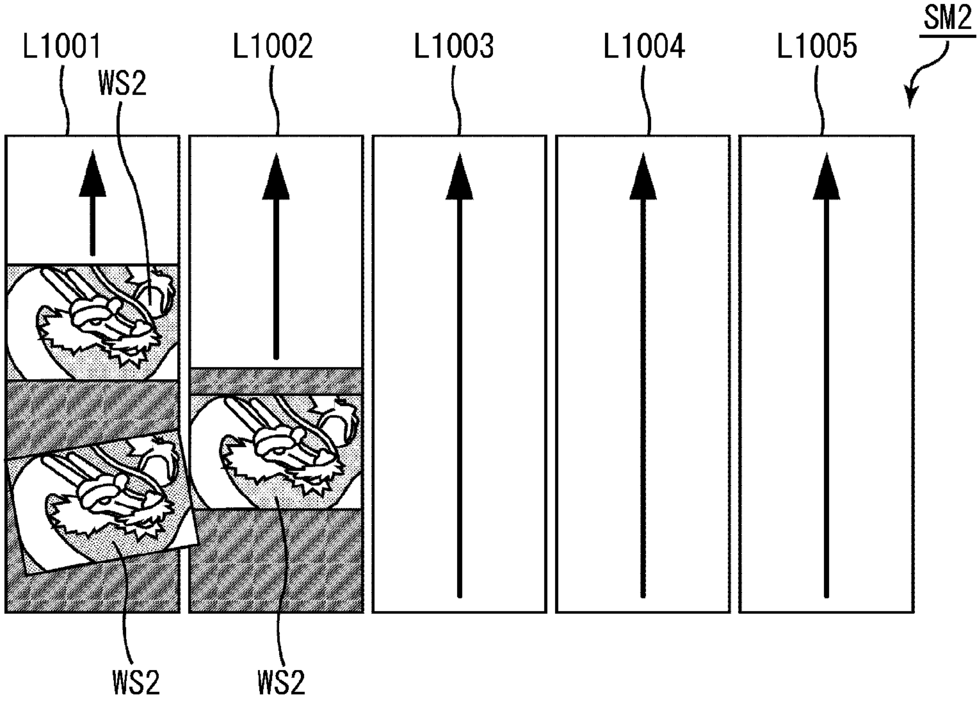
FIG. 24E is a view showing the symbol matrix according to the second embodiment of the present invention.
Figure 24F:
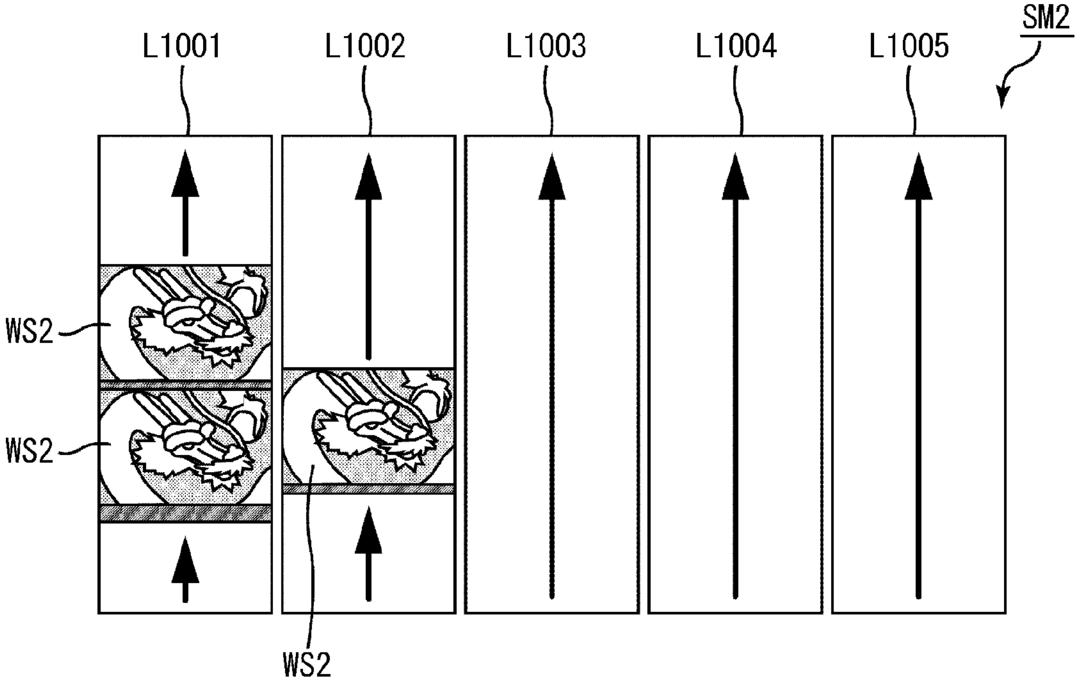
FIG. 24F is a view showing the symbol matrix according to the second embodiment of the present invention.
Figure 24G:
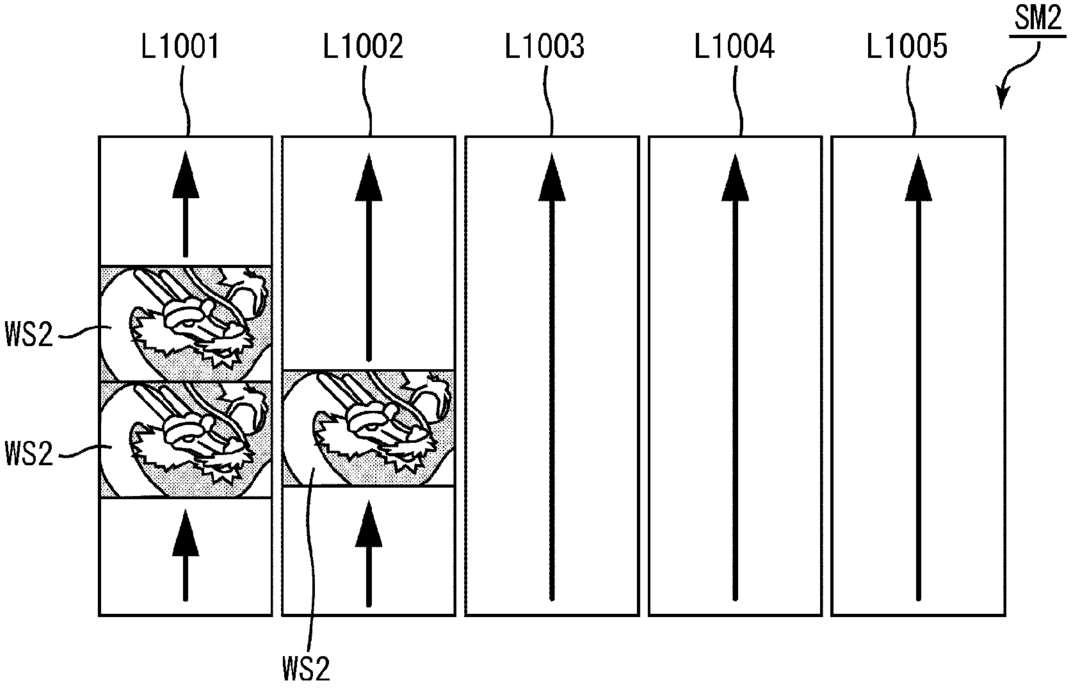
FIG. 24G is a view showing the symbol matrix according to the second embodiment of the present invention.

When the symbol array L has been divided, display of the wild symbols being added to the divided respect is conducted as shown in FIG. 24D and FIG. 24E. When addition of the wild symbols has been completed, display of the divided symbol arrays being connected is conducted as shown in FIG. 24F and FIG. 24G.

The added wild symbols correspond to the extra symbols in the present invention.

When a "fast-forward" operation command has been inputted through a touch panel 1069 during execution of the display shown in FIGS. 24B to 24G, i.e. during the time between start of scroll-display of the symbol arrays in the opposite direction and the display of the divided symbol arrays being connected, the display shown in FIGS. 24B to 24G is conducted at a speed higher than that in the case in which the "fast-forward" operation command has not been inputted. It is to be noted that fast-forward display is conducted after the "fast-forward" operation command is inputted. The input of the "fast-forward" operation command through the touch panel 1069 corresponds to the predetermined input in the present invention.

After the effect for addition of the wild symbols has been produced, the special game is executed on the slot machine 1010. In the special game, the symbol arrays including the added wild symbols are scroll-displayed from the top to the bottom and stop-displayed after a certain period of time has elapsed. When the symbols stop-displayed on the pay line form a predetermined combination, a previously defined number of coins are paid out.

According to the slot machine 1010, when three or more wild symbols have been stop-displayed on the pay line P2 in the normal game, display of the wild symbol being added to the symbol array L is executed while the symbol array L is being scrolled in the direction opposite to the direction in the normal game. Since the wild symbol is added to the symbol array L, it is possible to make the player have expectations for start of a game in which a new symbol array L different from that of the normal game is used.

Also, scrolling of the symbol array L during display of the wild symbol being added to the symbol array L allows the player to see which position of the symbol array L the wild symbol has been added to. The player having seen which position of the symbol array L the wild symbol has been added to can more easily predict whether or not the added wild symbol will be stop-displayed on the pay line P2, during the scroll-display of the symbol array L. As a result, it is possible to further raise the player's expectations generated by the addition of the wild symbol.

Further, when display of the wild symbol being added to the symbol array L is conducted, the symbol array L is scrolled in the direction opposite to the direction in the normal game. Accordingly, it is possible to make the player notice that the scroll-display during the display of the wild symbol being added to the symbol array L is not a part of a game but an effect to be produced when the wild symbol is added.

When the "fast-forward" operation command has been inputted through the touch panel 1069, display (effect) of the wild symbol being added to the symbol array L is fast-forwarded. As a result, the player who wishes to play the next game rather than see the display of the symbols being added can fast-forward the display by inputting the "fast-forward" operation command using the touch panel 1069.

As thus described, when three or more wild symbols have been stop-displayed on the pay line P2, the display of the wild symbol being added to the symbol array L is conducted while the symbol array L is being scrolled in the direction opposite to the direction in the normal game; and when the "fast-forward" operation command is inputted through the touch panel 1069 while the display is being conducted, the display of the wild symbol being added to the symbol array L is fast-forwarded. Consequently, it becomes possible to provide a more attractive game.

Next, a configuration of the slot machine 1010 is described.

Figure 25:
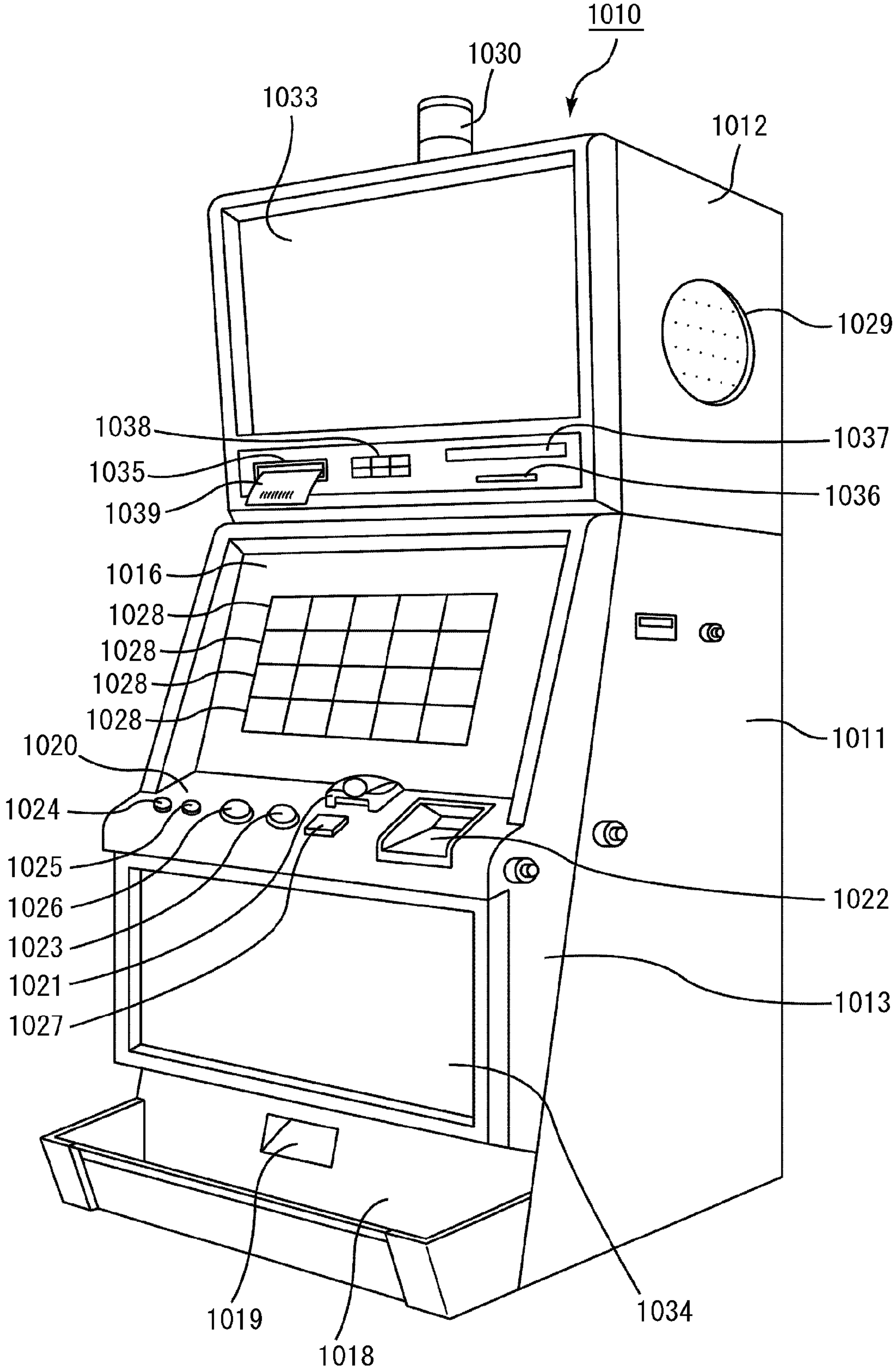
FIG. 25 is a perspective view showing an external view of a slot machine according to the second embodiment of the present invention.

FIG. 25 is a perspective view showing an external view of the slot machine according to the second embodiment of the present invention.

In the slot machine 1010, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 1010 comprises a cabinet 1011, a top box 1012 installed on the upper side of the cabinet 1011, and a main door 1013 provided at the front face of the cabinet 1011.

On the main door 1013, there is provided the lower image display panel 1016. The lower image display panel 1016 includes a transparent liquid crystal panel which displays twenty display blocks 1028 along five columns and four rows. A single symbol is displayed in each display block 1028.

Further, although not shown, various images relating to an effect, in addition to the aforementioned images, are displayed to the lower image display panel 1016.

It is to be noted that, although in the present embodiment a case is described in which the symbols are rearranged to the lower image display panel 1016 (a case in which the symbol display of the present invention is the lower image display panel 1016), the symbol display of the present invention is not particularly limited so long as it is capable of scroll-displaying the symbol arrays.

Moreover, although not shown, a touch panel 1069 is provided at the front face of the lower image display panel 1016. The player can operate the touch panel 1069 to input a variety of commands.

When the touch panel 1069 is operated, an input signal is transmitted from the touch panel 1069 to a main CPU 1041.

The touch panel 1069 corresponds to the input device in the present invention.

Below the lower image display panel 1016, there are provided a control panel 1020 including a plurality of buttons 1023 to 1027 with each of which a command according to game progress is inputted by the player, a coin receiving slot 1021 through which a coin is accepted into the cabinet 1011, and a bill validator 1022.

The control panel 1020 is provided with a start button 1023, a change button 1024, a CASHOUT button 1025, a 1-BET button 1026 and a maximum BET button 1027. The start button 1023 is for inputting a command to start scrolling of symbols. The change button 1024 is used for making a request of staff in the recreation facility for exchange. The CASHOUT button 1025 is used for inputting a command to pay out credited coins to a coin tray 1018.

The 1-BET button 1026 is used for inputting a command to bet one coin on a game out of credited coins. The maximum BET button 1027 is used for inputting a command to bet the maximum number of coins that can be bet on one game (500 coins in the present embodiment) out of credited coins.

The bill validator 1022 not only discriminates a regular bill from a false bill, but also accepts the regular bill into the cabinet 1011. It is to be noted that the bill validator 1022 may be configured so as to be capable of reading a later-described ticket 1039 with a barcode. At the lower front face of the main door 1013, namely, below the control panel 1020, there is provided a belly glass 1034 on which a character or the like of the slot machine 1010 is drawn.

An upper image display panel 1033 is provided on the front surface of the top box 1012. The upper image display panel 1033 is provided with a liquid crystal panel and displays, for example, images indicative of introduction of contents of the game and explanation of the rule of the game.

Further, a speaker 1029 is provided in the top box 1012. Under the upper image display panel 1033, there are provided a ticket printer 1035, a card reader 1036, a data display 1037, and a key pad 1038. The ticket printer 1035 prints on a ticket a barcode as coded data of the number of credits, a date, an identification number of the slot machine 1010, and the like, and outputs the ticket as the ticket 1039 with a barcode. The player can make another slot machine read the ticket 1039 with a barcode to play a game thereon, or exchange the ticket 1039 with a barcode with a bill or the like at a predetermined place in the recreation facility (e.g. a cashier in a casino).

The card reader 1036 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 1037 includes a fluorescent display and the like, and displays, for example, data read by the card reader 1036 or data inputted by the player via the key pad 1038. The key pad 1038 is used for inputting a command and data concerning issuing of a ticket, and the like.

Figure 26:
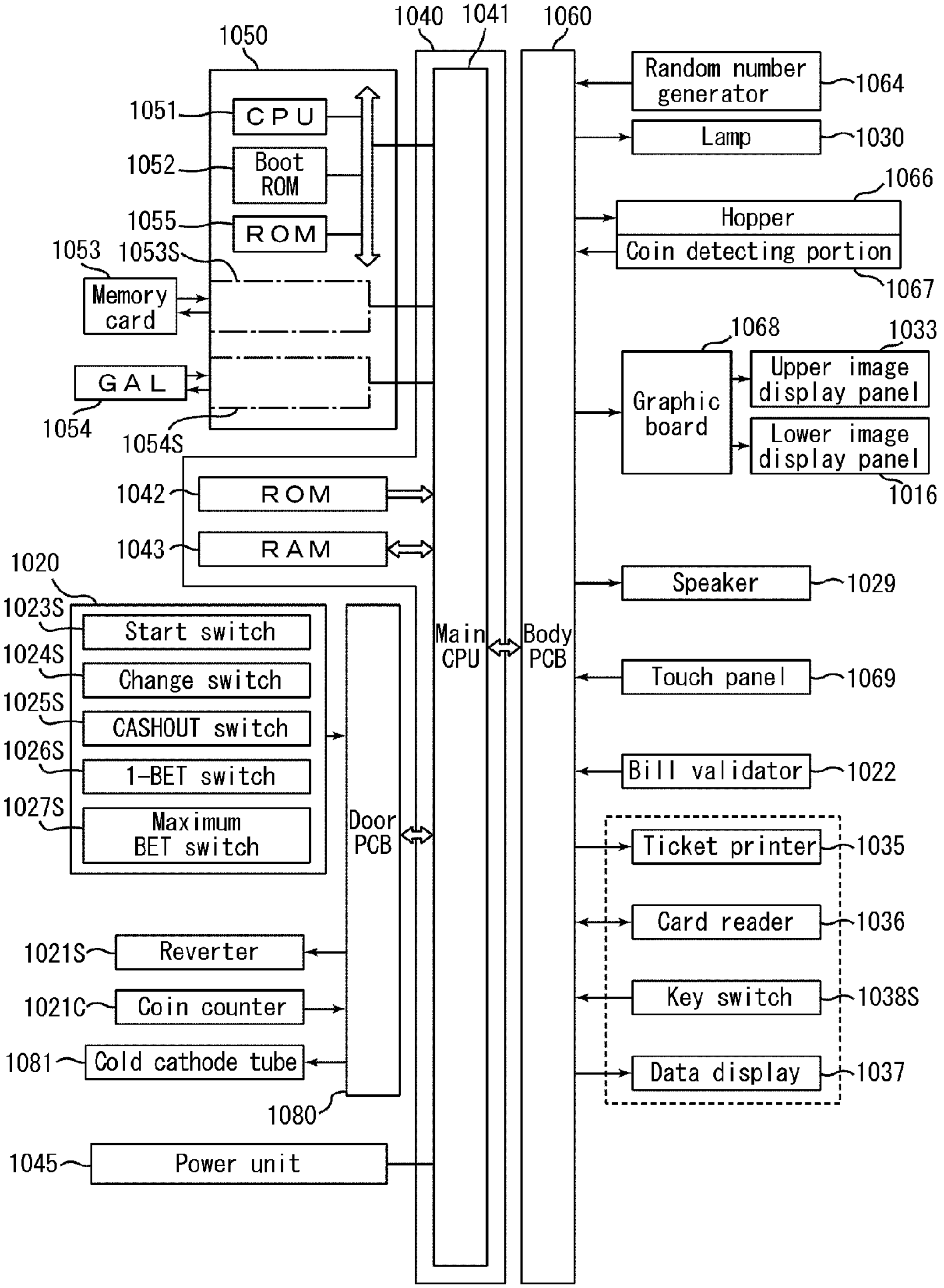
FIG. 26 is a block diagram showing an internal configuration of the slot machine shown in FIG. 2.

FIG. 26 is a block diagram showing an internal configuration of the slot machine shown in FIG. 25.

A gaming board 1050 is provided with a CPU (Central Processing Unit) 1051, a ROM 1055, and a boot ROM 1052 which are interconnected to one another by an internal bus, a card slot 1053S corresponding to a memory card 1053, and an IC socket 1054S corresponding to a GAL (Generic Array Logic) 1054.

The memory card 1053 includes a nonvolatile memory such as CompactFlash (registered trade mark), and stores a game program. The game program includes a symbol determination program. The symbol determination program is a program for determining symbols to be rearranged in the display blocks 1028.

Further, the card slot 1053S is configured so as to allow the memory card 1053 to be inserted thereinto or removed therefrom, and is connected to the mother board 1040 by an IDE bus. Therefore, the type and the contents of the game conducted on the slot machine 1010 can be changed by removing the memory card 1053 from the card slot 1053S, writing another game program into the memory card 1053, and inserting the memory card 1053 into the card slot 1053S. The game program includes a program according to progress of the game. Further, the game program includes image data and sound data to be outputted during the game. The game program includes image data showing selection images 1302, and the like.

Further, the game program includes: symbol-table data for a normal game, showing a symbol table for a normal game (cf. FIG. 28) which specifies the correspondence relationship among each symbol in each symbol array L, a code number and a random number range; odds data showing the correspondence relationship (cf. FIG. 30) among the kind and the number of the symbols rearranged on a pay line 1300 (cf. FIG. 29) and the amount of payout; number-of-games determination table data showing a number-of-games determination table (cf. FIG. 35); table data for determining the number of to-be-added wild symbols which shows a table for determining the number of to-be-added wild symbols (cf. FIG. 38); symbol-array determination table data showing a symbol-array determination table (cf. FIG. 41); and code-number determination-table data showing a code-number determination table (cf. FIG. 42); and the like.

The CPU 1051, the ROM 1055 and the boot ROM 1052 interconnected to one another by an internal bus are connected to the mother board 1040 through a PCI bus. The PCI bus not only conducts signal transmission between the mother board 1040 and the gaming board 1050, but also supplies power from the mother board 1040 to the gaming board 1050.

The mother board 1040 is configured using a commercially available general-purpose mother board (a print wiring board on which fundamental components of a personal computer are mounted), and is provided with the main CPU 1041, a ROM (Read Only Memory) 1042, and a RAM (Random Access Memory) 1043. The mother board 1040 corresponds to the controller in the present invention.

The ROM 1042 comprises a memory device such as a flash memory, and stores a program such as a BIOS (Basic Input/Output System) executed by the main CPU 1041, and permanent data. When the BIOS is executed by the main CPU 1041, processing for initializing a predetermined peripheral device is conducted, concurrently with start of processing for loading the game program stored in the memory card 1053 via the gaming board 1050. It is to be noted that, in the present invention, the ROM 1042 may or may not be a data rewritable one.

The RAM 1043 stores data and a program such as a symbol-determination program, which are used at the time of operation of the main CPU 1041. Further, the RAM 1043 is capable of storing a game program.

Moreover, the RAM 1043 stores data of the number of credits, the numbers of coin-ins and coin-outs in one game, and the like. Further, the RAM 1043 stores symbol-table data for a feature game, showing a symbol table for a feature game (cf. FIGS. 43A and 43B), and data showing the number T of games.

Moreover, the mother board 1040 is connected with a later-described body PCB (Printed Circuit Board) 1060 and a door PCB 1080 through respective USBs. Further, the mother board 1040 is connected with a power supply unit 1045.

The body PCB 1060 and the door PCB 1080 are connected with an instrument and a device that generate an input signal to be inputted into the main CPU 1041, and an instrument and a device operations of which are controlled by a control signal outputted from the main CPU 1041. The main CPU 1041 executes the game program stored in the RAM 1043 based on the input signal inputted into the main CPU 1041, and thereby executes the predetermined arithmetic processing and stores the result thereof into the RAM 1043, or transmits a control signal to each instrument and device as processing for controlling each instrument and device.

The body PCB 1060 is connected with a lamp 1030, a hopper 1066, a coin detecting portion 1067, a graphic board 1068, the speaker 1029, the touch panel 1069, the bill validator 1022, the ticket printer 1035, the card reader 1036, a key switch 1038S, the data display 1037, and a random number generator 1064. The lamp 1030 is lighted in a predetermined pattern based on control signals outputted from the main CPU 1041.

The hopper 1066 is installed inside the cabinet 1011, and pays out a predetermined number of coins based on the control signal outputted from the main CPU 1041, from a coin payout exit 1019 to the coin tray 1018. The coin detecting portion 1067 is provided inside the coin payout exit 1019, and outputs an input signal to the main CPU 1041 in the case of detecting payout of the predetermined number of coins from the coin payout exit 1019.

The graphic board 1068 controls image display to the upper image display panel 1033 and the lower image display panel 1016 based on the control signal outputted from the main CPU 1041. In the respective display blocks 1028 on the lower image display panel 1016, symbols are displayed in a scrolling manner or in a stopped state. The number of credits stored in the RAM 1043 is displayed to a number-of-credits display portion 1400 of the lower image display panel 1016. Further, the number of betted coins is displayed to a number-of-bets display portion 1401 of the lower image display panel 1016. Furthermore, the number of coin-outs is displayed to a payout display portion 1402 of the lower image display panel 1016.

The graphic board 1068 comprises a VDP (Video Display Processor) for generating image data based on the control signal outputted from the main CPU 1041, a video RAM for temporarily storing image data generated by the VDP, and the like. It is to be noted that image data used in generation of the image data by the VDP is included in the game program read from the memory card 1053 and stored into the RAM 1043.

The bill validator 1022 not only discriminates a regular bill from a false bill, but also accepts the regular bill into the cabinet 1011. Upon acceptance of the regular bill, the bill validator 1022 outputs an input signal to the main CPU 1041 based on a face amount of the bill. The main CPU 1041 stores in the RAM 1043 the number of credits corresponding to the face amount of the bill transmitted with the input signal.

The ticket printer 1035 prints on a ticket a barcode as coded data of the number of credits stored in the RAM 1043, a date, and an identification number of the slot machine 1010, and the like, based on the control signal outputted from the main CPU 1041, and outputs the ticket as the ticket 1039 with a barcode. The card reader 1036 reads data from the smart card and transmits the read data to the main CPU 1041, and writes data onto the smart card based on the control signal from the main CPU 1041. The key switch 1038S is provided on the key pad 1038, and outputs a predetermined input signal to the main CPU 1041 when the key pad 1038 is operated by the player. The data display 1037 displays data read by the card reader 1036 and data inputted by the player via the key pad 1038, based on the control signal outputted from the main CPU 1041.

The random number generator 1064 generates a random number at a predetermined timing. It is to be noted that the range of the random number to be generated by the random number generator 1064 is from 0 to 65535.

The door PCB 1080 is connected with the control panel 1020, a reverter 1021S, a coin counter 1021C, and a cold cathode tube 1081. The control panel 1020 is provided with a start switch 1023S corresponding to the start button 1023, a change switch 1024S corresponding to the change button 1024, a CASHOUT switch 1025S corresponding to the CASHOUT button 1025, a 1-BET switch 1026S corresponding to the 1-BET button 1026, and a maximum BET switch 1027S corresponding to the maximum BET button 1027. Each of the switches 1023S to 1027S outputs an input signal to the main CPU 1041 when each of the buttons 1023 to 1027 corresponding thereto is operated by the player.

The coin counter 1021C is provided inside the coin receiving slot 1021, and discriminates a regular coin from a false coin inserted into the coin receiving slot 1021 by the player. Coins other than the regular coin are discharged from the coin payout exit 1019. Further, the coin counter 1021C outputs an input signal to the main CPU 1041 upon detection of the regular coin.

The reverter 1021S operates based on the control signal outputted from the main CPU 1041, and distributes a coin recognized by the coin counter 1021C as the regular coin into a cash box (not shown) or the hopper 1066, which are disposed in the slot machine 1010. Namely, when the hopper 1066 is filled with coins, the regular coin is distributed into the cash box by the reverter 1021S. On the other hand, when the hopper 1066 is not filled with coins, the regular coin is distributed into the hopper 1066. The cold cathode tube 1081 functions as a back light installed on the rear face side of the lower image display panel 1016 and the upper image display panel 1033, and is lighted up based on the control signal outputted from the main CPU 1041.

Figure 27:
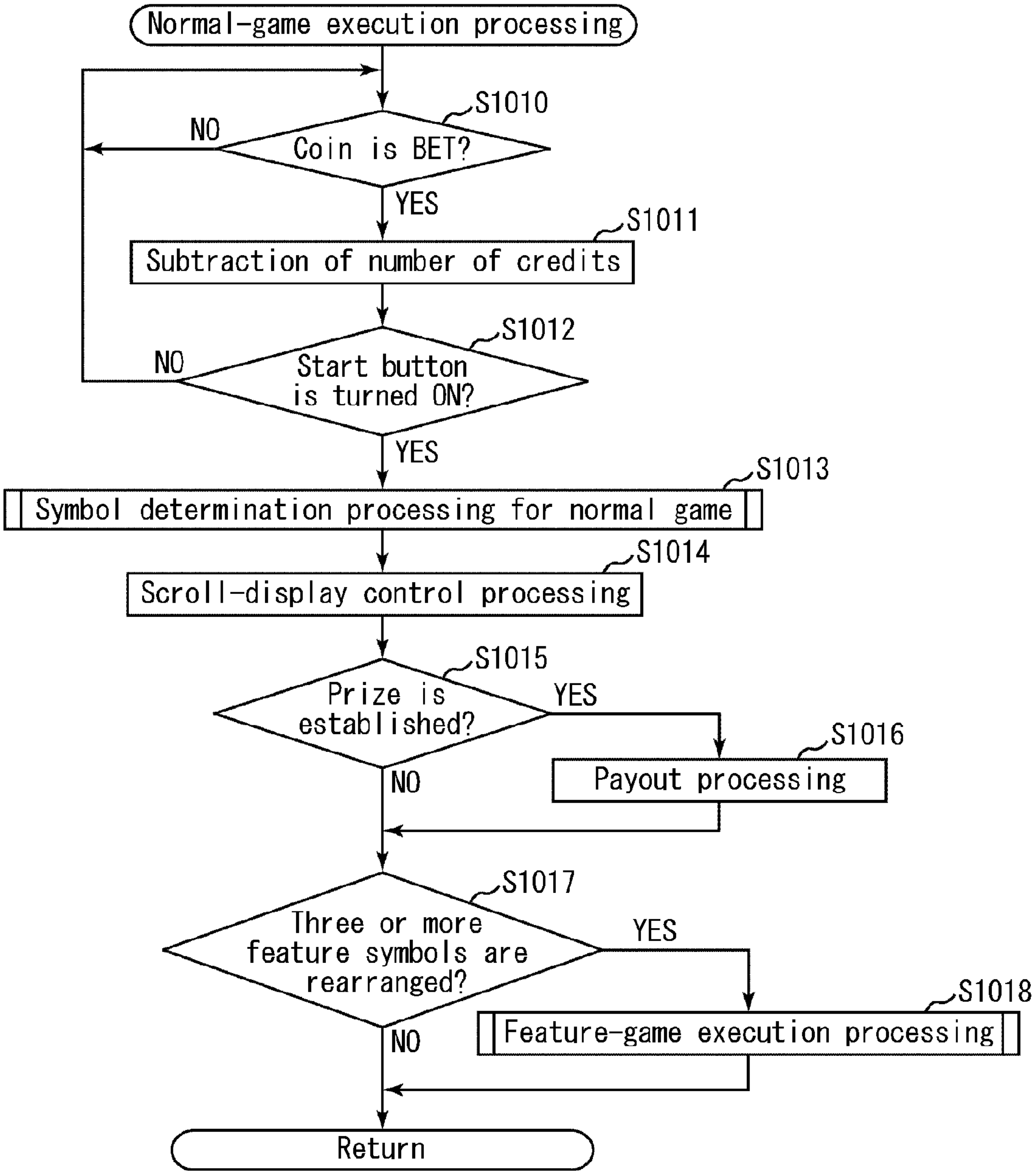
FIG. 27 is a flowchart showing normal-game execution processing in the second embodiment.

FIG. 27 is a flowchart showing normal-game execution processing in the second embodiment.

The game executed by the normal-game execution processing (except for the case where feature-game execution processing is executed in step S1018) corresponds to the normal game in the present invention.

The game executed by the feature-game execution processing in step S1018 corresponds to the special game in the present invention.

The normal game in the present invention only has to be a game in which symbol arrays are scroll-displayed in a single direction and then stop-displayed to a symbol display, and in which game media are paid out in an amount corresponding to the stop-displayed symbol or a combination of the stop-displayed symbols. That is, the normal game in the present invention is not limited to the game (except for the case where the feature-game execution processing is executed in step S1018) executed by the normal-game execution processing shown in FIG. 27, and includes a game having other processing appropriately added thereto, and the like.

Also, the special game in the present invention only has to be a game in which symbol arrays including added symbols are scroll-displayed and then stop-displayed to a symbol display, and in which game media are paid out in an amount corresponding to the stop-displayed symbol or a combination of the stop-displayed symbols. That is, the special game in the present invention is not limited to the feature game (free game) executed in step S1018, and may be, for example, a game that can be executed on condition that a game medium has been betted.

First, the main CPU 1041 determines whether or not a coin has been betted (step S1010). In this processing, the main CPU 1041 determines whether or not it has received an input signal that is outputted from the 1-BET switch 1026S when the 1-BET button 1026 is operated, or an input signal that is outputted from the maximum BET switch 1027S when the maximum BET button 1027 is operated. When the main CPU 1041 determines that the coin has not been betted, the processing is returned to step S1010.

On the other hand, when determining in step S1010 that the coin has been betted, the main CPU 1041 conducts processing for making a subtraction from the number of credits stored in the RAM 1043 according to the number of betted coins (step S1011). It is to be noted that, when the number of coins to be betted is larger than the number of credits stored in the RAM 1043, the main CPU 1041 does not conduct the processing for making a subtraction from the number of credits stored in the RAM 1043, and the processing is returned to step S1010. Further, when the number of coins to be betted exceeds the upper limit of the number of coins that can be betted in one game (500 coins in the present embodiment), the main CPU 1041 does not conduct the processing for making a subtraction from the number of credits stored in the RAM 1043, and the processing is advanced to step S1012.

Next, the main CPU 1041 determines whether or not the start button 1023 has been turned ON (step S1012). In this processing, the main CPU 1041 determines whether or not it has received an input signal that is outputted from the start switch 1023S when the start button 1023 is pressed.

When the main CPU 1041 determines that the start button 1023 has not been turned ON, the processing is returned to step S1010.

It is to be noted that, when the start button 1023 is not turned ON (e.g. when the start button 1023 is not turned ON and a command to end the game is inputted), the main CPU 1041 cancels a subtraction result in step S1011.

On the other hand, when determining in step S1012 that the start button 1023 is turned ON, the main CPU 1041 executes the symbol determination processing for a normal game (step S1013).

FIG. 28 is a view showing the symbol table for a normal game in the second embodiment.

As shown in FIG. 28, the correspondence relationship among each symbol in each symbol array, the code number, and the random number range is specified. In FIG. 28, the first array (the symbol array L1001) corresponds to the leftmost column of the display block 1028.

In the symbol determination processing for a normal game, the main CPU 1041 executes the symbol determination program stored in the RAM 1043, to determine the code numbers at stopping the symbols. Specifically, the main CPU 1041 acquires random number values, and then refers to the symbol table for a normal game so as to determine the code numbers corresponding to the ranges to which the respective acquired random number values belong as the code numbers of the symbols to be stop-displayed to the uppermost display blocks 1028. The symbol determination program for a normal game is described in detail later using the drawing.

Next, in step S1014, the main CPU 1041 performs scroll-display control processing. This processing is processing for controlling the display so as to rearrange the symbols determined in step S1013 after starting scroll of the symbols.

Next, the main CPU 1041 determines whether or not a prize has been established (step S1015). Here, establishment of the prize in the present embodiment is described.

Figure 29:
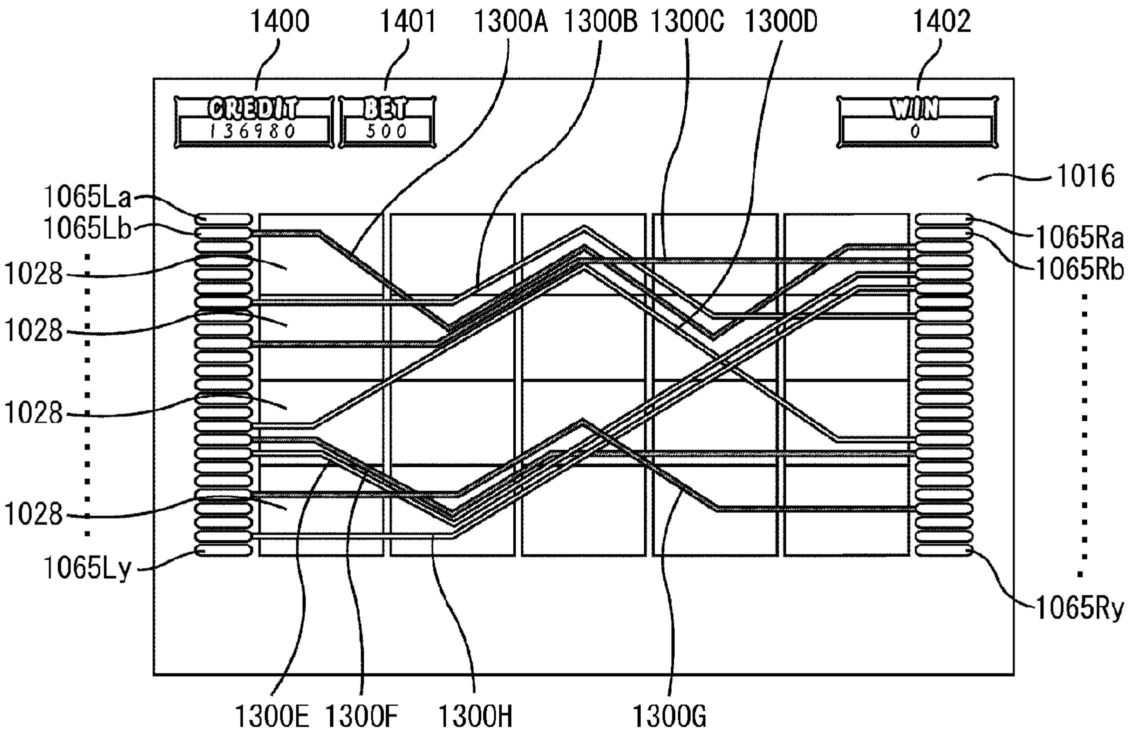
FIG. 29 is a view showing an exemplary image displayed to a lower image display panel provided in the slot machine according to the second embodiment of the present invention.

FIG. 29 is a view showing an exemplary image displayed to the lower image display panel provided in the slot machine according to the second embodiment of the present invention.

FIG. 30 is a view showing a correspondence relationship among the kind and the number of symbols rearranged on the pay line, and the amount of payout in the second embodiment.

As shown in FIG. 29, on the left side of the display blocks 1028, twenty five pay-line generating portions 1065L (1065La, 1065Lb, 1065Lc, 1065Ld, 1065Le, 1065Lf, 1065Lg, 1065Lh, 1065Li, 1065Lj, 1065Lk, 1065Ll, 1065Lm, 1065Ln, 1065Lo, 1065Lp, 1065Lq, 1065Lr, 1065Ls, 1065Lt, 1065Lu, 1065Lv, 1065Lw, 1065Lx, 1065Ly) are displayed.

Similarly, on the right side of the display blocks 1028, twenty five pay-line generating portions 1065R (1065Ra, 1065Rb, 1065Rc, 1065Rd, 1065Re, 1065Rf, 1065Rg, 1065Rh, 1065Ri, 1065Rj, 1065Rk, 1065Rl, 1065Rm, 1065Rn, 1065Ro, 1065Rp, 1065Rq, 1065Rr, 1065Rs, 1065Rt, 1065Ru, 1065Rv, 1065Rw, 1065Rx, 1065Ry) are displayed.

Each of the pay-line generating portions 1065L forms a pair with one of the pay-line generating portions 1065R. The pay line 1300 is previously defined as a line from each pay-line generating portion 1065L to the pay-line generating portion 1065R that is paired with this pay-line generating portion 1065L. A pay line 1300A connects the pay-line generating portion 1065Lb and the pay-line generating portion 1065Rc. A pay line 1300B connects the pay-line generating portion 1065Lg and the pay-line generating portion 1065Rh. A pay line 1300C connects the pay-line generating portion 1065Lj and the pay-line generating portion 1065Rd. A pay line 1300D connects the pay-line generating portion 1065Lp and the pay-line generating portion 1065Rq. A pay line 1300E connects the pay-line generating portion 1065Lr and the pay-line generating portion 1065Re. A pay line 1300F connects the pay-line generating portion 1065Lq and the pay-line generating portion 1065Rr. A pay line 1300G connects the pay-line generating portion 1065Lu and the pay-line generating portion 1065Rv. A pay line 1300H connects the pay-line generating portion 1065Lx and the pay-line generating portion 1065Rf.

It is to be noted that only eight pay lines 1300 are drawn in FIG. 29 for the sake of facilitating the explanation. However, in the present embodiment, twenty five pay lines 1300 are defined. The pay line P2 shown in FIG. 24A corresponds to one of the pay lines 1300.

It is to be noted that the number-of-credits display portion 1400 showing the number of credited coins, the number-of-bets display portion 1401 showing the number of betted coins, and the payout display portion 1402 showing the number of coins to be paid out are displayed on the upper side of the lower image display panel 1016.

Establishment of the prize in the present embodiment refers to a case where at least one combination of two or more symbols of the same kind out of "10", "J", "Q", "K", "FLOWER 1", "FLOWER 2", "BIRD" and "FISH" is rearranged on one of the pay lines 1300. It is to be noted that "WILD" as the wild symbol is a symbol which can be substituted for another symbol. Namely, in a case where one symbol of "10" and one symbol of "WILD" are displayed on the pay line, it is regarded as display of two symbols of "10" on the pay line, and determined as winning of the prize.

In the processing of step S1015, the main CPU 1041 counts the number of symbols of each kind rearranged on each pay line 1300 with respect to the symbols rearranged in step S1014. The main CPU 1041 then determines whether or not the number of counted symbols is equal to or more than two.

When determining that the prize has been established (step S1015 in FIG. 27: YES), the main CPU 1041 executes processing relating to the payout of coins (step S1016). In the processing, the main CPU 1041 determines the amount of payout based on the numbers of symbols rearranged on the pay line 1300 with reference to the odds data stored in the RAM 1043. The odds data is data indicative of the correspondence relationship between the number of symbols rearranged on the pay line 1300 and the amount of payout (see FIG. 30). It is to be noted that the amount of payout is doubled along with each symbol of "WILD" displayed on the pay line 1300 where the prize has been established. Namely, when three symbols of "WILD" are displayed on the pay line 1300 where the prize has been established, the amount of payout is octuplicated.

In the present embodiment, the case is described where it is determined that the prize has been established when at least one combination of two or more symbols of the same kind out of "10", "J", "Q", "K", "FLOWER 1", "FLOWER 2", "BIRD" and "FISH" is rearranged on one of the pay lines 1300. However, in the present invention, the pay line may not be provided, and it may be determined that a prize is established when at least one combination of two or more symbols of the same kind out of "10", "J", "Q", "K", "FLOWER 1", "FLOWER 2", "BIRD" and "FISH" is rearranged among symbols rearranged in the display blocks 1028.

Figure 31A:
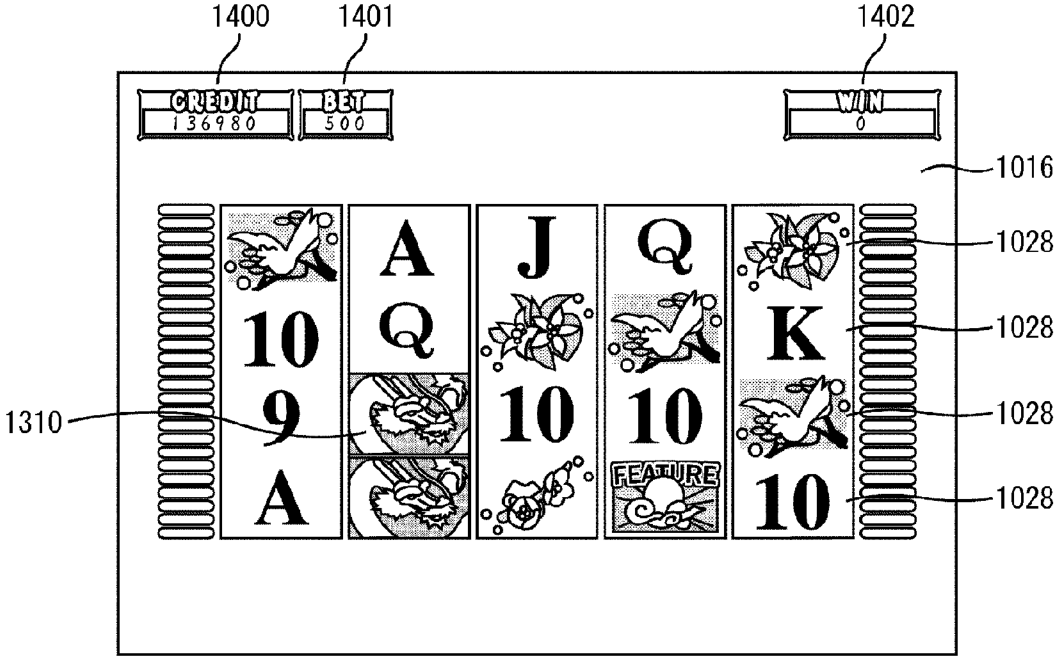
FIG. 31A is a view showing an exemplary image displayed to the lower image display panel provided in the slot machine according to the second embodiment of the present invention.

FIG. 31A is a view showing an exemplary image displayed to the lower image display panel provided in the slot machine according to the second embodiment of the present invention.

Figure 31B:
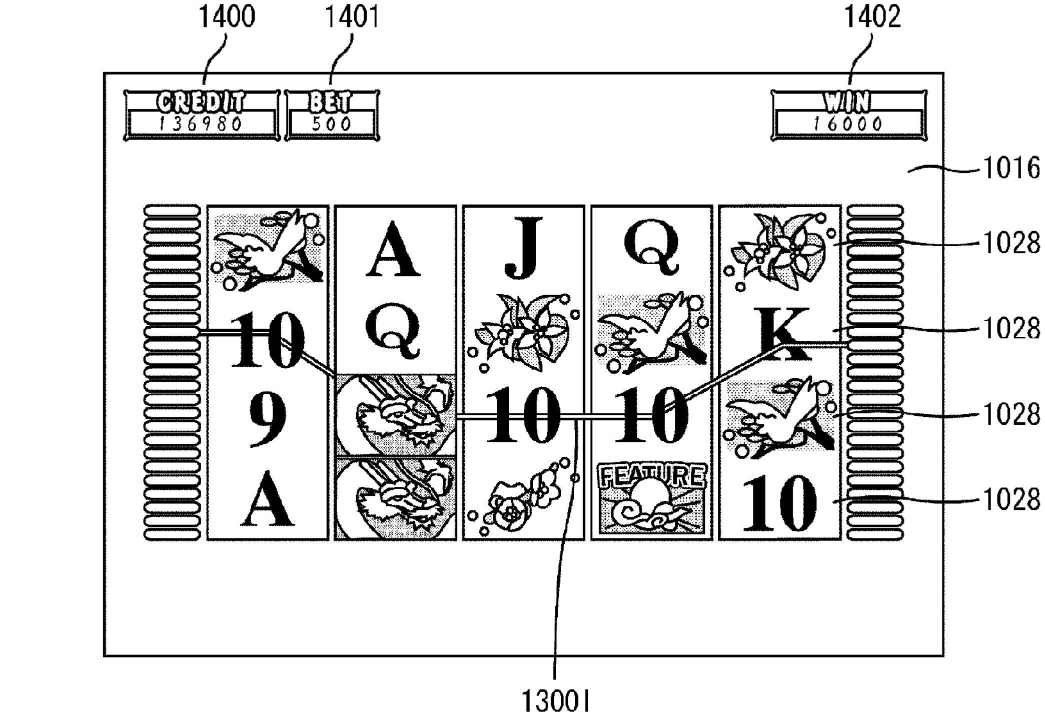
FIG. 31B is a view showing an exemplary image displayed to the lower image display panel provided in the slot machine according to the second embodiment of the present invention.

FIG. 31B is a view showing an exemplary image displayed to the lower image display panel provided in the slot machine according to the second embodiment of the present invention.

When the symbols shown in FIG. 31A have been rearranged as a result of the scroll-display control processing in step S1014, a pay line 1300I is displayed as shown in FIG. 31B. On the pay line 1300I, three symbols of "10", one symbol of "WILD", and one symbol of "K" are rearranged.

In this case, it is regarded as rearrangement of four symbols of "10", and then 3000 coins, obtained by multiplying 500 (the number of betted coins) by 6, are determined as an amount of payout. Further, it is regarded as rearrangement of two symbols of "K", and then 5000 coins, obtained by multiplying 500 (the number of betted coins) by 10, are determined as an amount of payout. Moreover, since one symbol of "WILD" is displayed on the pay line 1300I where the prize has been established, the amount of payout is to be doubled. Namely, 16000 coins, obtained by adding 5000 to 3000 to make 8000 and then multiplying 8000 by 2, are determined as the amount of payout.

In the case of accumulating coins, the main CPU 1041 conducts processing for adding the number of credits corresponding to the determined amount of payout to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step S1015 that a prize has not been established, or after executing the processing of step S1016, the main CPU 1041 determines whether or not three or more feature symbols have been rearranged (step S1017). In this processing, the main CPU 1041 determines whether or not three or more feature symbols have been rearranged in the display blocks 1028, without considering the pay line 1300.

When determining in step S1017 that three or more feature symbols have been rearranged, the main CPU 1041 executes the feature-game execution processing (step S1018). In the feature-game execution processing, a free game with the number of wild symbols increased is executed. The feature-game execution processing is described in detail later using the drawing.

The rearrangement of three or more feature symbols corresponds to the predetermined condition in the present invention.

When determining in step S1017 that three or more feature symbols are not rearranged or after executing the processing of step S1018, the main CPU 1041 completes the present subroutine.

Figure 32:
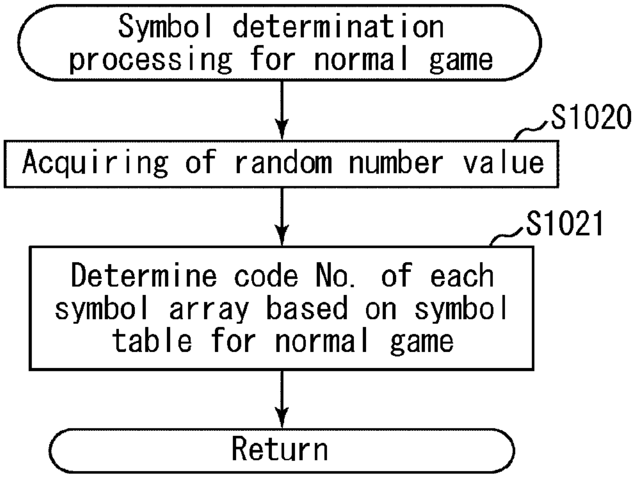
FIG. 32 is a flowchart showing a subroutine of symbol determination processing for a normal game in the second embodiment.

FIG. 32 is a flowchart showing a subroutine of the symbol determination processing for a normal game in the second embodiment.

This processing is processing performed by the main CPU 1041 executing the symbol determination program stored in the RAM 1043.

First, the main CPU 1041 acquires random number values from the random number generator 1064 (step S1020). In this processing, the main CPU 1041 acquires five random number values corresponding to the respective symbol arrays for the display blocks 1028.

Next, based upon the acquired five random number values and the symbol table for a normal game, the main CPU 1041 determines code numbers at stopping symbols (step S1021). For example, "07" is determined as the code number of the first array when the random number value for the first array is 23035. It should be noted that the code numbers for symbol arrays correspond to the code numbers of symbols to be rearranged to the display blocks 1028 in the first row out of the display blocks 1028 that are put in four rows.

After executing the processing of step S1021, the main CPU 1041 completes the present subroutine.

In the present embodiment, the case has been described where the random number generator 1064 is provided and a random number is extracted from the random number generator (a case of using a so-called hardware random number). However, in the present invention, a random number may be generated on the program (a case of using a so-called software random number).

Next, the feature-game execution processing is described with reference to FIG. 33.

Figure 33:
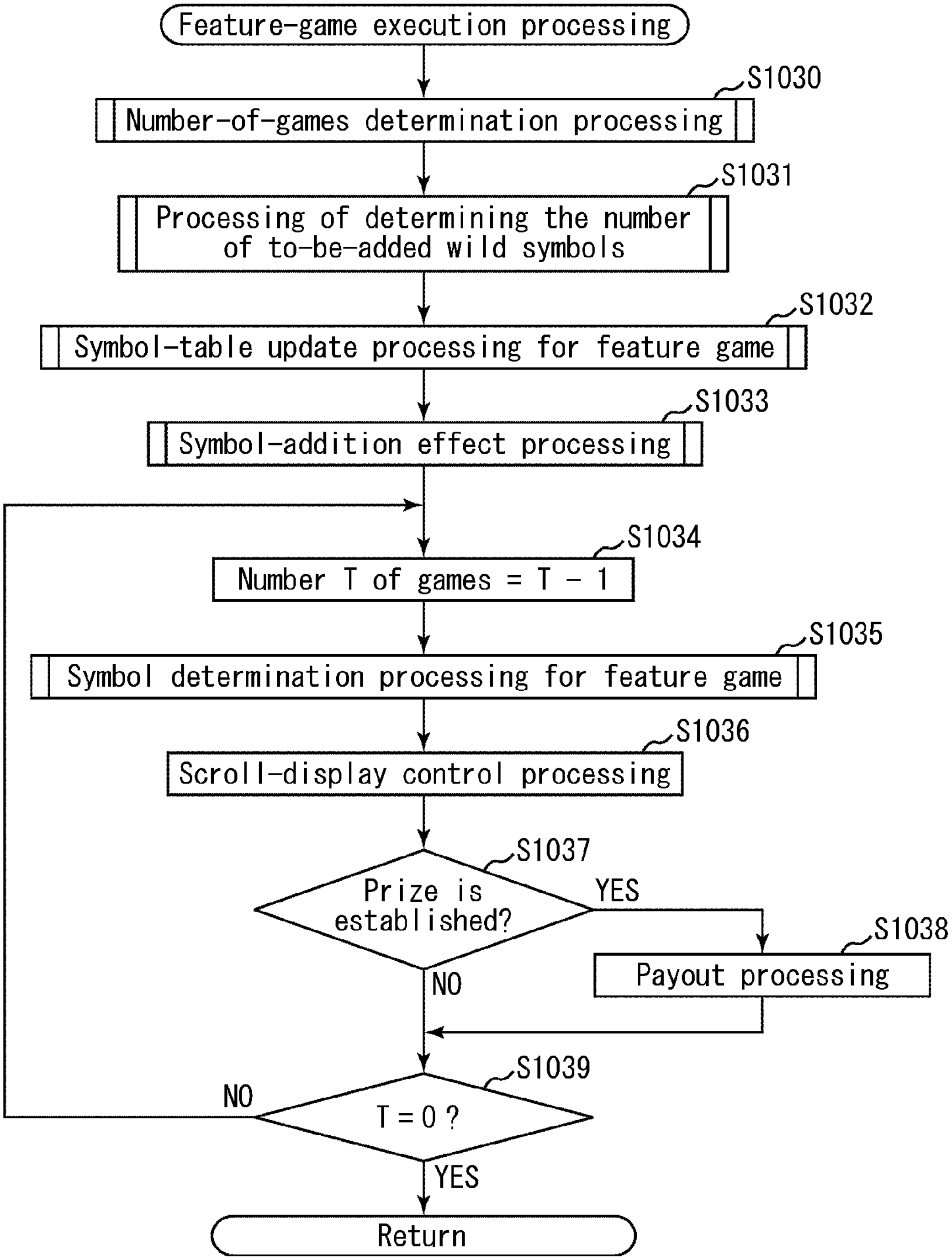
FIG. 33 is a flowchart showing a subroutine of feature-game execution processing in the second embodiment.

FIG. 33 is a flowchart showing a subroutine of the feature-game execution processing in the second embodiment.

A game executed by the feature-game execution processing corresponds to the special game in the present invention. It should be noted that the player can play the game without betting coins in the feature game.

First, the main CPU 1041 executes number-of-games determination processing (step S1030). In the number-of-games determination processing, the main CPU 1041 determines the number T of games based upon a selection image 1307 (cf. FIG. 36A) selected by the player, and stores the number T of games into the RAM 1043. The number-of-games determination processing is described in detail later using the drawing.

Next, the main CPU 1041 executes processing of determining the number of to-be-added wild symbols (step S1031). In the processing of determining the number of to-be-added wild symbols, the main CPU 1041 determines the number of to-be-added wild symbols, based upon the selection image 1302 (cf. FIG. 39A) selected by the player. The processing of determining the number of to-be-added wild symbols is described in detail later using the drawing.

Next, the main CPU 1041 executes symbol-table update processing for a feature game (step S1032). In the symbol-table update processing for a feature game, the main CPU 1041 updates the symbol table for the feature game, based upon the number of to-be-added wild symbols determined by the processing of determining the number of to-be-added wild symbols. The symbol-table update processing for a feature game is described in detail later using the drawing.

Next, in step S1033, the main CPU 1041 executes symbol-addition effect processing.

The symbol-addition effect processing is described later using FIG. 44.

Next, the main CPU 1041 stores into the RAM 1043 a numeric value obtained by subtracting 1 from the number T of games stored in the RAM 1043, as a new number T of games (step S1034).

Next, the main CPU 1041 executes symbol determination processing for the feature game (step S1035). In the symbol determination processing for the feature game, the main CPU 1041 executes the symbol determination program stored in the RAM 1043, to determine code numbers at stopping the symbols. Specifically, the main CPU 1041 acquires random number values, and then refers to the symbol table for the feature game (cf. FIG. 43A and FIG. 43B) so as to determine the code numbers corresponding to the ranges to which the respective acquired random number values belong as the code numbers of the symbols to be stop-displayed to the uppermost display blocks 1028. The symbol determination processing for the feature game is described in detail later using the drawing.

Next, in step S1036, the main CPU 1041 performs the scroll-display control processing. This processing is processing for controlling the display so as to rearrange the symbols determined in step S1035 after starting the scrolling of the symbols. In this processing, the symbols including the added wild symbols are scroll-displayed.

Next, the main CPU 1041 determines whether or not a prize has been established (step S1037). As described above, establishment of the prize in the present embodiment refers to a case where at least one combination of two or more symbols of the same kind out of "10", "J", "Q", "K", "FLOWER 1", "FLOWER 2", "BIRD" and "FISH" is rearranged on one of the pay lines 1300. It is to be noted that the symbol of "WILD" as the wild symbol is a symbol which can be substituted for another symbol. In the feature game, since the number of wild symbols has become larger than that in the normal game, the prize is more likely to be established compared to the normal game.

In the processing of step S1037, the main CPU 1041 counts the number of symbols of each kind rearranged on each pay line 1300 with respect to the symbols rearranged in step S1036. The main CPU 1041 then determines whether or not the counted number is equal to or more than two.

When determining that the prize has been established, the main CPU 1041 executes processing relating to the payout of coins (step S1038). Since this processing is the same as the processing of step S1016, the description thereof is omitted here.

Next, the main CPU 1041 determines whether or not the number T of games stored in the RAM 1043 is zero (step S1039). When determining that the number T of games is not zero, the main CPU 1041 returns the processing to step S1034. On the other hand, when determining that the number T of games is zero, the main CPU 1041 completes the present subroutine.

Figure 34:
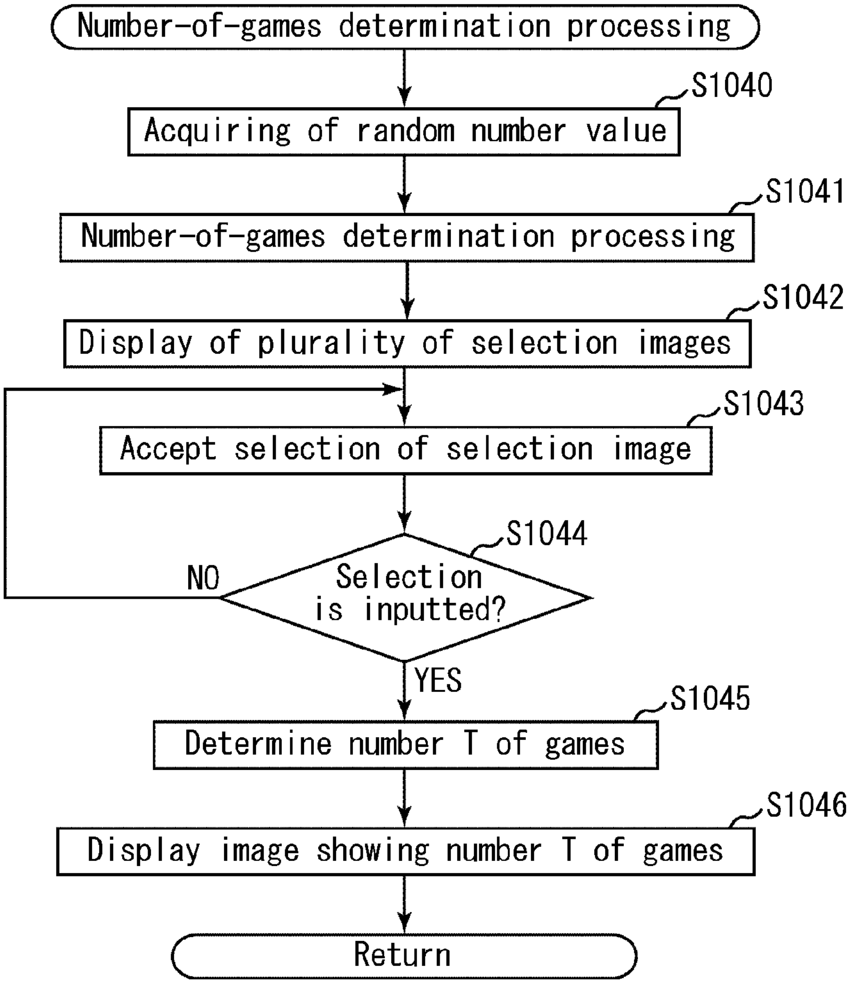
FIG. 34 is a flowchart showing a subroutine of number-of-games determination processing in the second embodiment.

FIG. 34 is a flowchart showing a subroutine of the number-of-games determination processing in the second embodiment.

First, the main CPU 1041 acquires random number values from the random number generator 1064 (step S1040). In this processing, the main CPU 1041 acquires five random number values corresponding to the respective selection images 1307 (a selection image 1307A, a selection image 1307B, a selection image 1307C, a selection image 1307D, a selection image 1307E (cf. FIG. 36A)).

Next, the main CPU 1041 determines the number of games corresponding to each selection image 1307 (step S1041). In this processing, the main CPU 1041 determines the number of games corresponding to each selection image 1307, based upon the random number value acquired in step S1040 and the number-of-games determination table shown in FIG. 35.

FIG. 35 is a view showing the number-of-games determination table in the second embodiment.

The number-of-games determination table shows the correspondence relationship between the number of games and the random number value.

For example, when random number values corresponding to the selection image 1307A, the selection image 1307B, the selection image 1307C, the selection image 1307D and the selection image 1307E are respectively 12235, 23123, 62387, 32332 and 23423, the numbers of games of 5, 10, 30, 15 and 10 respectively correspond to the selection image 1307A, the selection image 1307B, the selection image 1307C, the selection image 1307D and the selection image 1307E.

Next, the main CPU 1041 displays the selection image 1307A, the selection image 1307B, the selection image 1307C, the selection image 1307D and the selection image 1307E to the lower part of the lower image display panel 1016 (step S1042). The main CPU 1041 then accepts the selection of the selection image 1307 made by the player (step S1043).

Figure 36A:
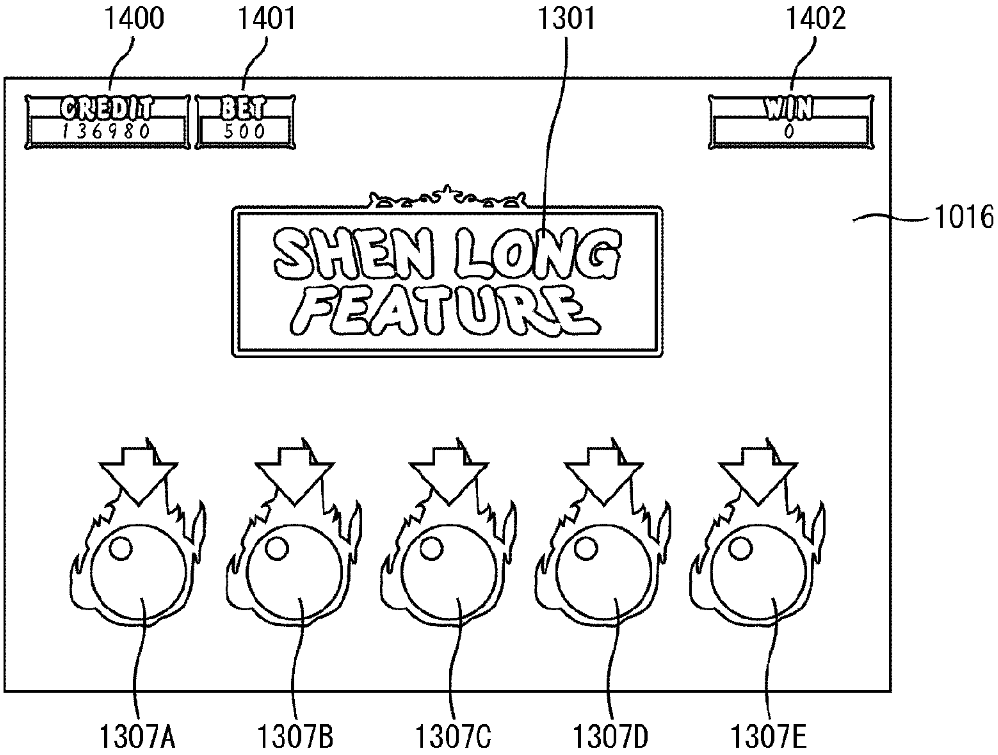
FIG. 36A is a view showing an exemplary image displayed to the lower image display panel provided in the slot machine according to the second embodiment of the present invention.

FIG. 36A is a view showing an exemplary image displayed to the lower image display panel provided in the slot machine according to the second embodiment of the present invention.

As shown in FIG. 36A, a feature-game start image 1301 showing the start of the feature game is displayed to the center part of the lower image display panel 1016.

To the lower part of the lower image display panel 1016, five selection images 1307 (the selection image 1307A, the selection image 1307B, the selection image 1307C, the selection image 1307D, the selection image 1307E) are displayed. The player can select the selection image 1307 by touching the touch panel 1069 (cf. FIG. 26) provided on the lower image display panel 1016 with his or her finger or the like.

Next, the main CPU 1041 determines whether or not input for selecting the selection image 1307 has been made (step S1044). In this processing, the main CPU 1041 determines whether or not it has received from the touch panel 1069 an input signal for selecting the selection image 1307. By the player touching a place in the vicinity of where the selection image 1307A is displayed on the lower image display panel 1016 with his or her finger or the like, the input signal for selecting the selection image 1307A is transmitted from the touch panel 1069 to the main CPU 1041. When the main CPU 401 determines that the input for selecting the selection image 1307 has not been made, the main CPU 1041 returns the processing to step S1043.

On the other hand, when determining in step S1044 that the input for selecting the selection image 1307 has been made, the main CPU 1041 determines the number of games corresponding to the selection image 1307 selected by the player, as the number T of games (step S1045).

For example, when the selection image 1307B is selected by the player in a case where the numbers of games of 5, 10, 30, 15 and 10 respectively correspond to the selection image 1307A, the selection image 1307B, the selection image 1307C, the selection image 1307D and the selection image 1307E, then the number of games of 10 is determined as the number T of games. Next, the main CPU 1041 displays a number-of-games determination image showing the number T of games of the feature game to the center part of the lower image display panel 1016 (step S1046).

Figure 36B:
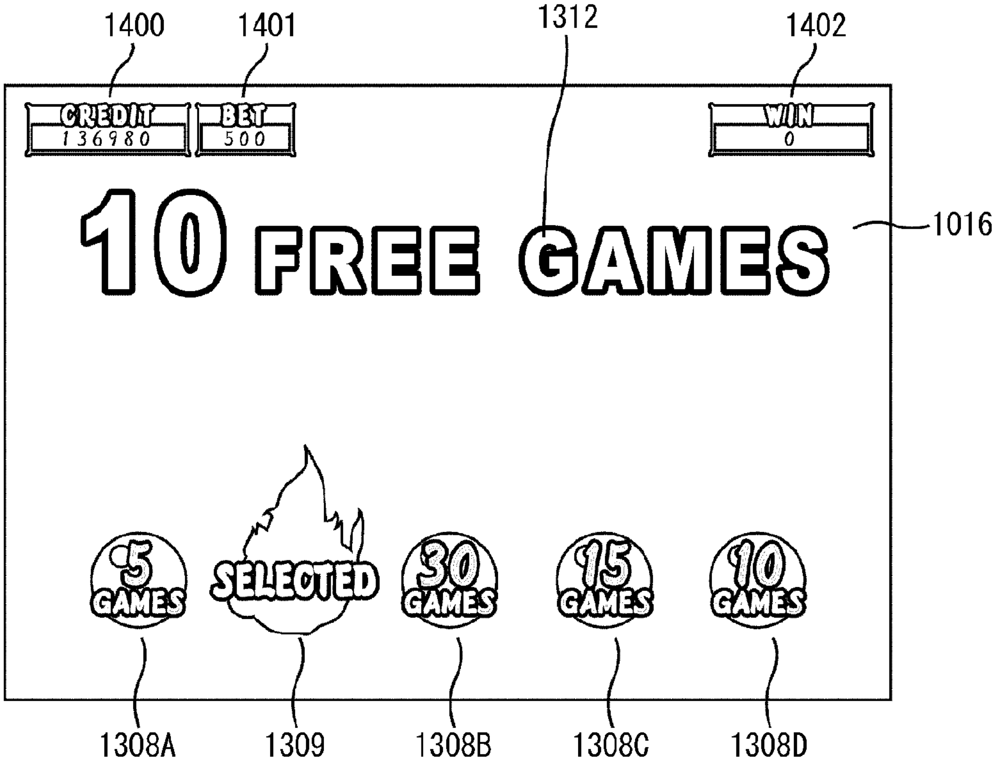
FIG. 36B is a view showing an exemplary image displayed to the lower image display panel provided in the slot machine according to the second embodiment of the present invention.

FIG. 36B is a view showing an exemplary image displayed to the lower image display panel provided in the slot machine according to the second embodiment of the present invention.

As shown in FIG. 36B, a number-of-games determination image 1312 showing the number T of games of the feature game is displayed to the center part of the lower image display panel 1016. In FIG. 36B, the number-of-games determination image 1312 shows that the number T of games of the feature game is 10. Further, the number-of-games images 1308 (a number-of-games image 1308A, a number-of-games image 1308B, a number-of-games image 1308C, a number-of-games image 1308D), each showing the number T of games of the case where another selection image 1307 has been selected, are displayed to the lower part of the lower image display panel 1016. The number-of-games image 1308A, the number-of-games image 1308B, the number-of-games image 1308C and the number-of-games image 1308D respectively show that the numbers T of games of the feature game would have been 5, 30, 15 and 10 if the selection image 1307 displayed in the corresponding place had been selected by the player. Further, a selected image 1309 shows that the selection image 1307B having been displayed at this position has been selected by the player.

After executing the processing of step S1046, the main CPU 1041 completes the present subroutine.

In the present embodiment, the case has been described where the number of games corresponding to each selection image 1307 is determined based upon the acquired random number value and the number-of-games determination table shown in FIG. 35. However, in the present invention, the number of games corresponding to each selection image 1307 may be previously determined.

Figure 37:
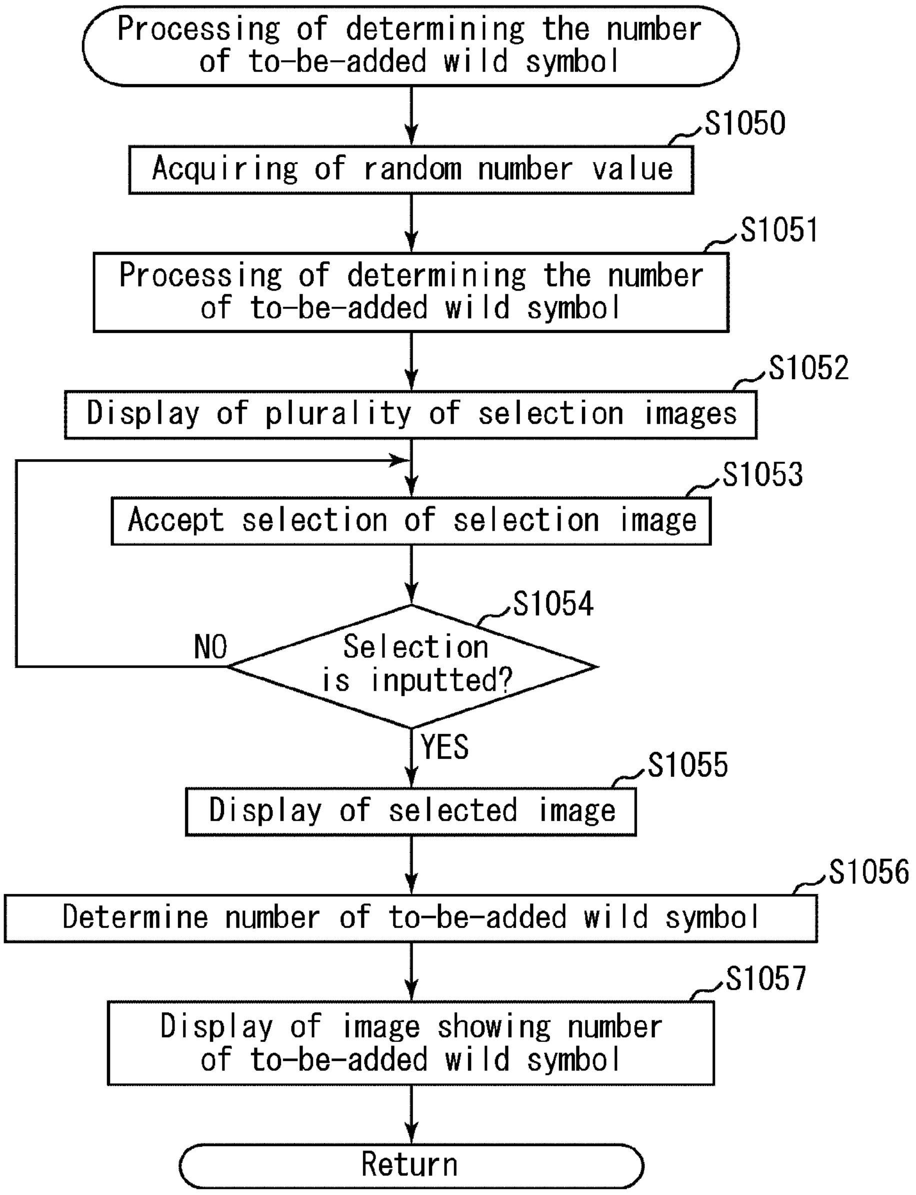
FIG. 37 is a flowchart showing a subroutine of processing of determining the number of to-be-added wild symbols in the second embodiment.

FIG. 37 is a flowchart showing a subroutine of the processing of determining the number of to-be-added wild symbols in the second embodiment.

First, the main CPU 1041 acquires random number values from the random number generator 1064 (step S1050). In this processing, the main CPU 1041 acquires five random number values corresponding to the respective selection images 1302 (the selection image 1302A, the selection image 1302B, the selection image 1302C, the selection image 1302D and the selection image 1302E (cf. FIG. 24A)).

Next, the main CPU 1041 determines the number of to-be-added wild symbols which corresponds to each selection image 1302 (step S1051). In this processing, the main CPU 1041 determines the number of to-be-added wild symbols which corresponds to each selection image 1302, based upon the random number value obtained in step S1050 and a table for determining the number of to-be-added wild symbols which is shown in FIG. 38.

FIG. 38 is a view showing the table for determining the number of to-be-added wild symbols in the second embodiment.

The table for determining the number of to-be-added wild symbols shows the correspondence relationship between the number of to-be-added wild symbols and the random number value.

For example, when random number values corresponding to the selection image 1302A, the selection image 1302B, the selection image 1302C, the selection image 1302D and the selection image 1302E are respectively 17235, 63123, 32387, 22332, and 3423, then the numbers 20, 50, 30, 20 and 10 respectively correspond to the selection image 1302A, the selection image 1302B, the selection image 1302C, the selection image 1302D and the selection image 1302E, as the number of to-be-added wild symbols.

Next, the main CPU 1041 displays the selection image 1302A, the selection image 1302B, the selection image 1302C, the selection image 1302D and the selection image 1302E to the lower part of the lower image display panel 1016 (step S1052). The main CPU 1041 then accepts the selection of the selection image 1302 made by the player (step S1053).

Figure 39A:
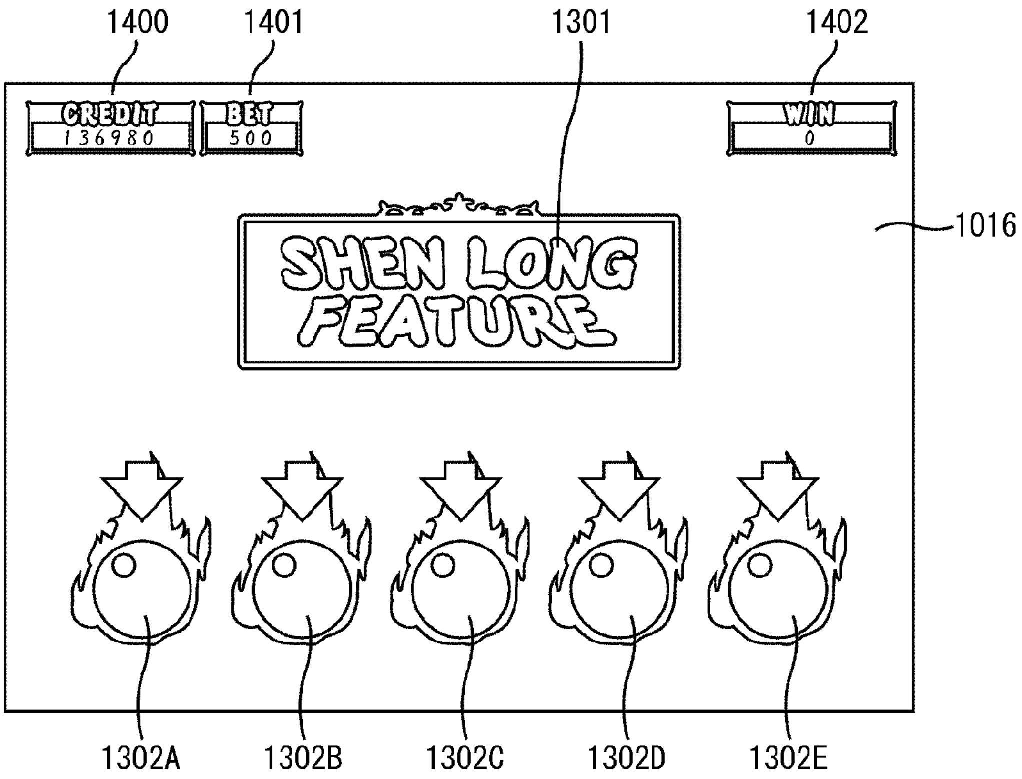
FIG. 39A is a view showing an exemplary image displayed to the lower image display panel provided in the slot machine according to the second embodiment of the present invention.

FIG. 39A is a view showing an exemplary image displayed to the lower image display panel provided in the slot machine according to the second embodiment of the present invention.

As shown in FIG. 39A, a feature-game start image 1301 showing the start of the feature game is displayed to the center part of the lower image display panel 1016.

To the lower part of the lower image display panel 1016, the five selection images 1302 (the selection image 1302A, the selection image 1302B, the selection image 1302C, the selection image 1302D, the selection image 1302E) are displayed. The player can select the selection image 1302 by touching the touch panel 1069 provided on the lower image display panel 1016 with his or her finger or the like.

Next, the main CPU 1041 determines whether or not input for selecting the selection image 1302 has been made (step S1054). In this processing, the main CPU 1041 determines whether or not it has received from the touch panel 1069 an input signal for selecting the selection image 1302. By the player touching a place in the vicinity of where the selection image 1302E is displayed on the lower image display panel 1016 by his or her finger or the like, the input signal for selecting the selection image 1302E is transmitted from the touch panel 1069 to the main CPU 1041. When the main CPU 1041 determines that the input for selecting the selection image 1302 has not been made, the main CPU 1041 returns the processing to step S1053.

On the other hand, when determining in step S1054 that the input for selecting the selection image 1302 has been made, the main CPU 1041 displays the selected image 1304 (step S1055).

Figure 39B:
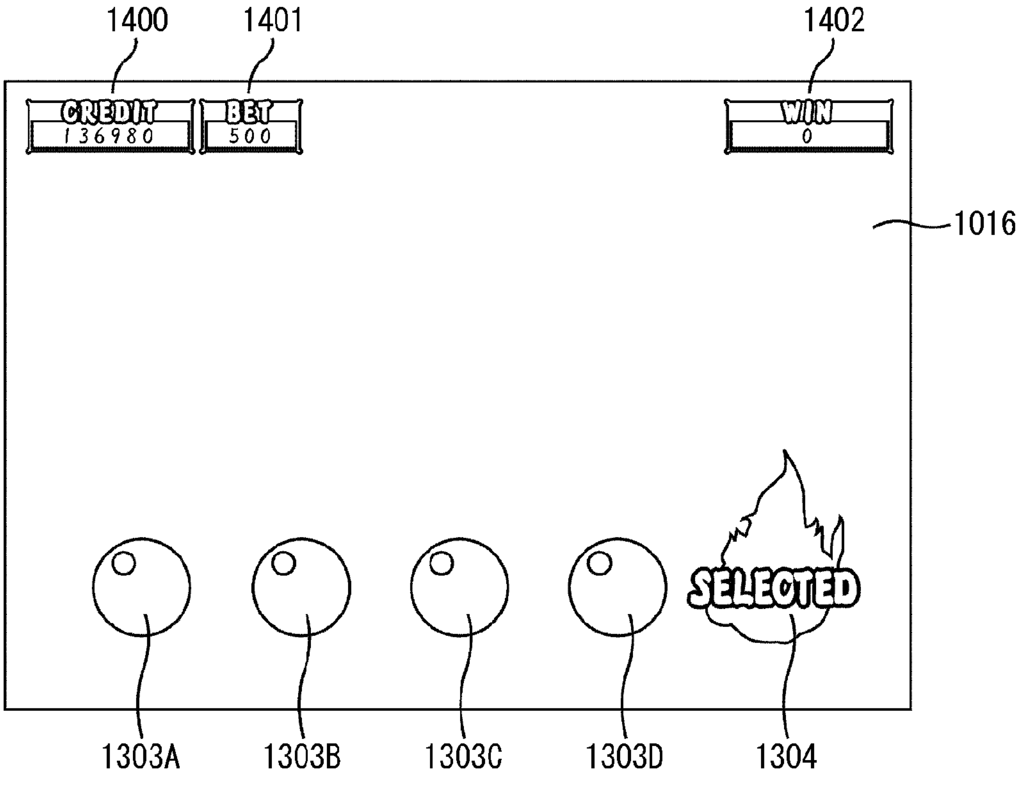
FIG. 39B is a view showing an exemplary image displayed to the lower image display panel provided in the slot machine according to the second embodiment of the present invention.

FIG. 39B is a view showing an exemplary image displayed to the lower image display panel provided in the slot machine according to the second embodiment of the present invention.

FIG. 39B is a view showing an exemplary image displayed to the lower image display panel in a case where the selection image 1302E is selected by the player.

When the selection image 1302E is selected by the player, as shown in FIG. 39B, the selected image 1304 is displayed at the position where the selection image 1302E has been displayed on the lower image display panel 1016. Further, at the positions where the selection images 1302 having not been selected had been displayed, non-selected images 1303 (the non-selected image 1303A, the non-selected image 1303B, the non-selected image 1303C, the non-selected image 1303D) are displayed.

Next, the main CPU 1041 determines the number of to-be-added wild symbols corresponding to the selection image 1302 selected by the player, as the number of to-be-added wild symbols (step S1056).

For example, when the selection image 1302E is selected by the player in a case where the numbers of to-be-added wild symbols of 20, 50, 30, 20 and 10 respectively correspond to the selection image 1302A, the selection image 1302B, the selection image 1302C, the selection image 1302D and the selection image 1302E, then 10 is determined as the number of to-be-added wild symbols. Next, the main CPU 1041 displays a to-be-added number determination image 1305, showing the number of to-be-added wild symbols, to the center part of the lower image display panel 1016 (step S1057).

Figure 39C:
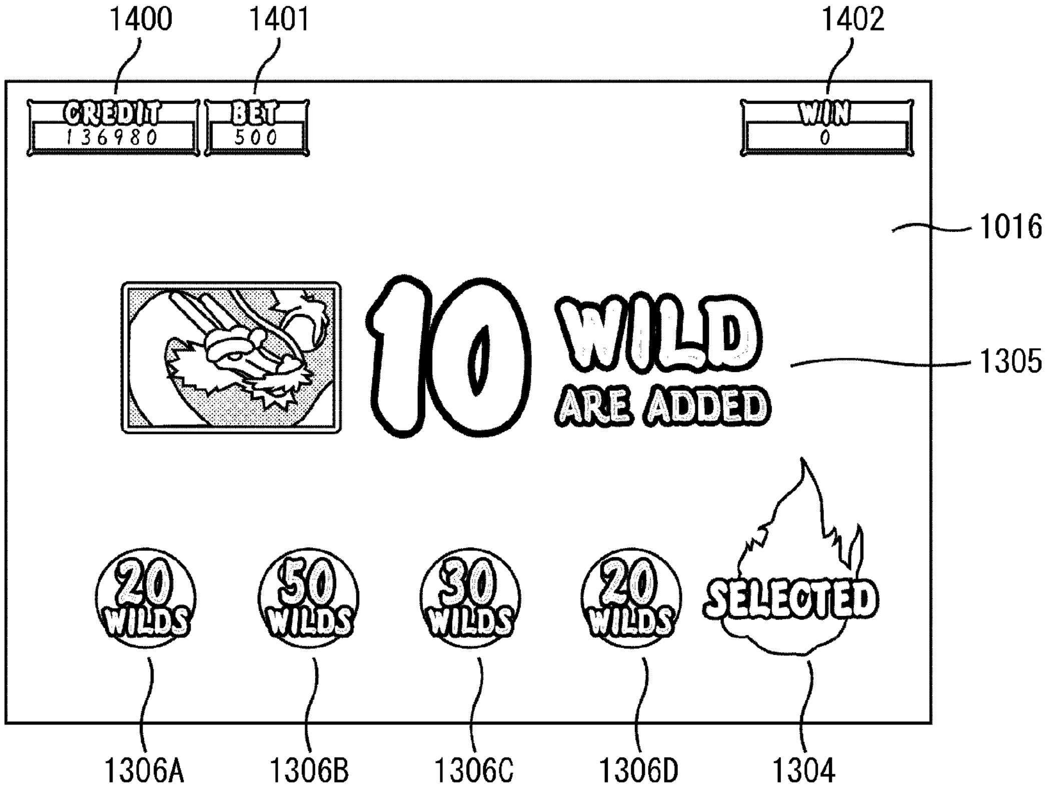
FIG. 39C is a view showing an exemplary image displayed to the lower image display panel provided in the slot machine according to the second embodiment of the present invention.

FIG. 39C is a view showing an exemplary image displayed to the lower image display panel provided in the slot machine according to the second embodiment of the present invention.

As shown in FIG. 39C, the to-be-added number determination image 1305, showing the number of to-be-added wild symbols, is displayed to the center part of the lower image display panel 1016. In FIG. 39C, the to-be-added number determination image 1305 shows that the wild symbols will be increased by ten. Further, to-be-added number images 1306 (a to-be-added number image 1306A, a to-be-added number image 1306B, a to-be-added number image 1306C, a to-be-added number image 1306D) are displayed to the lower part of the lower image display panel 1016, each showing the number of the wild symbols which would have been added if another selection image 1302 had been selected. The to-be-added number image 1306A, the to-be-added number image 1306B, the to-be-added number image 1306C and the to-be-added number image 1306D respectively show that the wild symbols would have been increased by 20, 50, 30 and 20, if the selection image 1302 displayed in the corresponding place had been selected.

After executing the processing of step S1057, the main CPU 1041 completes the present subroutine.

In the present embodiment, the case has been described where the number of to-be-added wild symbols corresponding to each selection image 1302 is determined based upon the acquired random number value and the table for determining the number of to-be-added wild symbols, which is shown in FIG. 38. However, in the present invention, the number of to-be-added wild symbols corresponding to each selection image 1302 may be previously determined.

Figure 40:
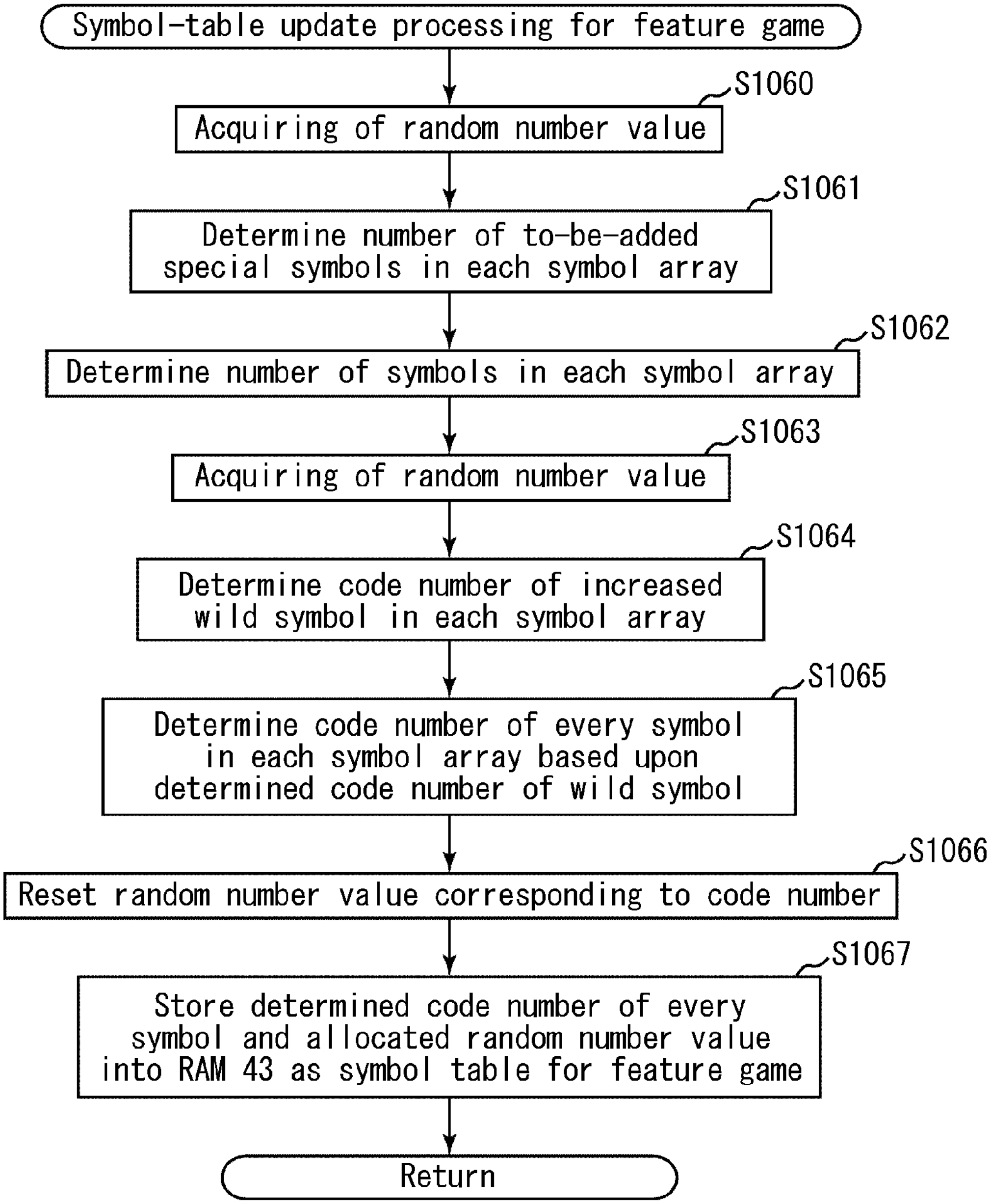
FIG. 40 is a flowchart showing a subroutine of symbol-table update processing for a feature game in the second embodiment.

FIG. 40 is a flowchart showing a subroutine of the symbol-table update processing for a feature game in the second embodiment.

First, the main CPU 1041 acquires random number values from the random number generator 1064 (step S1060). In this processing, the main CPU 1041 acquires the same number of random number values as the number of to-be-added wild symbols, which is determined in step S1056.

Next, the main CPU 1041 determines the number of to-be-added wild symbols for each symbol array (step S1061). In this processing, the main CPU 1041 determines the number of the wild symbols to be added to each symbol array, based upon the random number value acquired in step S1060 and the symbol-array determination table shown in FIG. 41.

FIG. 41 is a view showing the symbol-array determination table in the second embodiment.

The symbol-array determination table shows the correspondence relationship between the symbol array No. and the random number value. It is to be noted that the symbol array L1001 corresponds to the first column of the display blocks 1028, the symbol array L1002 corresponds to the second column of the display blocks 1028, the symbol array L1003 corresponds to the third column of the display blocks 1028, the symbol array L1004 corresponds to the fourth column of the display blocks 1028, and the symbol array L1005 corresponds to the fifth column of the display blocks 1028.

For example, when the random number values acquired in step S1060 are 2313, 3123, 12382, 17325, 28768, 30223, 45235, 48766, 58776 and 62356, the number of to-be-added wild symbols for the symbol array L1001 (the first column) is three, the number of to-be-added wild symbols for the symbol array L1002 (the second column) is one, the number of to-be-added wild symbols for the symbol array L1003 (the third column) is two, the number of to-be-added wild symbols for the symbol array L1004 (the fourth column) is two, and the number of to-be-added wild symbols for the symbol array L1005 (the fifth column) is two.

In the present embodiment, the case has been described where the number of wild symbols to be added to each symbol array is determined based upon the acquired random number value and the symbol-array determination table shown in FIG. 41. However, in the present invention, the number of wild symbols to be added to each symbol array may be previously determined according to each of the numbers of to-be-added wild symbols which is to be determined in the processing of determining the number of to-be-added wild symbols.

Next, the main CPU 1041 determines the number of symbols in each symbol array (step S1062). In this processing, the main CPU 1041 determines a total number of symbols in each symbol array based upon the number of to-be-added wild symbols for each symbol array, which has been determined in step S1061. Specifically, the total number of symbols in each symbol array is a numeric value obtained by adding 20 (the number of symbols in each symbol array shown by the symbol table for a normal game) to the number of to-be-added wild symbols for each symbol array, which has been determined in step S1061.

Next, the main CPU 1041 acquires random number values from the random number generator 1064 (step S1063). In this processing, the main CPU 1041 acquires the same number of random number values as the number of to-be-added wild symbols for each symbol array, which has been determined in step S1061. Namely, when the number of to-be-added wild symbols for the symbol array L1001 (the first column) is three, the main CPU 1041 acquires three random number values for the symbol array L1001 (the first column).

Next, the main CPU 1041 determines for each symbol array a code number of the wild symbol to be added to each symbol array, based upon the random number value acquired in step S1063 (step S1064). In this processing, the main CPU 1041 determines a code number of the wild symbol to be added to each symbol array based upon the random number value acquired in step S1063 and a code-number determination table shown in FIG. 42.

FIG. 42 is a view showing the code-number determination table in the second embodiment.

The code-number determination table shows the correspondence relationship between the code number and the random number value.

For example, in a case where the random number values for the symbol array L1001 (the first column) are 40567, 63535 and 65323, then "13", "End" and "End" are determined as the code numbers.

In the present embodiment, the case has been described where a code number of the wild symbol to be added to each symbol array is determined for each symbol array, based upon the acquired random number value and the code-number determination table shown in FIG. 42. However, in the present invention, a code number of the to-be-added wild symbol may be previously determined for each symbol array.

Next, the main CPU 1041 determines a code number of every symbol in each symbol array based upon the code number of the wild symbol determined in step S1064 (step S1065). In this processing, the main CPU 1041 adds the wild symbol to each symbol array shown by the symbol table for a normal game in FIG. 28, based upon the code number of the wild symbol determined in step S1064. For example, in a case where "13", "End" and "End" are determined in step S1064 as the code numbers of the wild symbols to be added to the symbol array L1001 (the first column), then the wild symbol of "WILD" as the wild symbol is added to code No. 13 in the symbol array L1001 (the first column) shown in the symbol table for a normal game, and "FLOWER 2" originally associated with code No. 13 is shifted to code No. 14; subsequently, each symbol is shifted in the same manner. Further, since there are two wild symbols for which the code number of "End" has been determined, the symbols of "WILD" are added to code No. 21 and code No. 22 that are at the end of the symbol array L1001 (the first column). In the same manner, a code number of every symbol in each of the other symbol arrays is determined.

The main CPU 1041 resets the random number values corresponding to the code numbers of each symbol array (step S1066). In this processing, the main CPU 1041 resets the correspondence relationship between the respective random number values from 0 to 65535 and the code numbers, based upon the total number of symbols in each symbol array which has been determined in step S1062.

The main CPU 1041 stores into the RAM 1043 the code number of every symbol in each symbol array, which has been determined in step S1065, and the correspondence relationship between the code numbers of each symbol array and the random number values, which has been determined in step S1066, as the symbol table for a feature game (step S1067). The symbol table for the feature game stored in the RAM 1043 is referred to in executing the symbol determination processing for the feature game.

FIGS. 43A and 43B are views each showing an example of the symbol table for a feature game in the second embodiment.

In FIG. 43A, the wild symbols are added to code Nos. 13, 21 and 22 of the symbol array L1001 (the first column). Further, the wild symbol is added to code No. 12 of the symbol array L1002 (the second column). Furthermore, the wild symbols are added to code Nos. 6 and 13 of the symbol array L1003 (the third column). Further, in FIG. 43B, the wild symbols are added to code Nos. 11 and 12 of the symbol array L1004 (the fourth column). Moreover, the wild symbols are added to code Nos. 19 and 20 of the symbol array L1005 (the fifth column).

After executing the processing of step S1067, the main CPU 1041 completes the present subroutine.

Figure 44:
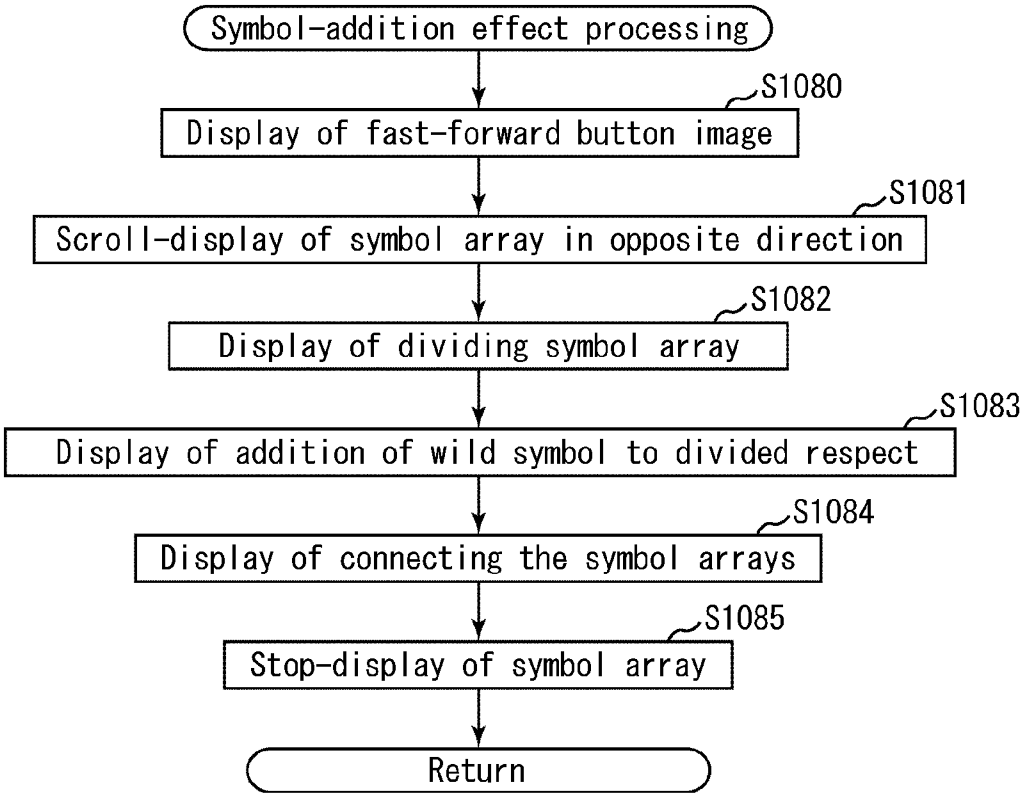
FIG. 44 is a flowchart showing a subroutine of symbol-addition effect processing in the second embodiment.

FIG. 44 is a flowchart showing a subroutine of the symbol-addition effect processing in the second embodiment.

First, in step S1080, the main CPU 1041 displays a fast-forward button image 1320 to the lower image display panel 1016.

Next, in step S1081, the main CPU 1041 scroll-displays the symbol arrays L1001 to L1005 in the direction from the bottom to the top, namely, the direction opposite to the scrolling direction in the normal game (cf. FIG. 24B). This scroll-display in the opposite direction is conducted at a speed lower than a speed of the scroll-display in the normal game.

Figure 45:
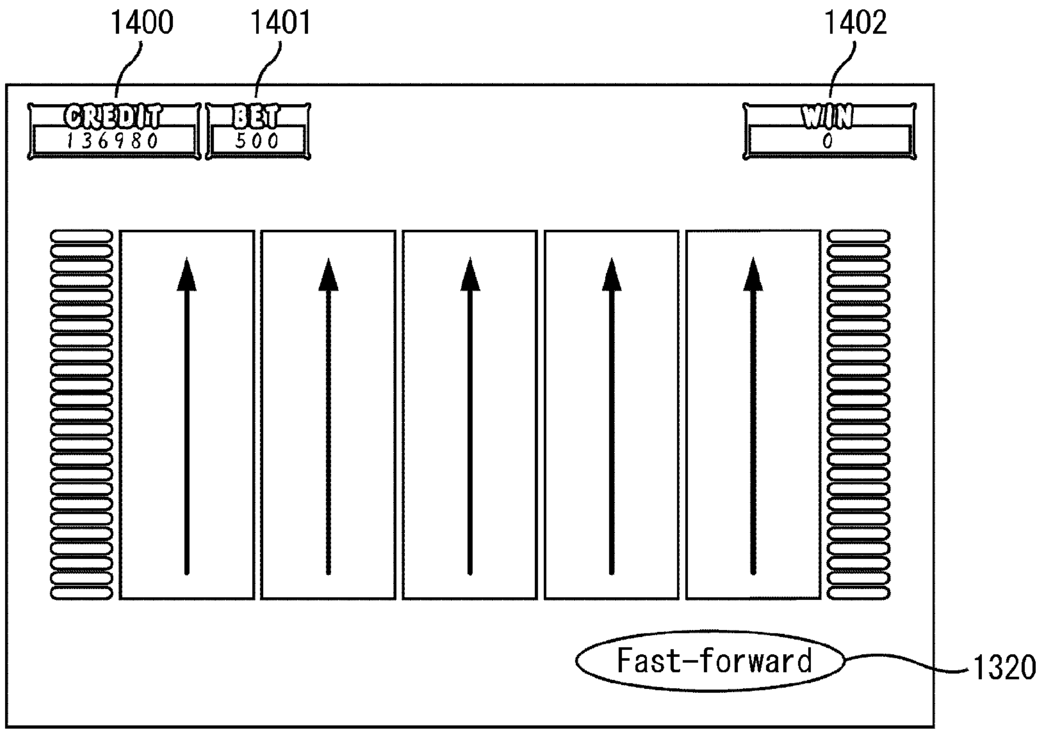
FIG. 45 is a view showing an exemplary image displayed to the lower image display panel provided in the slot machine according to the second embodiment of the present invention.

FIG. 45 is a view showing an exemplary image displayed to the lower image display panel provided in the slot machine according to the second embodiment of the present invention.

FIG. 45 shows an image that is displayed to the lower image display panel 1016 at the time of execution of the processing of step S1081. As shown in FIG. 45, at the center part of the lower image display panel 1016, the symbol arrays L1001 to L1005 are scroll-displayed in the direction from the bottom to the top, namely, the direction opposite to the scrolling direction in the normal game. Further, the fast-forward button image 1320 is displayed in the lower right portion of the lower image display panel 1016. When there is a touch on the place corresponding to the fast-forward button image 1320 on the touch panel 1069, the main CPU 1041 determines that the "fast-forward" operation command has been inputted.

Next, in step S1082, the main CPU 1041 conducts display of the symbol array L being divided (cf. FIG. 24C). In this processing, the main CPU 1041 conducts display of the symbol array L being divided at a position between the symbol of the code number determined in step S1064 of FIG. 40 and the symbol of a code number smaller than the determined code number by one. For example, when determining that the wild symbol is to be added to code No. 13 of the symbol array L1001, the main CPU 1041 conducts display of the symbol array L1002 being divided at the position between the symbol "FLOWER 2" of code No. 13 and the symbol "10" of code No. 12.

Next, in step S1083, the main CPU 1041 conducts displays of the wild symbol being added to the divided respect (cf. FIGS. 24D and 24E).

Next, in step S1084, the main CPU 1041 conducts display of the symbol arrays L being connected.

In step S1085, the main CPU 1041 stop-displays the scroll-display (scroll-display in the direction opposite to the direction in the normal game) of the symbol arrays L1001 to L1005, and completes the present subroutine.

Figure 46:
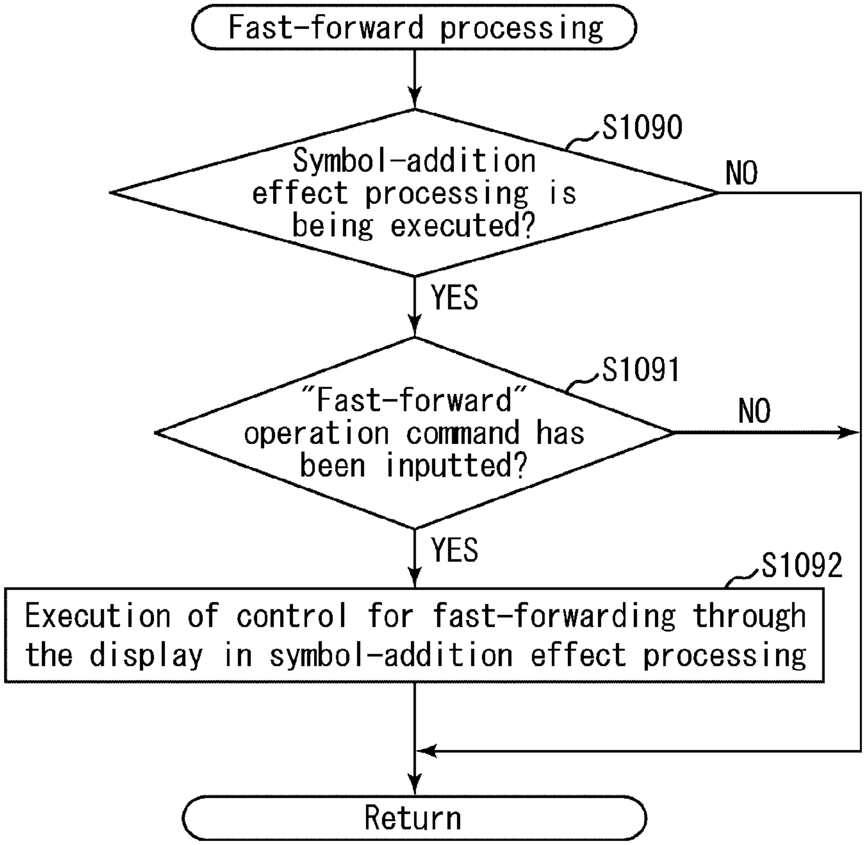
FIG. 46 is a flowchart showing a subroutine of fast-forward processing in the second embodiment.

FIG. 46 is a flowchart showing a subroutine of fast-forward processing in the second embodiment.

First, in step S1090, the main CPU 1041 determines whether or not the symbol-addition effect processing (cf. FIG. 44) is being executed. When determining that the symbol-addition effect processing is not being executed, the main CPU 1041 completes the present subroutine.

When determining that the symbol-addition effect processing is not being executed, the main CPU 1041 determines whether or not the "fast-forward" operation command has been inputted (step S1091). In the processing, the main CPU 1041 determines whether or not there has been a touch on the place corresponding to the fast-forward button image 1320 on the touch panel 1069. When determining that the "fast-forward" operation command has not been inputted, the main CPU 1041 completes the present subroutine. On the other hand, when determining that the "fast-forward" operation command has been inputted, the main CPU 1041 shifts the processing to step S1092.

In step S1092, the main CPU 1041 executes control for fast-forwarding the display in the symbol-addition effect processing. As a result, the display (display in steps S1081 to S1084 in FIG. 44) after the start of the processing of step S1092 is fast-forwarded. It is to be noted that the display is fast-forwarded at a speed that is three times faster than that of the display not fast-forwarded. After the processing of step S1092, the present subroutine is completed.

Figure 47:
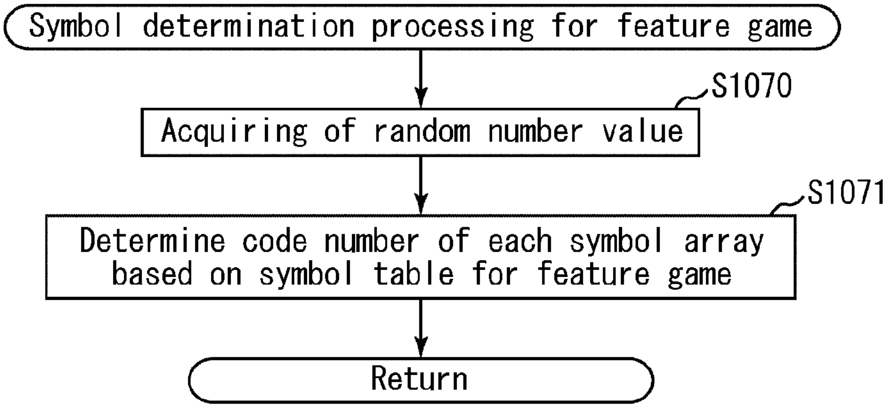
FIG. 47 is a flowchart showing a subroutine of symbol determination processing for a feature game in the second embodiment.

FIG. 47 is a flowchart showing a subroutine of the symbol determination processing for the feature game in the second embodiment.

This processing is processing performed by the main CPU 1041 executing the symbol determination program stored in the RAM 1043.

First, the main CPU 1041 acquires random number values from the random number generator 1064 (step S1070). In this processing, the main CPU 1041 acquires five random number values corresponding to the respective symbol arrays for the display blocks 1028.

Next, the main CPU 1041 determines a code number at stopping the symbols, based upon the acquired five random number values and the symbol table for the feature game (step S1071). For example, "08" is determined as the code number for the first array when the random number value for the first array is 23035. It should be noted that a code numbers for symbol arrays correspond to code numbers of the symbols to be rearranged to the display blocks 1028 in the first row out of the display blocks 1028 that are put in four rows.

After executing the processing of step S1071, the main CPU 1041 completes the present subroutine.

In the present embodiment, the case has been described where the random number generator 1064 is provided and a random number is extracted from the random number generator (a case of using a so-called hardware random number). However, in the present invention, a random number may be generated on the program (a case of using a so-called software random number).

As described above, according to the slot machine 1010 and the control method of the slot machine 1010, when three or more wild symbols have been stop-displayed on the pay line P2 in the normal game, display of the wild symbol being added to the symbol array L is executed while the symbol array L is being scrolled in the direction opposite to the direction in the normal game. Since the wild symbol is added to the symbol array L, it is possible to make the player have expectations for start of a game in which a new symbol array L different from that of the normal game is used.

Also, scrolling of the symbol array L during display of the wild symbol being added to the symbol array L allows the player to see which position of the symbol array L the wild symbol has been added to. The player having seen which position of the symbol array L the wild symbol has been added to can more easily predict whether or not the added wild symbol will be stop-displayed on the pay line P2, during the scroll-display of the symbol array L. As a result, it is possible to further raise the player's expectations generated by the addition of the wild symbol.

Further, when display of the wild symbol being added to the symbol array L is conducted, the symbol array L is scrolled in the direction opposite to the direction in the normal game. Accordingly, it is possible to make the player notice that the scroll-display during the display of the wild symbol being added to the symbol array L is not a part of a game but an effect to be produced when the wild symbol is added.

When the "fast-forward" operation command has been inputted through the touch panel 1069, display (effect) of the wild symbol being added to the symbol array L is fast-forwarded. As a result, the player who wishes to play the next game rather than see the display of the symbols being added can fast-forward the display by inputting the "fast-forward" operation command using the touch panel 1069.

As thus described, when three or more wild symbols have been stop-displayed on the pay line P2, the display of the wild symbol being added to the symbol array L is conducted while the symbol array L is being scrolled in the direction opposite to the direction in the normal game; and when the "fast-forward" operation command is inputted through the touch panel 1069 while the display is being conducted, the display of the wild symbol being added to the symbol array L is fast-forwarded. Consequently, it becomes possible to provide a more attractive game.

When the display of the wild symbol being added to the symbol array L is conducted, the symbol array L is scrolled at the speed lower than that of the scroll-display in the normal game, so that it becomes possible to make the player more certainly see which position of the symbol array L the wild symbol has been added to.

In the present embodiment, the case has been described where the display in the symbol-addition effect processing in the fast-forward mode is conducted at a speed that is three times faster than that of the display not fast-forwarded. However, the fast-forward mode in the present invention is not limited to the example. For example, the speed of the display in the fast-forwarded mode may be conducted at a speed that is 1.5 times, 2 times, or 4 times faster than the speed of the display not fast-forwarded. Also, in the fast-forward mode, the symbol-addition effect processing after the input of the "fast-forward" operation command may be skipped (the processing of step S10 S81 to S84 may be skipped). Alternatively, a configuration may be adopted with which the player can select one fast-forward mode from a plurality of fast-forward modes by making input using the input device.

In the present embodiment, the case has been described where the display in the symbol-addition effect processing is fast-forwarded when the "fast-forward" operation command has been inputted through the touch panel 1069. However, the input device in the present invention is not limited to a touch panel, and examples of the input device may include an exclusive button for the "fast-forward" operation which is provided in the gaming machine.

In the present embodiment, the case has been described where the number of pay lines 1300 is 25. However, the number of pay lines is not particularly limited in the present invention, and for example, it may be 30.

In the present embodiment, the case has been described where the wild symbol is added. That is, the case has been described where the extra symbol in the present invention is the wild symbol. However, the extra symbol of the present invention is not limited to the wild symbol, and may be a symbol (e.g. "10", "J", "Q", "K", "BIRD", "FISH", "FEATURE") other than the wild symbol. This is because addition of symbols can make the player have expectations for start of a game in which a new symbol array different from that of the normal game is used.

Further, for example, there may be two kinds of extra symbols, namely the wild symbol and the feature symbol. Here, the numbers of the wild symbols and the feature symbols both being the extra symbols are increased when the feature game is executed, and therefore, it is possible to excite the player more than in the case where only the number of the wild symbols is increased.

In the present embodiment, the case has been described where the display of the symbols being added to the symbol arrays L is conducted while the symbol arrays L are being scroll-displayed in the direction opposite to the scrolling direction in the normal game, when three or more feature symbols have been displayed on the pay line. However, the predetermined condition in the present invention is not limited to three or more feature symbols being displayed on the pay line, and examples of the predetermined condition may include elapse of a predetermined time period after the end of the previous feature game. Further, the examples thereof may also include that the number of normal games executed after the end of the previous feature game has reached a predetermined number of times.

In the present embodiment, the case has been described where the scroll-display in the opposite direction at the time of addition of the wild symbols is conducted at a speed lower than that of scroll-display in the normal game. However, the present invention is not limited to this, and the scroll-display in the opposite direction at the time of addition of the wild symbols may be conducted at a speed equal to that of the scroll-display in the normal game or at a speed higher than that of the scroll-display in the normal game. This is because even if the scrolling is conducted at a speed equal to or higher than that of the scroll-display in the normal game, it is possible to make the player see at least addition of the symbols to the symbol arrays.

In the present embodiment, the case has been described where all the symbol arrays L are scroll-displayed in the direction opposite to the direction of scrolling in the normal game, when three or more feature symbols have been displayed on the pay line. However, the present invention is not limited to this, and for example, only the symbol array determined as the symbol array to which the symbol is to be added may be scrolled in the direction opposite to the direction of scrolling in the normal game. Since the player only has to pay attention to the symbol array being scrolled in the direction opposite to the direction of scrolling in the normal game, it is possible to make the player more easily see which position of the symbol array the symbol has been added to.

In the present embodiment, the case has been described where the wild symbols exist also in the normal game, and the number of wild symbols is increased when three or more feature symbols have been display on the pay line. However, the present invention is not limited to this, and for example, the wild symbols may not exist in the symbol arrays in the normal game, and the wild symbols as the extra symbols may be added when a predetermined condition has been satisfied.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed is:

1. A slot-type wagering machine comprising:

a value addition mechanism by which a medium of exchange may be added to the slot-type wagering machine, the value addition mechanism configured to receive and authenticate a currency bill and at least one of a coin, a token, a ticket, or an IC card;

a payout mechanism by which a value corresponding to the medium of exchange may be paid out, the payout mechanism configured to dispense a coin and at least one of a token, a bill, a ticket, or an IC card;

a symbol display that scroll-displays a symbol array that includes a plurality of symbols; and a controller that:

executes a game in which the symbol array is scroll-displayed in a first direction and then stop-displayed to said symbol display, and in which game media are paid out in an amount corresponding to one or a combination of the stop-displayed symbols;

determines a number of extra symbols to be added to one or more reels of the symbol array, when a predetermined condition has been satisfied in an executed game; and displays an addition of at least one extra symbol to the one or more reels of the symbol array, based on the determined number of extra symbols to be added to the symbol array, while the one or more reels of the symbol array are scrolled in a second direction opposite to said first direction, the addition of the at least one extra symbol being performed at a speed allowing an external observer to visually recognize the addition of the at least one extra symbol to the one or more reels of the symbol array.

2. The slot-type wagering machine according to claim 1, wherein said controller displays the addition of the at least one extra symbol to the one or more reels of the symbol array at a speed lower than a speed of the one or more reels of the scroll-display of the game when the predetermined condition has been satisfied in the game.

3. The slot-type wagering machine according to claim 1, wherein said controller displays the number of added extra symbols, while displaying the at least one extra symbol being added to said symbol array.

4. A slot-type wagering machine comprising:

a value addition mechanism by which a medium of exchange may be added to the slot-type wagering machine, the value addition mechanism configured to receive and authenticate a currency bill and at least one of a coin, a token, a ticket, or an IC card;

a payout mechanism by which a value corresponding to the medium of exchange may be paid out, the payout mechanism configured to dispense a coin and at least one of a token, a bill, a ticket, or an IC card;

a symbol display that scroll-displays a symbol array that includes a plurality of symbols;

an input device that receives an operation command from a player; and a controller that:

executes a game in which the symbol array is scroll-displayed in a first direction and then stop-displayed to said symbol display, and in which game media are paid out in an amount corresponding to one or a combination of the stop-displayed symbols;

determines a number of extra symbols to be added to one or more reels of the symbol array, when a predetermined condition has been satisfied in an executed game;

displays an addition of at least one extra symbol to the one or more reels of the symbol array, based on the determined extra number of extra symbols to be added to the symbol array, while the one or more reels of the symbol array are scrolled in a second direction opposite to said first direction, the addition of the at least one extra symbol being performed at a speed allowing an external observer to visually recognize the addition of the at least one extra symbol to the one or more reels of the symbol array; and fast-forwards through the display of the at least one extra symbol, when a predetermined input has been made through said input device.

5. The slot-type wagering machine according to claim 4, wherein said controller displays the addition of the at least one extra symbol to the one or more reels of the symbol array at a speed lower than a speed of the one or more reels of the scroll-display of the game.

6. A control method of a slot-type wagering machine comprising:

a value addition mechanism by which a medium of exchange may be added to the slot-type wagering machine, the value addition mechanism configured to receive and authenticate a currency bill and at least one of a coin, a token, a ticket, or an IC card;

a payout mechanism by which a value corresponding to the medium of exchange may be paid out, the payout mechanism configured to dispense a coin and at least one of a token, a bill, a ticket, or an IC card;

a symbol display that scroll-displays a symbol array that includes a plurality of symbols;

an input device that receives an operation command from a player; and a controller, the method comprising the steps of:

executing, with the controller, a game in which a symbol array including a plurality of symbols is scroll-displayed in a first direction and then stop-displayed to the symbol display, and in which game media are paid out in an amount corresponding to the stop-displayed symbol or a combination of the stop-displayed symbols; and determining, with the controller, a number of extra symbols to be added to one or more reels of the symbol array, when a predetermined condition has been satisfied in the game executed in said executing step; and displaying an addition of at least one extra symbol to the one or more reels of the symbol array, based on the number of extra symbols determined in the determining step, and while the one or more reels of the symbol array are scrolled in a second direction opposite to said single first direction, the addition of the at least one extra symbol being performed at a speed allowing an external observer to visually recognize the addition of the at least one extra symbol to the one or more reels of the symbol array.

7. The control method of the slot-type wagering machine according to claim 6, wherein said displaying step comprises:

displaying the addition of at least one extra symbol to the one or more reels of the symbol array at a speed lower than a speed of the one or more reels of the scroll-display in said executing step.

8. The control method of the slot-type wagering machine according to claim 6, the method further comprising the step of:

displaying the number of added extra symbols, while displaying the at least one extra symbol being added to said symbol array in said displaying step.

* * * * *